Sept. 18, 1962 B. P. SILVERMAN ET AL 3,054,556

RECORDING APPARATUS

Filed April 25, 1957 34 Sheets-Sheet 1

Sept. 18, 1962 B. P. SILVERMAN ETAL 3,054,556

RECORDING APPARATUS

Filed April 25, 1957 34 Sheets-Sheet 2

Sept. 18, 1962 B. P. SILVERMAN ETAL 3,054,556

RECORDING APPARATUS

Filed April 25, 1957 34 Sheets-Sheet 3

Sept. 18, 1962 B. P. SILVERMAN ETAL 3,054,556

RECORDING APPARATUS

Filed April 25, 1957 34 Sheets-Sheet 4

Sept. 18, 1962 B. P. SILVERMAN ETAL 3,054,556

RECORDING APPARATUS

Filed April 25, 1957 34 Sheets-Sheet 5

Sept. 18, 1962 B. P. SILVERMAN ET AL 3,054,556

RECORDING APPARATUS

Filed April 25, 1957 34 Sheets-Sheet 6

Sept. 18, 1962 B. P. SILVERMAN ETAL 3,054,556

RECORDING APPARATUS

Filed April 25, 1957 34 Sheets-Sheet 8

Sept. 18, 1962 B. P. SILVERMAN ETAL 3,054,556

RECORDING APPARATUS

Filed April 25, 1957

34 Sheets-Sheet 11

Sept. 18, 1962 B. P. SILVERMAN ETAL 3,054,556

RECORDING APPARATUS

Filed April 25, 1957 34 Sheets-Sheet 12

Sept. 18, 1962 B. P. SILVERMAN ETAL 3,054,556

RECORDING APPARATUS

Filed April 25, 1957 34 Sheets-Sheet 14

Sept. 18, 1962 B. P. SILVERMAN ETAL 3,054,556

RECORDING APPARATUS

Filed April 25, 1957 34 Sheets-Sheet 15

Sept. 18, 1962 B. P. SILVERMAN ETAL 3,054,556

RECORDING APPARATUS

Filed April 25, 1957 34 Sheets-Sheet 16

Sept. 18, 1962 B. P. SILVERMAN ETAL 3,054,556

RECORDING APPARATUS

Filed April 25, 1957 34 Sheets-Sheet 18

Sept. 18, 1962 B. P. SILVERMAN ETAL 3,054,556

RECORDING APPARATUS

Filed April 25, 1957 34 Sheets-Sheet 19

Sept. 18, 1962 B. P. SILVERMAN ETAL 3,054,556

RECORDING APPARATUS

Filed April 25, 1957 34 Sheets-Sheet 21

Sept. 18, 1962 B. P. SILVERMAN ETAL 3,054,556

RECORDING APPARATUS

Filed April 25, 1957 34 Sheets-Sheet 22

Sept. 18, 1962 B. P. SILVERMAN ET AL 3,054,556

RECORDING APPARATUS

Filed April 25, 1957 34 Sheets-Sheet 25

Sept. 18, 1962 B. P. SILVERMAN ETAL 3,054,556

RECORDING APPARATUS

Filed April 25, 1957 34 Sheets-Sheet 29

Sept. 18, 1962 B. P. SILVERMAN ETAL 3,054,556

RECORDING APPARATUS

Filed April 25, 1957 34 Sheets-Sheet 30

Sept. 18, 1962 B. P. SILVERMAN ETAL 3,054,556

RECORDING APPARATUS

Filed April 25, 1957 34 Sheets-Sheet 31

United States Patent Office 3,054,556

Patented Sept. 18, 1962

3,054,556

RECORDING APPARATUS

Bernard P. Silverman, Oakland, Harry W. Cordes, Palo Alto, and Frederick Maurer, Castro Valley, Calif., assignors to Friden, Inc., a corporation of California Filed Apr. 25, 1957, Ser. No. 655,294
3 Claims. (Cl. 235—23)

INDEX

| | Column |
|---|---|
| 1. Locking Mechanism for Positive Gear Transmission | 7 |
| 2. Readout Switch 4000 | 8 |
| 3. Contact Supporting Plates of the Switch 4000 | 9 |
| 4. Closing of the Contacts in the Switch 4000 | 11 |
| 5. Opening of the Contacts in the Switch 4000 | 12 |
| 6. Restoring of the Movable Contacts and Carriages in the Switch 4000 | 12 |
| 7. Recoupling of Connecting Rods to Carriages in the Switch 4000 | 13 |
| 8. Commutator Switch 4102 | 17 |
| 9. Panel Type Indicator | 25 |
| 10. Panel Type Indicator Operation | 28 |
| 11. Normal Sales Transaction | 28 |
| 12. Return Transaction | 35 |
| 13. Voiding a Sales Ticket | 35 |

This invention relates to record making apparatus and more particularly to record making apparatus operable to record sales of commodities.

The object of the invention is to provide an improved sales record making apparatus readily operable by sales personnel.

The sales record making apparatus comprises, in combination, a calculating machine and a record making machine. For example, the calculating machine may be a so-called ten-key adding machine and the record making machine may be a tape perforator.

The sales record making apparatus may be used in combination with a cash drawer and thus serve as a cash register.

A feature of the invention resides in the addition to the combination of the calculating machine and the record making apparatus of an indicator which progressively informs the operator all of the various steps to follow in operating the apparatus of this invention in recording a sale.

Another feature of the invention resides in an electrical control apparatus for controlling the operation of the calculating machine, the record making apparatus and the indicator in accordance with a predetermined program.

Another feature resides in a latch means for controlling the opening of the cash drawer.

Another feature resides in a lock and switch operating means for controlling the operation of the cash drawer when refund transactions are required and duly authorized.

Another feature resides in a switch controlling lock operable when a refund is required.

In the drawings:

FIG. 8 is an enlarged view in perspective of the improved means provided in this invention for controlling the opening of the cash drawer, the parts which are conventional in cash register drawer control arrangements being shown in dash lines;

The Add-Punch machine embodying this invention is operable to list items entered in the adding machine, compute amount therefrom, print required totals and make a perforated record of the required amounts, and is an improvement over the Add-Punch apparatus described in the Harold J. Chall et al. application, S.N. 469,128, filed November 16, 1954, now Patent No. 2,861,739, issued November 25, 1958, entitled "Perforated Record making Adding Machine," and assigned to the same assignee as the present invention.

In retail merchandise establishments and more particularly in relatively large retail stores such, for example, as a department store, it is found advantageous and somewhat of a necessity to make a record of each sale and pertinent information relating to the sale. The record of the sale, in some cases, indicates the identification number of the clerk making the sale, the kind of merchandise sold, the type of sale, i.e., whether cash or credit, the amount of the sale, the amount of any discount applicable to the sale, a sub-total of the amount of the transaction or transactions, the amount of any tax applicable to the transaction and the total amount of the transaction. In making the required record of a sales transaction, the clerk often has to write down the information by hand on a business form or sheet and mentally calculate the amounts required to be recorded. The clerk must also readily remember or recall the type of information required in the record of each transaction and in what order the information should be recorded. The labor turnover in department stores is relatively high and supervisors are continually finding it necessary to instruct new employees in the method of making the required records of sale transactions. Frequently it is found necessary to instruct a relatively new employee several times in the making of the sales record. Relatively old employees sometimes also forget the exact method of sales recording required in each department. Handwritten sales slips are found, in some measure, unsatisfactory due to difficulty in reading the handwriting and the difference in abbreviations of words used by various sales employees. Handwritten sales records, also, are not suitable for automatic reading and transcribing and do not lend themselves well to accounting and inventory systems employing automatic tabulating and calculating apparatus.

The present invention provides a means for making a printed record and a perforated record of a sale, means for making required calculations in connection with the sale and progressively displays in a window section of the apparatus, instructions to the operator as to how and in what order the user of the apparatus should proceed to make the required record of the sales transaction.

Figure 1:
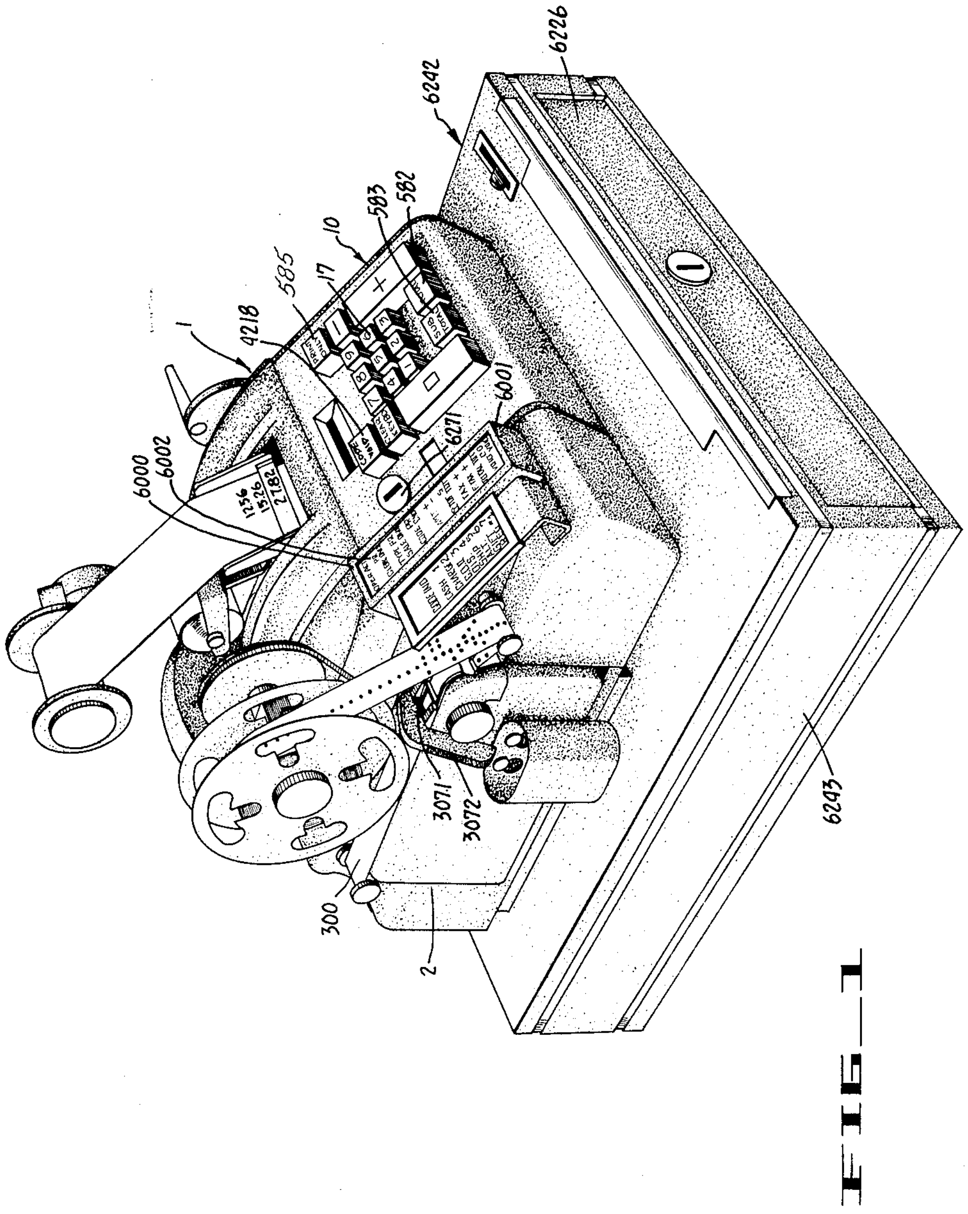
FIG. 1 is a view in perspective of the sales record making apparatus embodying the present invention and having the adding machine portion of the apparatus supported on and operable to control the operation of the cash drawer.
Figure 2:
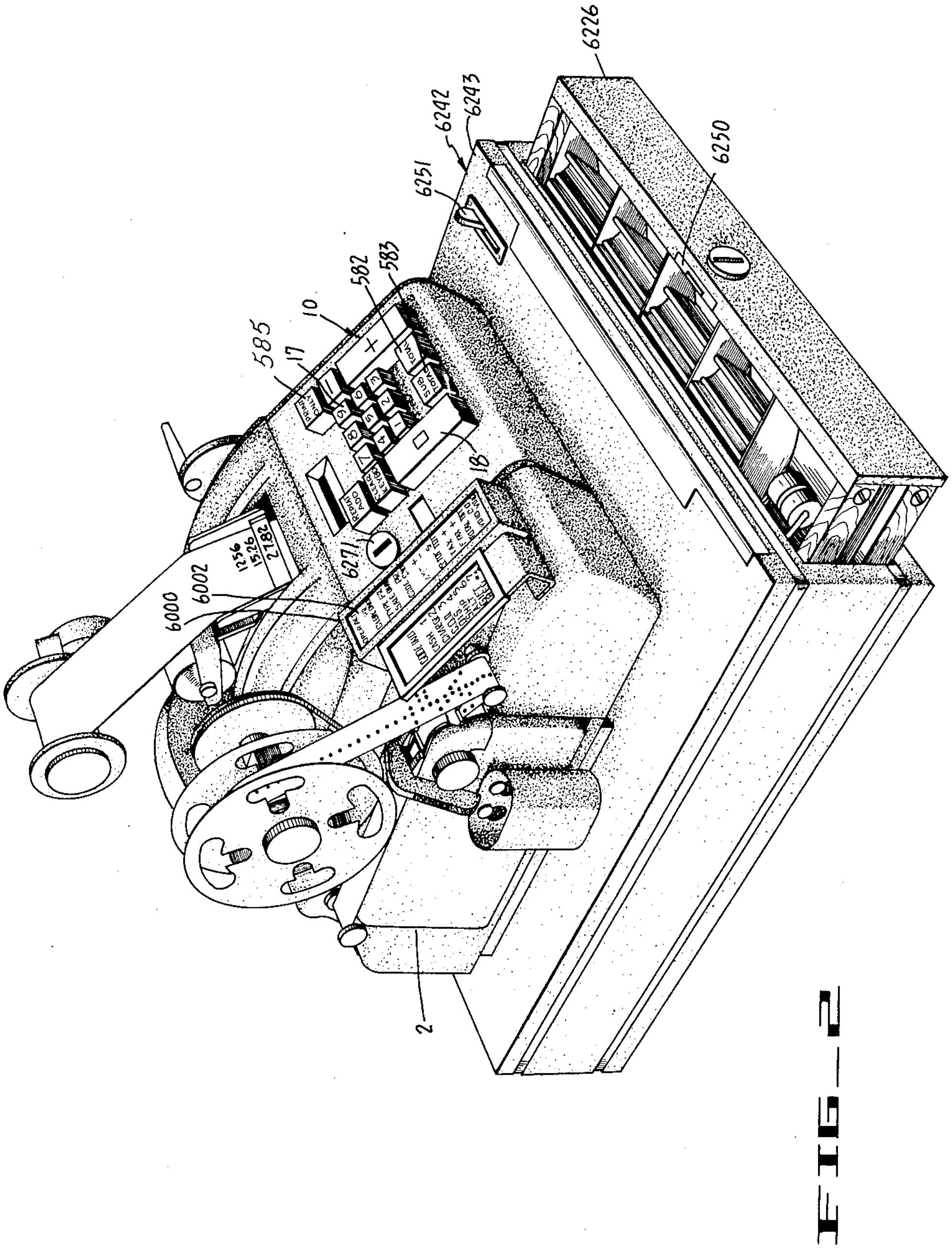
FIG. 2 is a view corresponding to FIG. 1 but showing the cash drawer open.
Figure 5:
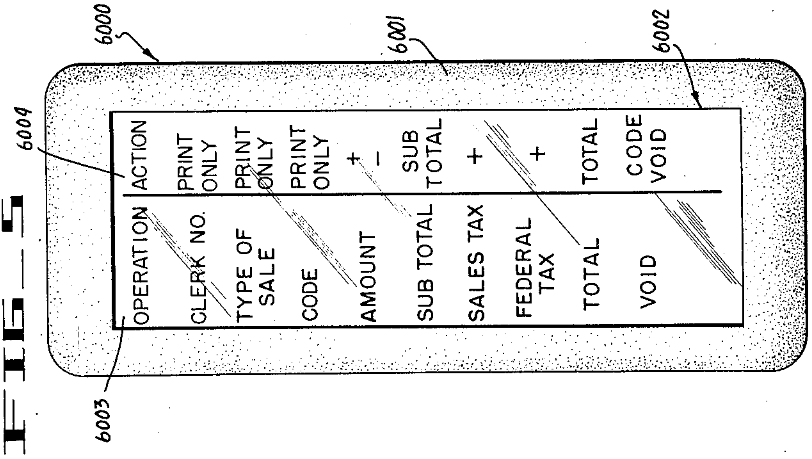
FIG. 5 is an enlarged view of the indicator portion of the apparatus.

In the particular setup of this invention shown in the figures of the drawings and as particularly shown in FIGS. 1, 2, and 5, the indicator progressively lights up portions of its window to give illuminated step-by-step instructions to the operator. As each step in the operation of making a record of a sale is performed, the instruction in the window appears in illuminated characters to inform the operator what is required in the next operation of the apparatus. For example, the window may be operable to successively display in one column the list of information required in the record of the sale and in an adjacent column the indication of the functional key required to be operated in the manual keyboard of the adding machine portion of the apparatus to enter the information required. In the present setup of the apparatus the window appears as indicated directly below:

| OPERATION | ACTION |
|---|---|
| CLERK NO. | PRINT ONLY |
| TYPE OF SALE | PRINT ONLY |
| CODE | PRINT ONLY |
| AMOUNT | + − |
| SUB TOTAL | SUB TOTAL |
| SALES TAX | + |
| FEDERAL TAX | + |
| TOTAL | TOTAL |
| VOID | CODE VOID |

In the above illustrated window the first horizontal line of characters "Operation/Action" appear clearly at all times in clear white letters on a dark background. The characters in the horizontal line spaces below the headings "Operation/Action" appear rather dimly until they happen to represent the next step of operation, in which event, the characters of that particular line space are illuminated. The normal setting of the apparatus is with the "Clerk No." and "Print Only" instructions illuminated. In this case when a sale is made the operator should enter her identification number by operating the appropriate number keys in the adding machine portion of the apparatus and immediately following this the operator should depress the "Print Only" key in the adding machine keyboard. When the clerk number has been entered and the "Print Only" key is depressed the lamps illuminating the "Clerk No." and "Print Only" signs are automatically extinguished and the words "Type of Sale/Print Only" are illuminated in the next horizontal line space below to indicate to the operator that a predetermined number indicating the type of sale should be entered by operating the appropriate number keys of the adding machine and the "Print Only" key in the machine should be again operated. After the type of sale information has been entered and the "Print Only" key has been operated the words "Code" and "Print Only" appear in illuminated characters in the window and the operator is thereby informed that the next information to be entered is a code number indicating the character of the merchandise sold, the code number being entered in the adding machine portion of the apparatus by manual operation of the appropriate number keys in the normal keyboard. The illuminated words in the window indicate to the operator that the "Print Only" key should be operated at this point to complete the entry of the code number. The next information illuminated in the window will be the word "Amount" and alongside will appear the illuminated signs "±" indicating that the price or amount involved in the transaction should be entered and that the plus or minus key in the adding machine keyboard should be operated to add into the machine the value of the transaction or to deduct the amount entered according to the requirements of the case. After the amount has been entered and the plus or minus key has been operated the words "Sub Total /Sub Total" appear illuminated in the window. At this point operation of the "Sub Total" key will cause the obtaining of a sub total operation in the adding machine and illuminating of the words on the next lower horizontal line space in the window so that the words "Sales Tax" and the plus sign (+) appears in the window. The operator should then enter the amount of the sales tax and operate the plus key. The next operation should be to enter the Federal Tax and operate the plus key whereupon the words "Total/Total" appear illuminated in the window to indicate that the next operation should be the striking of a total of the values previously entered in the adding machine portion of the apparatus. When the total key is operated the total of the sale is printed in the adding machine portion of the apparatus, a record of the total is made in the tape record strip and the record making apparatus of this invention is conditioned for receiving another record of a sales transaction, the words "Clerk No./Print Only" appearing illuminated near the top of the window to inform the operator of the first operation required in recording a sales transaction. The words "Void/Code Void" shown at the lower portion of the window do not appear illuminated unless the apparatus is operated to cancel out the record.

From the above it will be seen that by virtue of the constant and progressive display of instructions appearing in the window of the apparatus, operators of the apparatus always have at hand and instantly reminding them the current step of operation of the apparatus. Interlocks are provided in the apparatus to prevent incorrect operation. The records of sales produced by operation of the apparatus are therefore of the required and uniform character.

As before mentioned, the apparatus may comprise a ten-key adding machine in combination with a tape perforator. Furthermore, the combination may be of the order of the Add-Punch apparatus forming the subject matter of the Harold J. Chall-Bernard Silverman application, Serial No. 469,128, filed November 16, 1954, now Patent No. 2,861,739, issued November 25, 1958, entitled "Perforated Record Making Adding Machine" in which a modified ten-key adding machine is equipped with a readout switch and the values in the readout switch representing values in the adding machine are read out through an electrical control system and control a tape perforator to perforate a tape to provide a permanent and reproducible record of the values temporarily stored in the modified adding machine. It will be understood that when through suitable operation of manual keys in the adding machine portion of the apparatus values are put into the apparatus, movable switch members in the readout switch are made to take positions in the readout switch in accordance with the values in the adding machine and that when the Add-Punch apparatus is suitably operated the readout switch controls the operation of electromagnetic devices in the tape perforator portion of the Add-Punch apparatus to selectively operate the electromagnetic devices so that required perforator pins in the tape perforator apparatus will be subsequently thrust through a paper tape to produce in code a perforated tape record of the values put into and accumulated in the adding machine portion of the apparatus.

It will be assumed for the purpose of explaining and illustrating this invention and not in the sense of a limitation thereof that the invention is embodied in a modified ten key adding machine in combination with a general conventional form of tape perforator.

As shown in FIG. 1, this apparatus is a ten-key adding machine 1 and a tape perforator machine 2, the adding machine and the tape perforator being disposed in side-by-side spaced relation and being electrically and mechanically coupled.

The adding machine 1 is operable to receive and record entries of values such as are normally received and recorded by a record printing adding machine and to compute from these entries the sums of differences in the individual amounts entered and to record the totals as required.

Figures 9, 40:
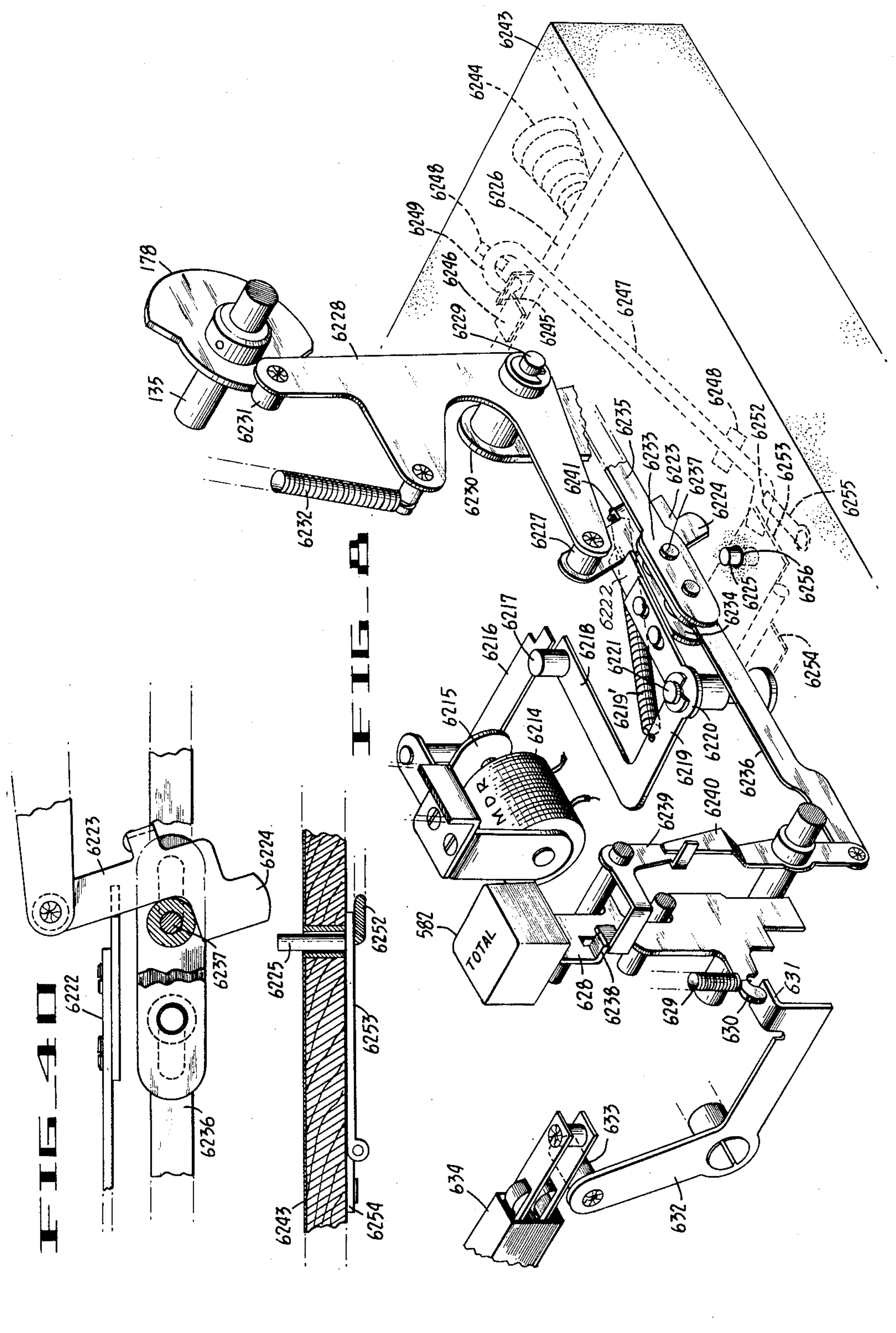
FIG. 9 is an enlarged view, partly in section, of portions of the cam shaft and a commutator type switch forming a control member in the add-punch apparatus.
FIG. 40 is an enlarged side elevational view, partly in section, of a portion of the lever and rod mechanism provided for controlling the release of the cash drawer.
Figure 9:
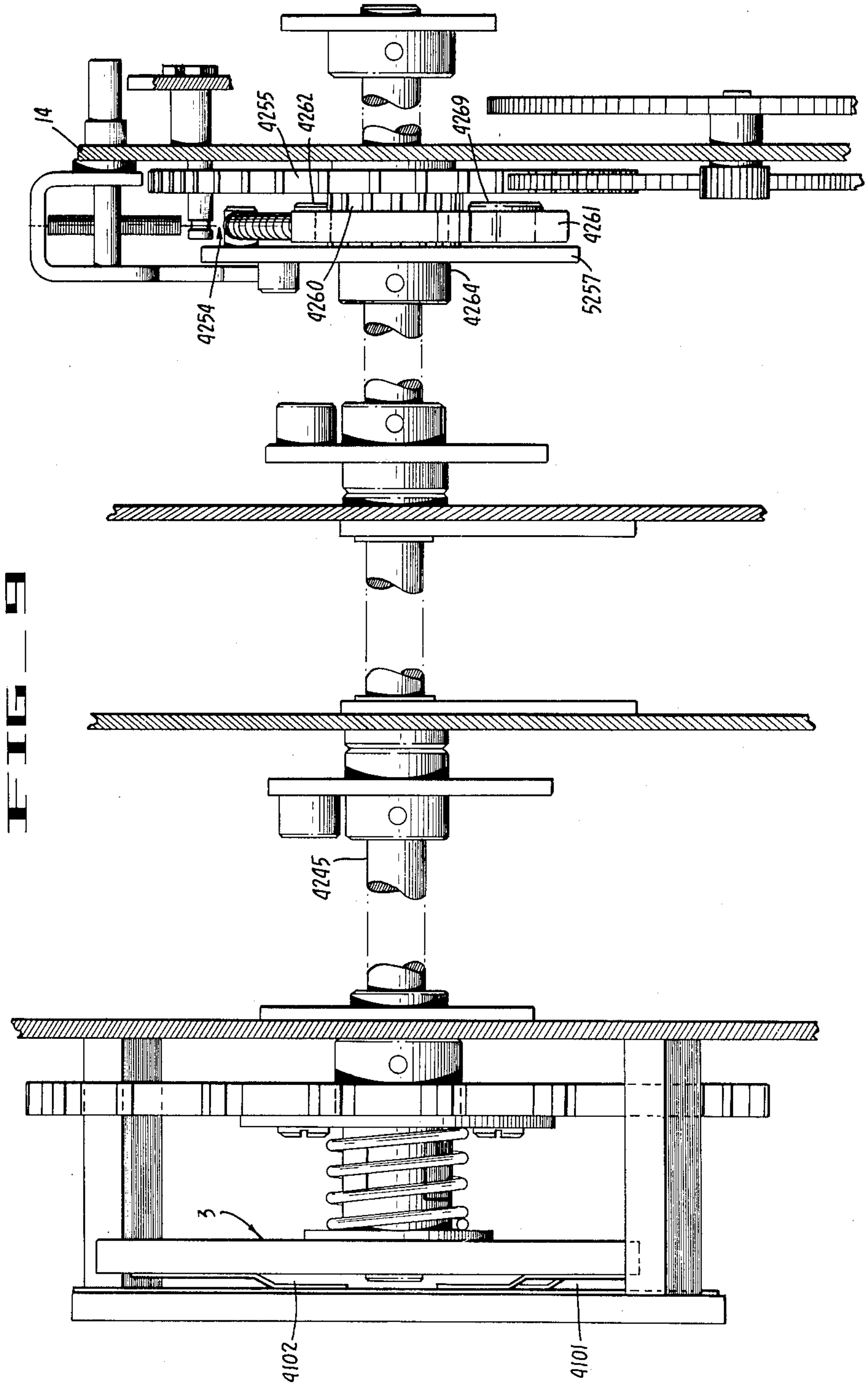
Figure 12:
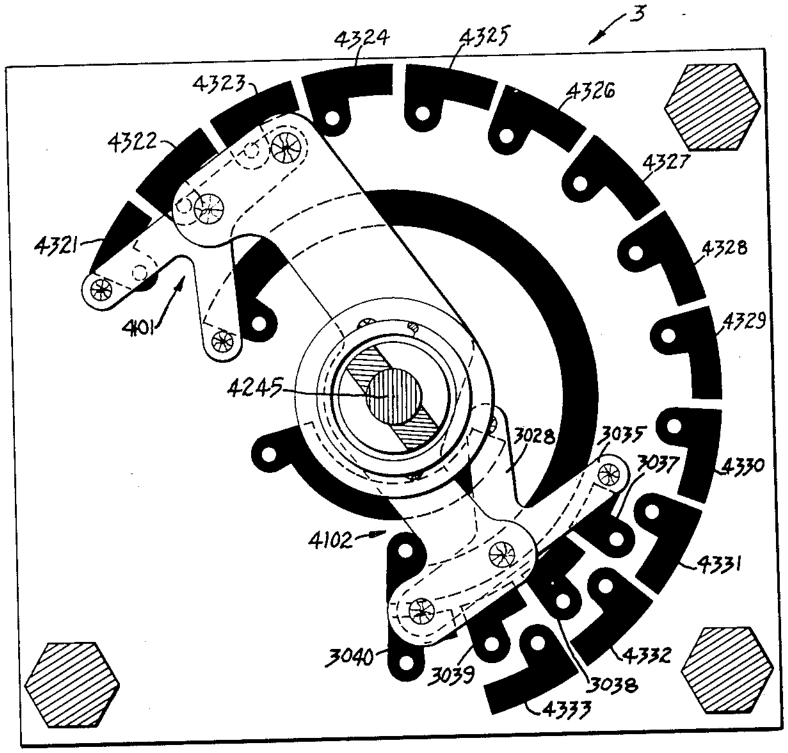
FIG. 12 is a plan view of the commutator type switch shown in FIG. 11.
Figure 11:
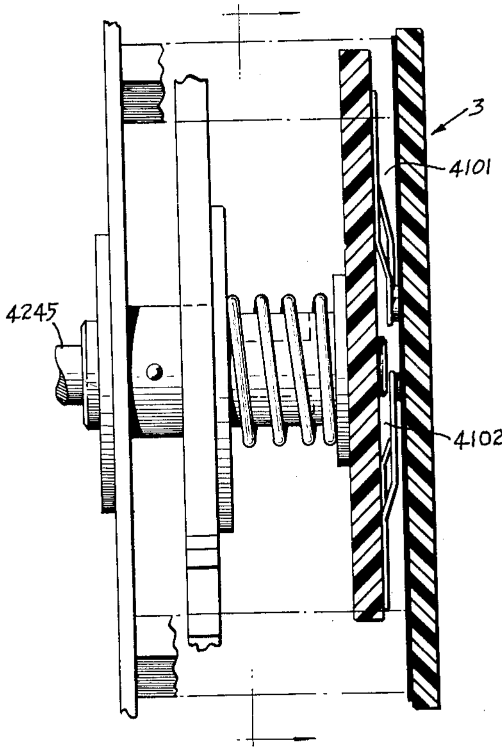
FIG. 11 is a view, partly in section, of the commutator type switch.
Figure 17:
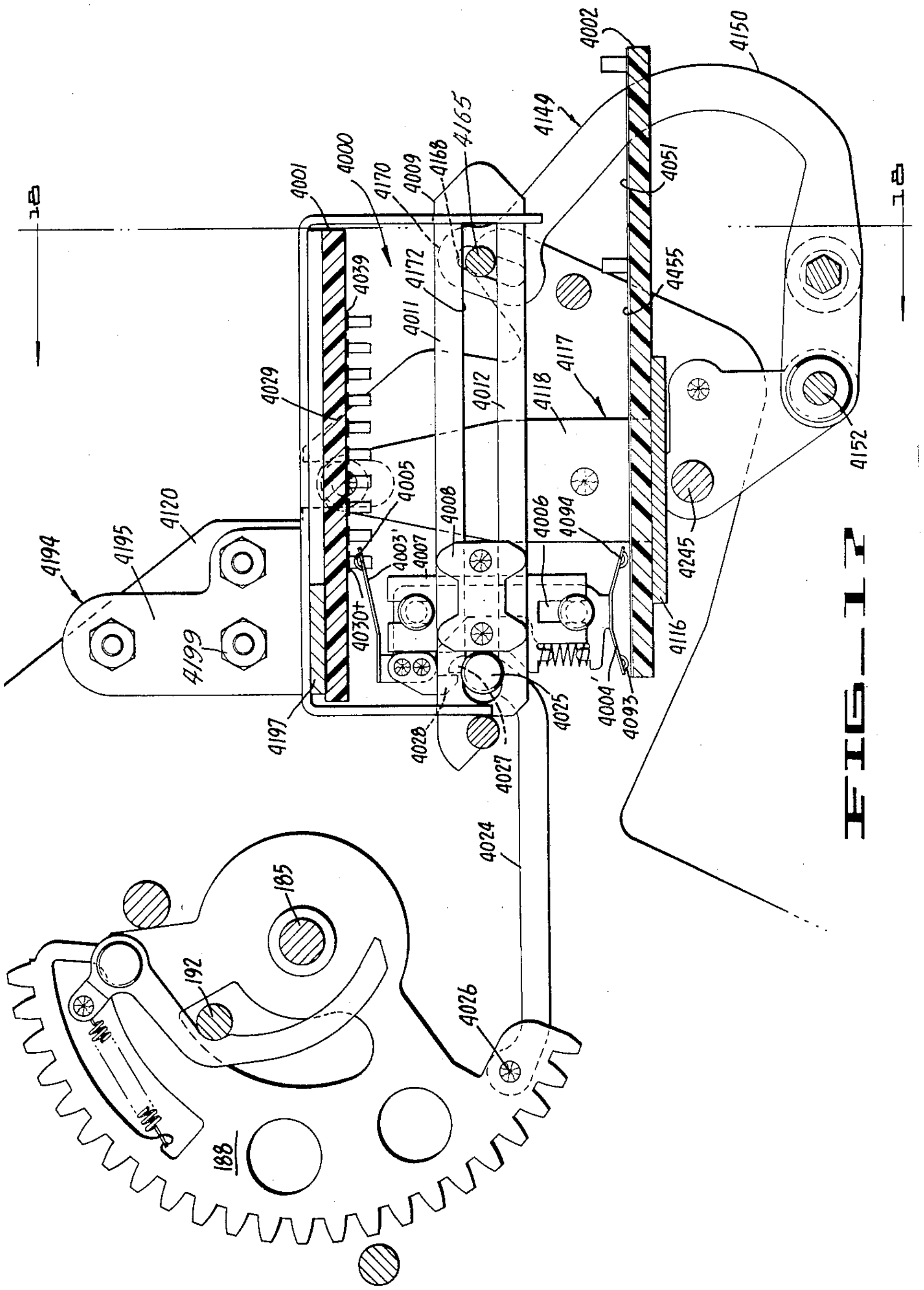
FIG. 17 is a side view, partly in section, of a sector gear employed in the adding machine and with the sector gear mechanically connected to the electrical readout switch.
Figure 18:
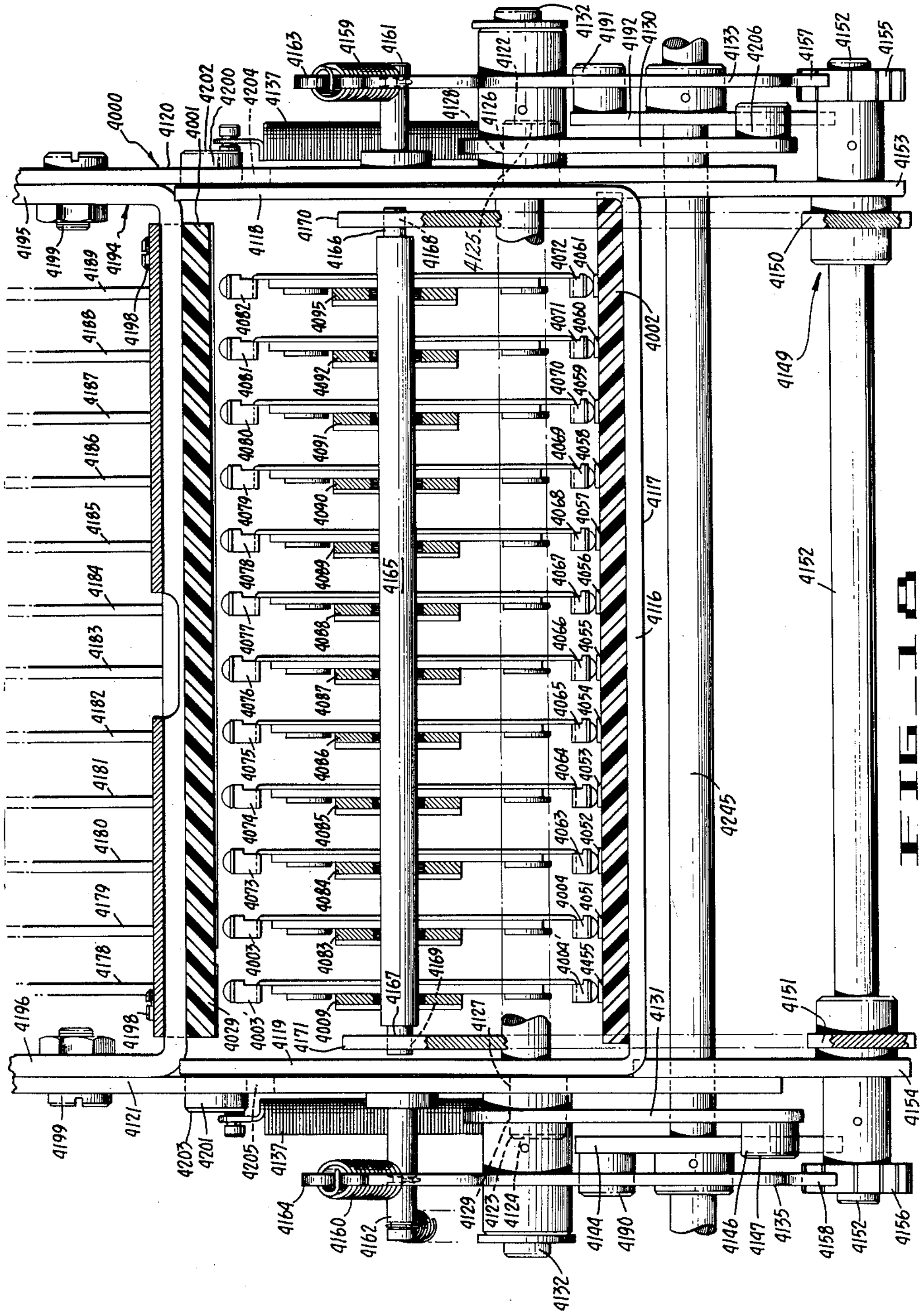
FIG. 18 is a plan view, partly in section, of parts of the electrical readout switch.
Figure 19:
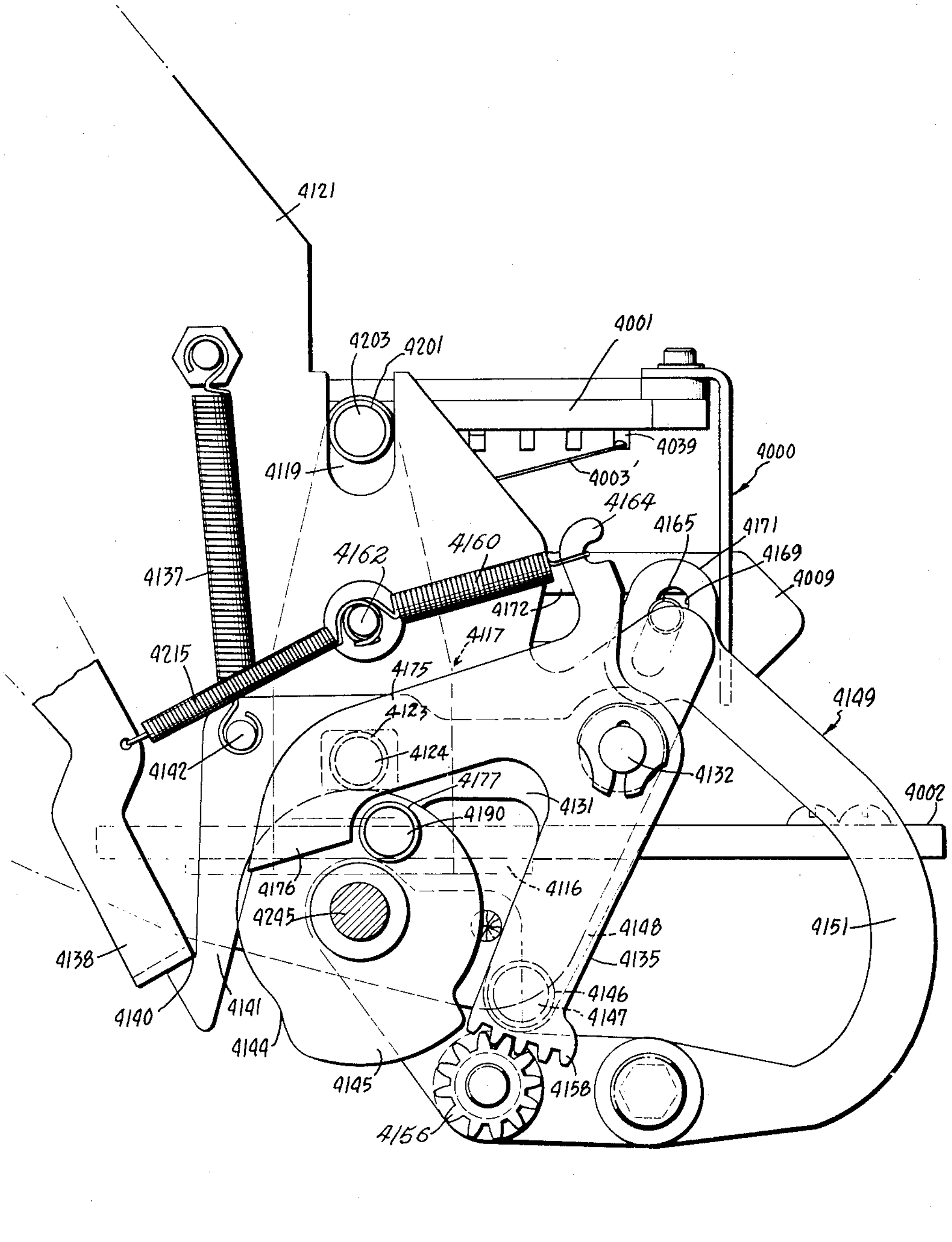
FIG. 19 is a side view of portions of the readout switch apparatus showing the restoring mechanism provided therein for restoring movable contacts in the switch to their home positions.

The tape performator 2 is operable to make perforated records in a tape, and electromagnetic devices are provided in the tape perforator 2 to control the pattern of perforations made in the tape in accordance with signals coming into the tape perforator from some remote point, such, for example, as the electrical control system involving the commutator 3, shown in FIGS. 9, 11 and 12, and the electrical readout switch 4000 shown in FIGS. 17, 18 and 19 provided in the adding machine 1. The readout switch 4000 is operable to, in effect, electrically record the amounts computed in the adding machine 1.

Figure 15:
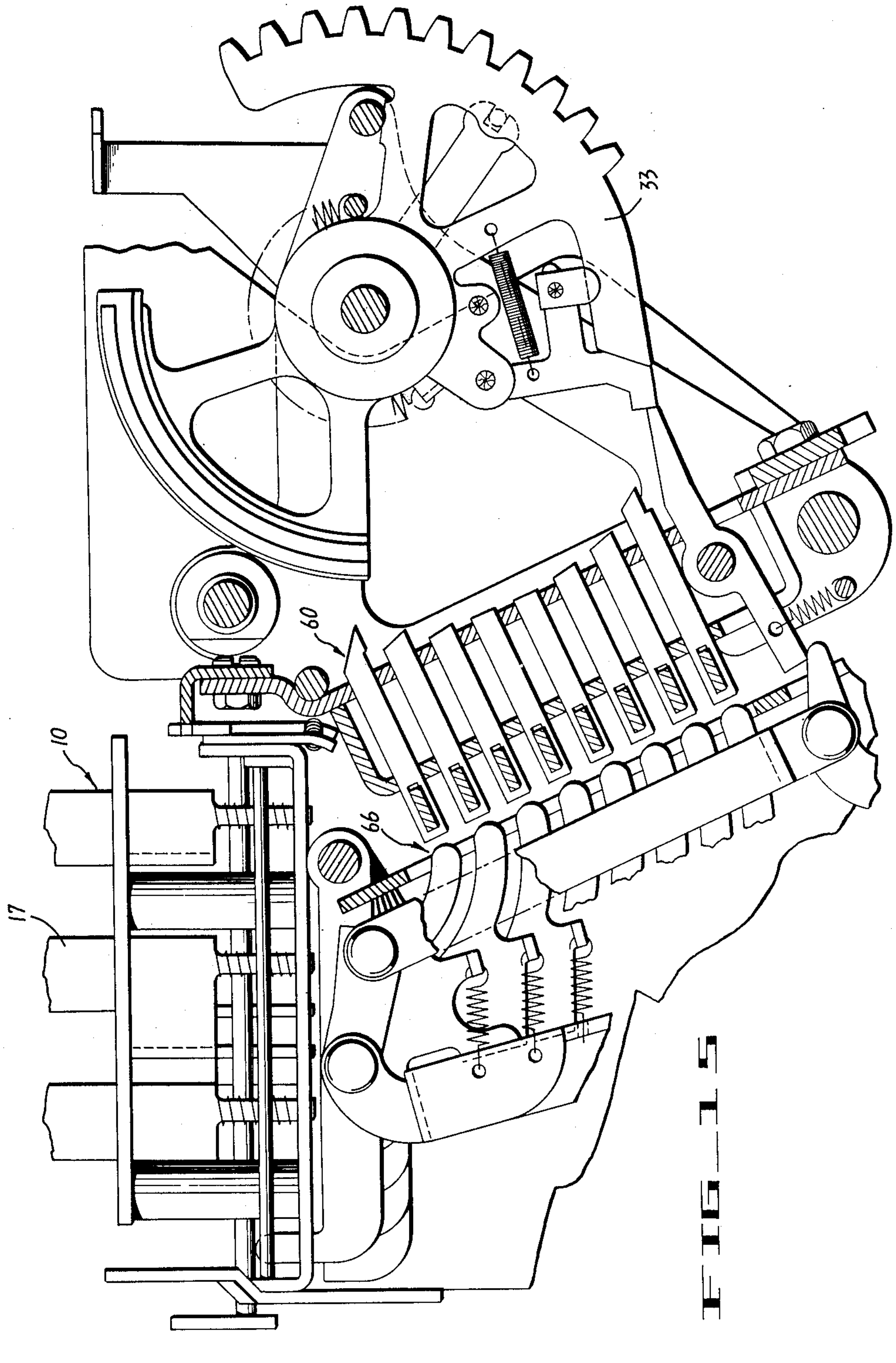
FIG. 15 is a view, partly in section, of a digitation mechanism employed in the adding machine apparatus and showing a transfer gear system provided therein.
Figure 16:
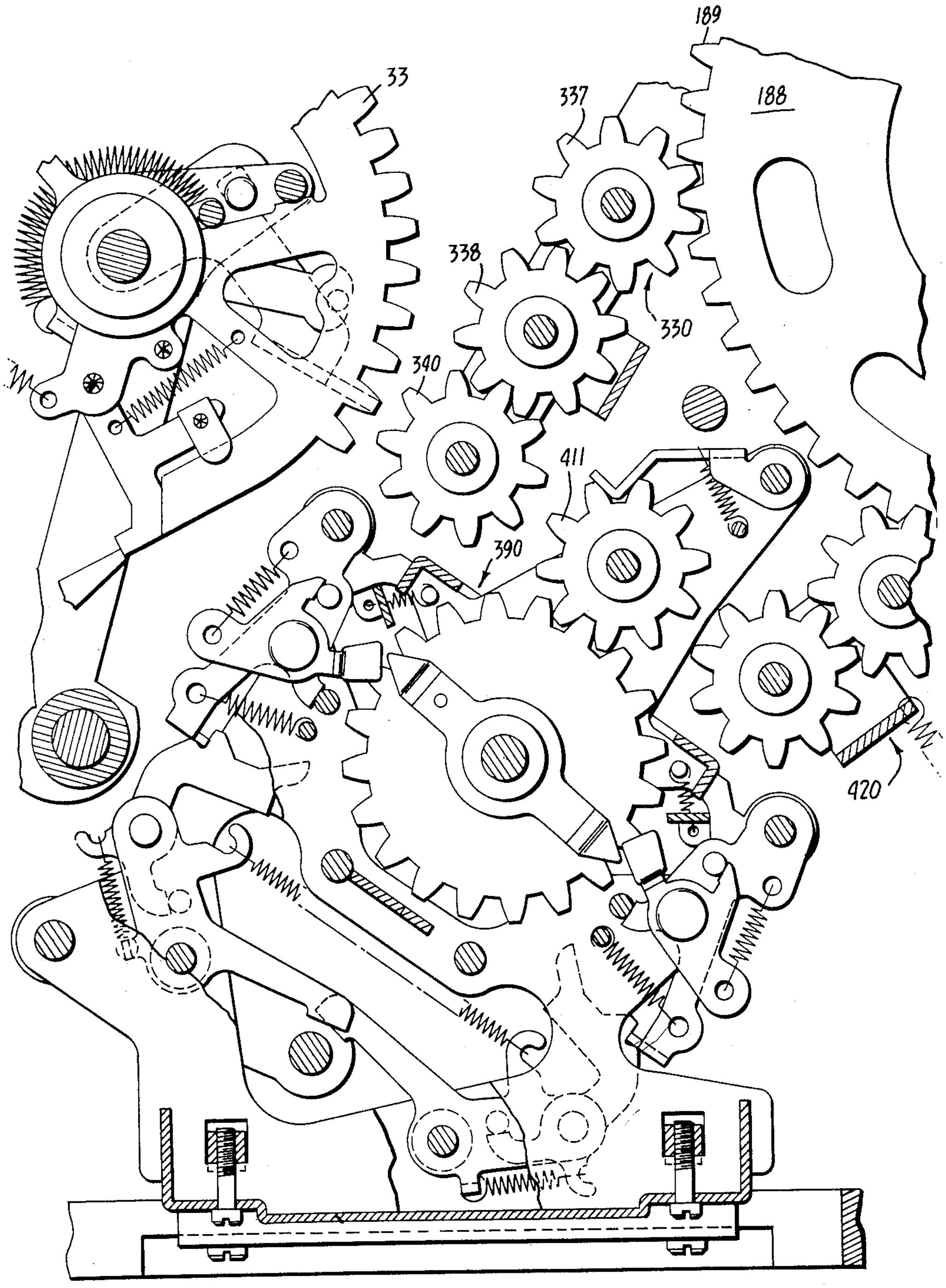
FIG. 16 is a view, partly in section, of portions of an accumulator employed in the adding machine and showing a transfer gear system therein.

Referring to FIGS. 1, 2 and 15, it will be understood that when keys in the selection mechanism and involving the key 17, for example, are manually operated in the keyboard assembly 10, pin setting bellcrank levers 66 are operated to operate a stop pin assembly to set, for example, the stop pins 60 to extend beyond their normal position, shown in FIG. 15. By selective operation of the pins 60, sector gears 33 are controlled in their clockwise rotative movement to rotate to a required extent in accordance with the setting of the digital mechanism involving the key 17. During the rotation of the sector gears 33 back to their normal positions, a set of gears 337, 338 and 340, shown in FIG. 16, are brought into gear connection with the sector gears 33 to transmit movements of the sector gears 33 to a set of corresponding sector gears 188 to move the gears 188 to the same extent as the gears 33 were initially moved. The set of gears 337, 338 and 340 are subsequently pivotally moved to gear connect the sector gears 188 to a set of gears 411 in an accumulator 390 operable to store, in effect, settings of the sector gears 188 and therefore hold in storage values after the sector gears 188 have been restored to normal position. By suitable operation of the gears 337, 338 and 340, the movements of the sector gears 33 may be gear transmitted to the sector gears 188 and movements of the sector gears 188 may be transmitted through the gear systems involving the gears 337, 338 and 340 to the accumulator 390. Also by operation of the gears 337, 338 and 340 in the required manner, rotations of the gears in the accumulator 390 may be subsequently transmitted from the accumulator 390 to the sector gears 188 so that the sector gears 188 may be operated to an extent required to represent an amount stored in the accumulator 390.

Figure 39:
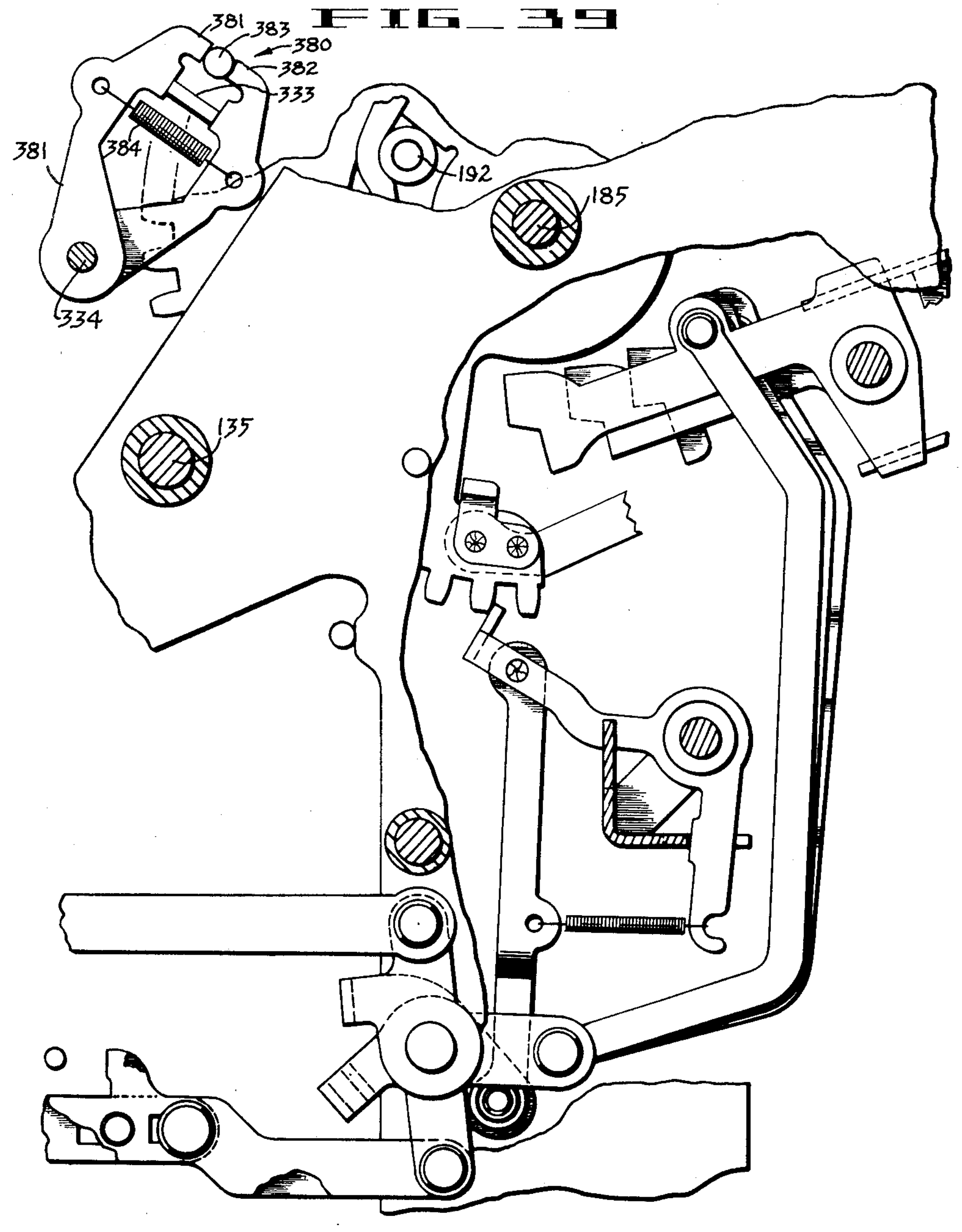
FIG. 39 is a right side view, partly in section, of a portion of the computing apparatus and discloses some of the pendent transmission gear mechanism.

The mechanism which resiliently urges the pendent transmission gear mechanism 330, FIG. 16, to its neutral position in which its gears 340 are clear of both the selector sectors 33 and the accumulator drive gears is illustrated in FIG. 39 and generally indicated at 380. This mechanism comprises a pair of opposed jaws 381 and 382 pivotally mounted at corresponding ends on one end of the positive transmission gear shaft 334 and extending from the shaft 334 past the respectively opposite edges of the transmission shifting element 333 of the positive transmission cage. A stop pin 383 is disposed between the free ends of the jaws 381 and 382 and a tension spring 384 connected between the jaws at a location between the gear shaft and the element 333 resiliently urges the jaws toward each other and the free ends of the jaws against the stop pin 383 to hold the element 333 in its centered or neutral position. When the shifting element 333 is moved to one side or the other in consequence of rocking movement of the positive gear transmission mechanism in one direction or the other from its neutral position, the corresponding jaw 381 or 382 is forced away from the stop pin 383 tensioning the spring 384 which then resiliently urges the jaw back to its position at rest against the stop pin 383 and urges the shifting element 333 back to its position corresponding to the neutral position of the transmission gear mechanism.

Figure 24:
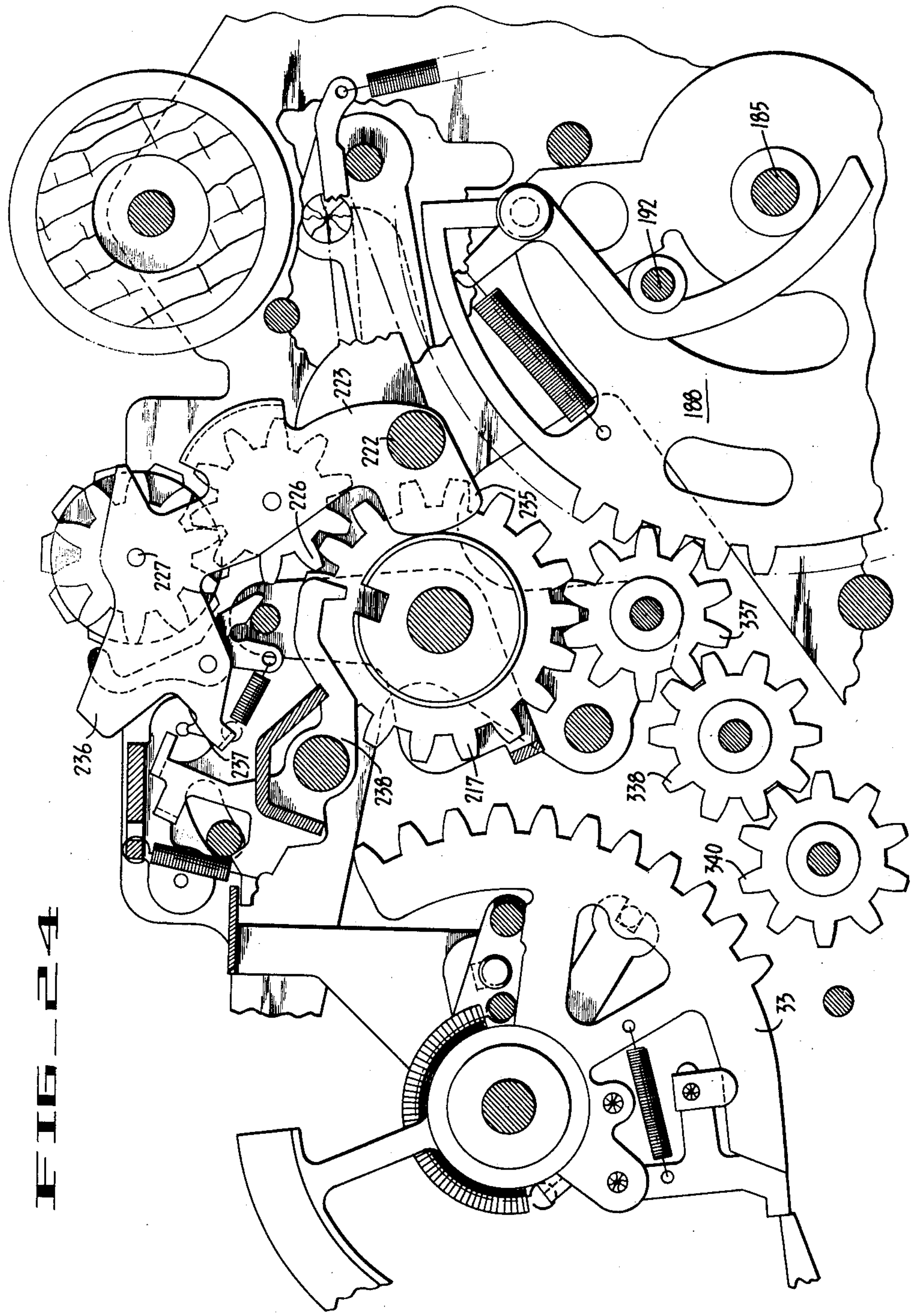
FIG. 24 is an enlarged view, partly in section, of a portion of the adding machine and shows the structure and arrangement of the zero foils.

Each of the arms 223, as shown in FIG. 24, is provided with an extension 235 directed forwardly from the pivot shaft 222 and overlying one side of the outer portion of the corresponding drive gear 217 to serve as a guide for maintaining the corresponding drive gears 217 and idler gears 226 in meshing alignment with each other. The arm 223 is also extended forwardly of the print wheel axle pin 227 as indicated at 236 and this forward extension is notched out to provide at its lower portion a latched shoulder 237 facing upwardly and forwardly. A plurality of irregularly shaped zero foil latch levers 238 equal in number to the print wheel drive gears are pivotally mounted intermediate their length on a fixed shaft which extends transversely of the machine.

*Locking Mechanism for Positive Gear Transmission*

Figure 37:
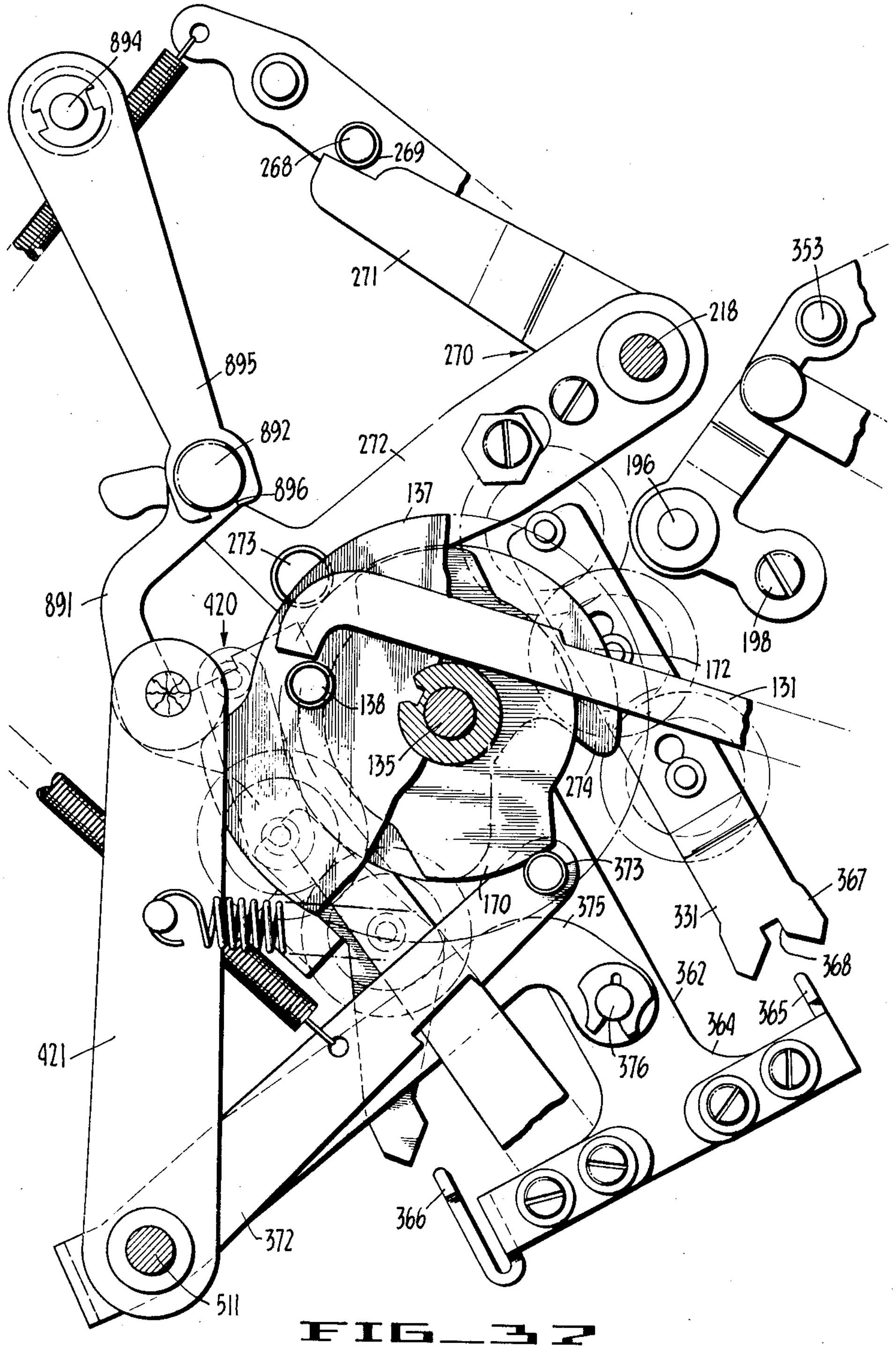
FIG. 37 is an elevational view from the left-hand side of the adding machine showing the crank for operating the return mechanism of the shiftable selector unit, the positive and negative transmission gear locking cam, the crank pin for releasing the control keys at the left-hand side of the keyboard and the print controlling cam together with the mechanism operated by the several cams.
Figure 38:
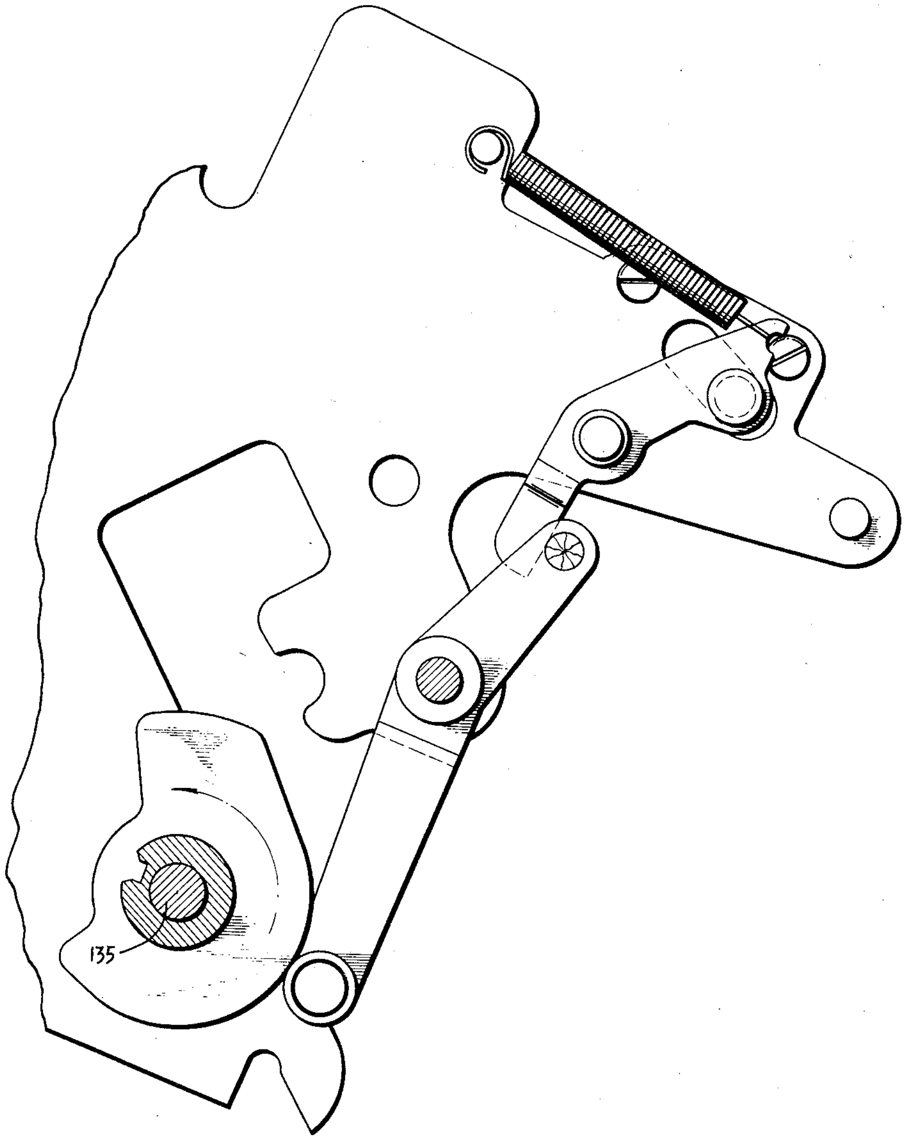
FIG. 38 is a left side elevational view of the zero foil releasing cam for the printing mechanism and the mechanism operated by this cam.

The mechanism for locking the positive gear transmission mechanism 330 in each of its three positions, that is, its position in which its gear 340, FIG. 16, is in mesh with the selector gear teeth, its neutral position, and its position in which its gear 340 is in mesh with the accumulator drive gear, as shown in FIG. 37, comprises a T-shaped locking bar 362 which inclines downwardly from the cam shaft 135. The upper end of the bar 362 is notched out to slidably receive the cam shaft 135. A crosshead 364 on the lower end of the bar extends perpendicularly to opposite sides of the bar 362 and carries at its ends teeth 365 and 366 which are directed from the crosshead 364 back along the bar 362 toward the cam shaft 135. The leg 331 of the cage of the positive transmission gear mechanism, is provided on its free end with a formation 367 of slightly increased width in which a notch 368 is formed to accomodate the tooth 365. The portions of the formation, in which the notch is provided, have inclined edges for camming the tooth 365 into the notch.

A cam following rocker arm 372 is mounted at its lower end on the rocker arm pivot shaft 511 and carries on its upper end a cam following roller 373 which rides on the peripheral edge of the transmission locking cam 170. A second lever arm 375 disposed in spaced and almost parallel relationship to the lever arm 372 is also pivotally mounted at its lower end on the shaft 511 and is pivotally connected at its upper end to the slide or locking bar 362 by a suitable pivotal connection 376. The lever arm 372 is drivingly connected to the lever arm 375 in a manner to permit the upper end of the lever arm 375 to follow the rectilinear movement of the locking bar 362 and a suitable spring connected between the machine frame and the lever arm 372, maintains the cam following roller 373 against the peripheral edge of the cam 170.

Figure 26:
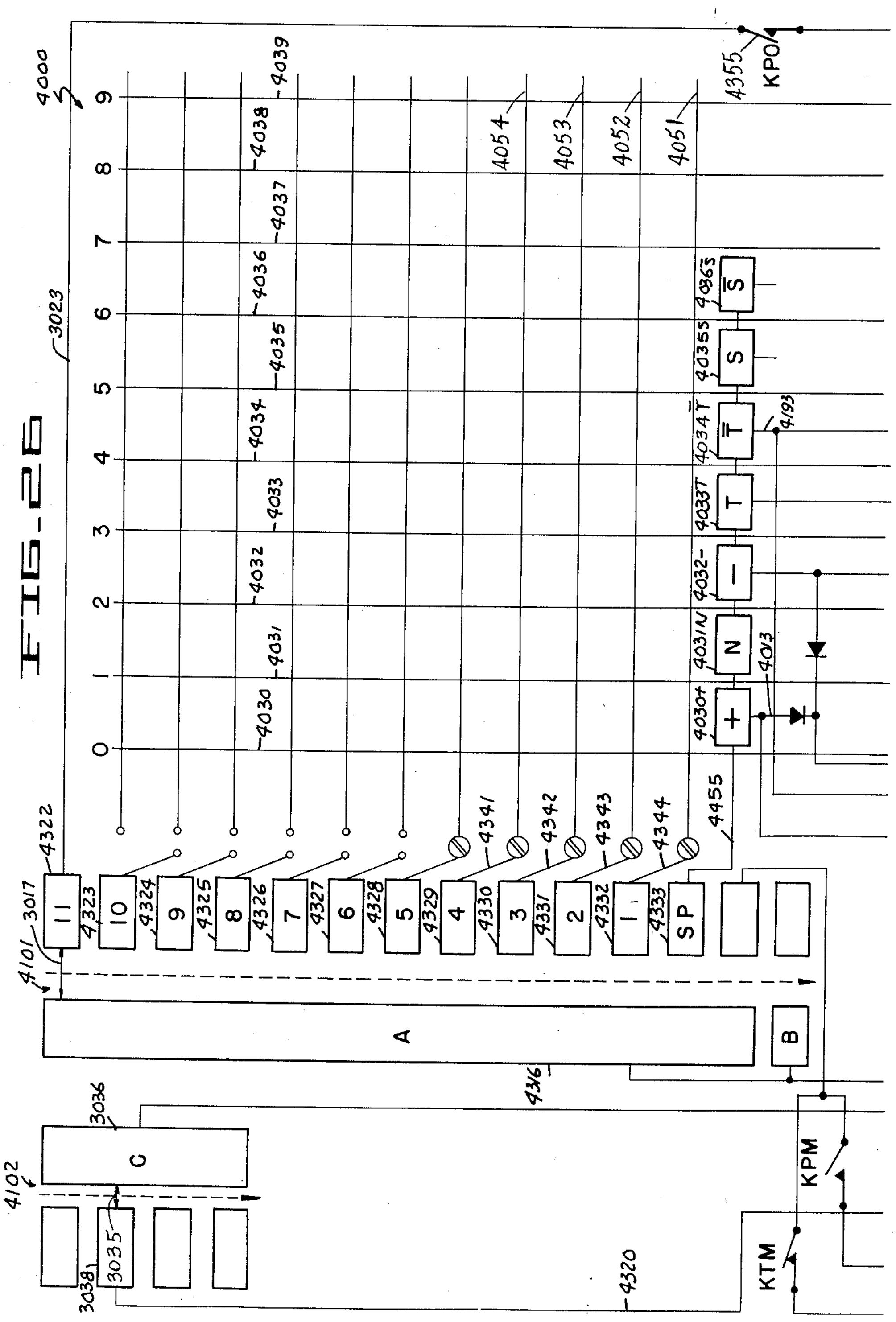
FIG. 26 shows the circuit arrangement for the commutator switches and the readout switch in the adding machine portion of the apparatus.
Figure 27:
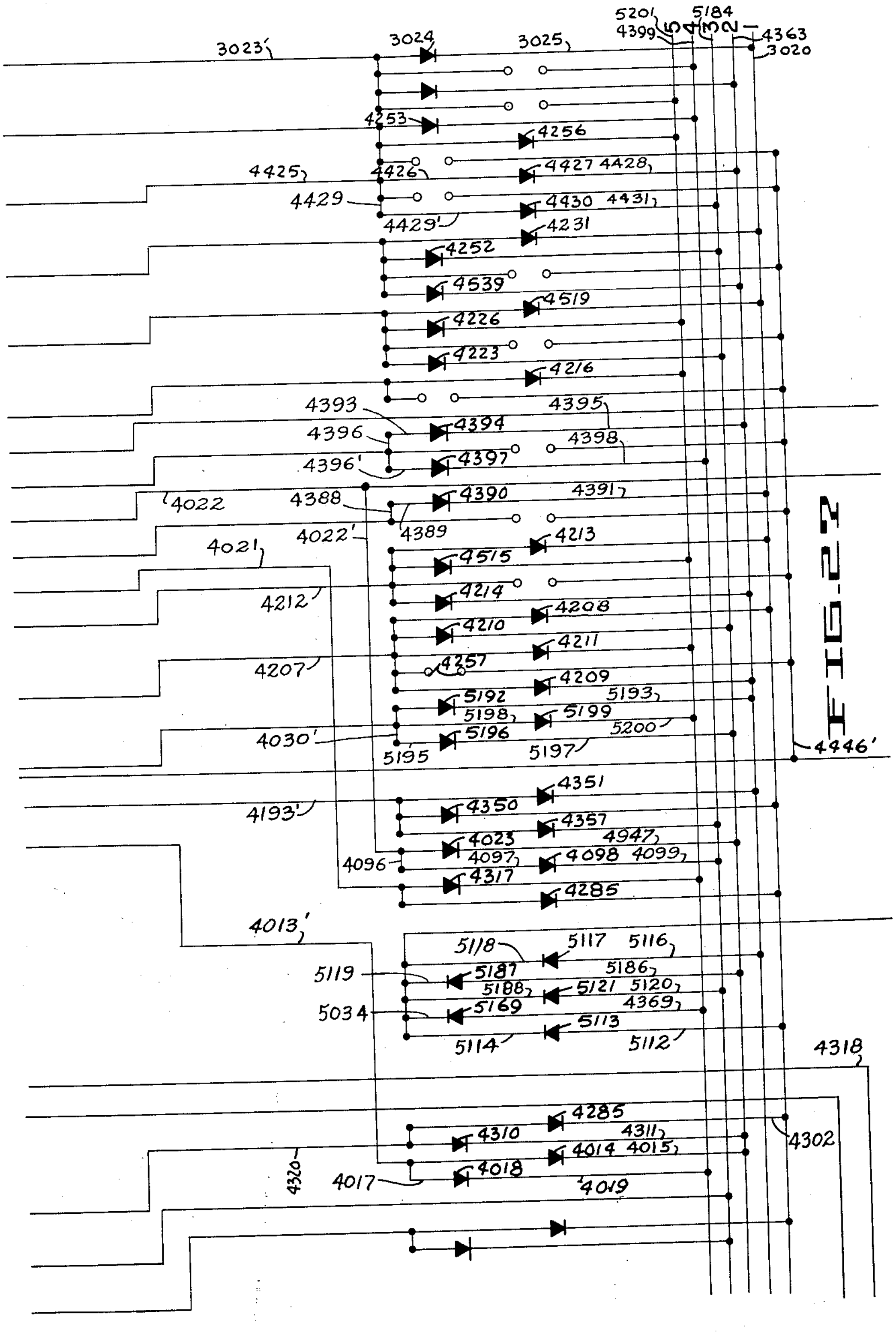
FIG. 27 shows the circuit arrangement for the diode system in the apparatus.

The sector gears 188, shown in FIG. 16, are mechanically connected to the readout switch 4000, as shown in FIG. 17, and which, as shown in FIG. 26, is included in, and forms part of, an electrical control system operable to control the operation of a tape perforator 2, shown in FIGS. 1 and 2, and which is operable to perforate a tape in accordance with a predetermined code.

Figure 23:
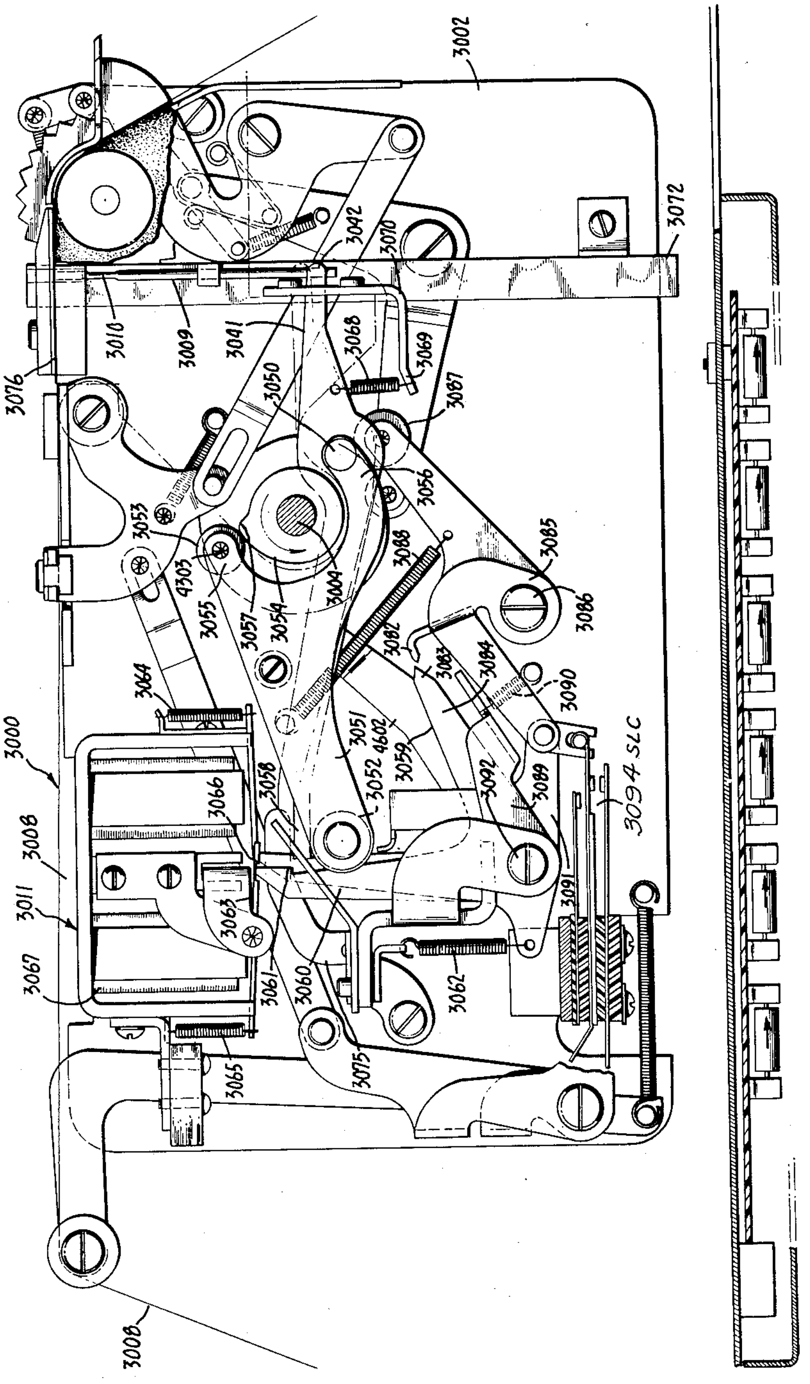
FIG. 23 is a left side elevational view, partly in section, of the tape perforating machine and with the cover removed.
Figure 25:
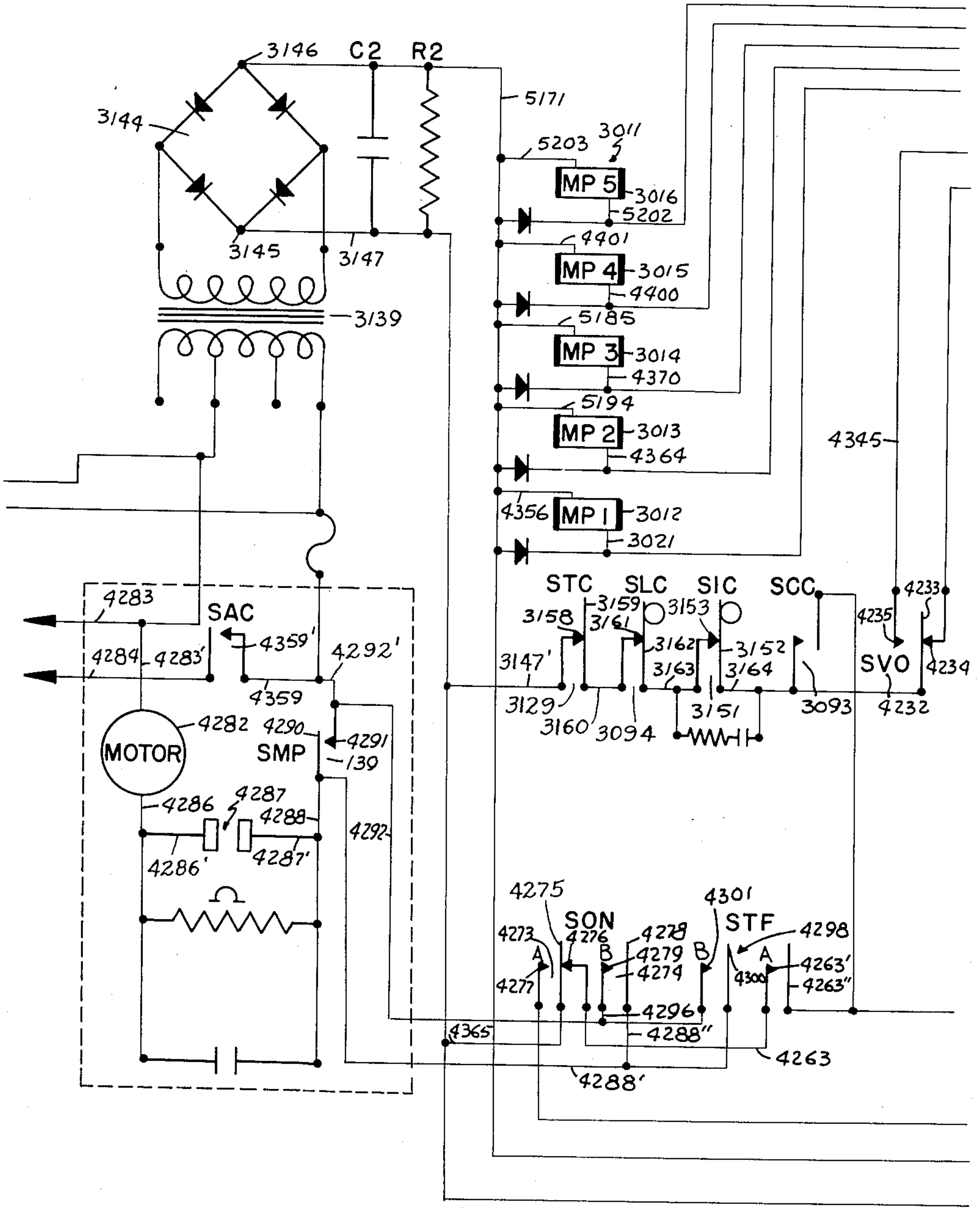
FIG. 25 shows the circuit arrangement for the power supply for the apparatus and the electromagnetic devices in the tape perforator.

The tape perforator 2 may be any suitable type of tape perforator in which electromagnetic means are employed to selectively control the operation of the punch members in the tape perforator apparatus. The number of punches provided and utilized in the tape perforator will depend on the code used. Merely for the purpose of explaining the invention and not in the sense of a limitation thereof it will be assumed that the tape perforator 2 comprises, as shown in FIGS. 23 and 25, the set 3011 of electromagnetic devices involving the electromagnetic devices 3012, 3013, 3014, 3015 and 3016.

*Readout Switch 4000*

The readout switch 4000 shown in FIGS. 17, 18 and 19 comprises two contact supporting plates 4001 and 4002 and sets of wiper contacts 4003′ and 4004′, one of each set of which is shown in FIG. 17. The contact supporting plates 4001 and 4002 are supported in spaced relation, the spacing being sufficient to accommodate the wiper contacts 4003′ and 4004′ and normally the spacing is such that the wiper contacts 4003′ and 4004′ are out of contact with the contact supporting plates 4001 and 4002. The contact supporting plate 4002 shown in FIG. 17 is upwardly movable, from the position shown, in order that the wiper contact 4003′ may be brought into engagement with the contact supporting plate 4001. When the contact supporting plate 4002 is moved upwardly to bring the contact point 4005 on the contact 4003′ against a contact in the contact supporting plate 4001, an electrical connection is formed from a contact in the contact supporting plate 4001 to a contact in the contact supporting plate 4002, the electrical connection being by way of the wiper contacts 4003′ and 4004′ which are in electrical connection with each other through a conducting body portion 4006 carried by an insulating member 4007 attached to a carriage 4008 which is movably supported in a link block 4009 along which the carriage 4008 is reciprocated.

The carriage 4008, together with the insulating member 4007 and the wiper contacts associated therewith may be moved along the link block 4009 by operation of a connecting rod 4024, one end of which is attached to the sector gear 188, the other end of the connecting rod 4024 being provided with a button 4025 extending into the space between the parallel spaced arms 4011 and 4012 of the link block 4009, the arrangement being such that when the connecting rod 4024 is moved toward the right, from the position shown in FIG. 17, the carriage 4008 is moved endwise along the link block 4009 to carry the wiper contacts 4003′ and 4004′ in a straight line movement along the space between the spaced supporting plates 4001 and 4002. It will be seen that the connecting rod 4024 is attached at one end by means of a rivet 4026 to the sector gear 188 so that when the sector gear 188 is moved in either a counter-clockwise or a clockwise direction, the connecting rod 4024 is moved to the right or left, respectively, under certain conditions. The right-hand end portion of the connecting rod 4024 terminates in an upwardly directed nose portion 4027 which extends in such position that it is adapted to engage a downwardly directed nose portion 4028 which is carried on and extends from the upwardly movable portion 4006 of the carriage assembly so that normally the carriage assembly and the right-hand end portion of the connecting rod 4024 are cooperatively latched together by the nose portions 4027 and 4028, as shown in FIG. 17. It will be seen, however, that with upward movement of the portion 4006, which occurs when the supporting plate 4002 is moved upwardly relative to the insulating supporting plate 4001, and the portion 4006 is moved sufficiently high to cause disengagement of the nose portions 4027 and 4028 on the respective connecting rod 4024 and the carriage assembly, that the connecting rod 4024 will be uncoupled from the carriage assembly so that the carriage assembly and the wiper members carried thereby are released from backward movement of the connecting rod 4024 when the sector gear 188 is moved in a clockwise direction and the carriage assembly is restrained against following the connecting rod 4024 in a left-hand movement. The wiper contacts 4003' and 4004' may, therefore, be moved outwardly over the fixed contacts of the switch to an extent determined by the counter-clockwise movement of the sector gear 188 and may be left in the outward thrust position, the connecting rod 4024 being in this case, uncoupled from the carriage assembly to permit the sector gear 188 and the connecting rod 4024 to return to the normal starting position shown in FIG. 17.

The contact supporting plates 4001 and 4002 form, in effect, two sides of the circuit, included in which are commutator switches 4101 and 4102, shown in FIGS. 9, 11, 12 and 26. The readout switch 4000 and the commutator switches 4101 and 4102 cooperatively function to selectively control the operations of the electromagnetically operable punch controlling members in the tape perforator 2.

*Contact Supporting Plates of the Switch 4000*

Figure 20:
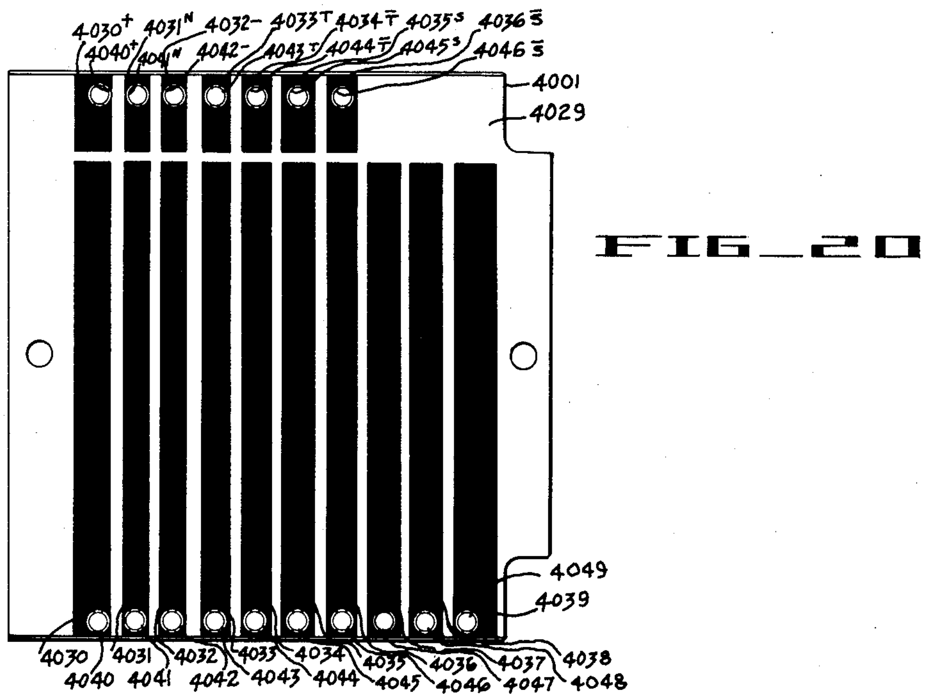
FIG. 20 shows an upper contact structure in the readout switch.

As shown in FIG. 20, the contact supporting plate 4001 is an apertured sheet 4029 of insulating material bearing conducting strips 4030, 4031, 4032, 4033, 4034, 4035, 4036, 4037, 4038 and 4039, the conducting strips 4030 to 4039, inclusive, being located on one face of the insulating sheet 4029 and being in parallel spaced relationship, the spacing of the conducting strips being sufficiently wide to completely insulate one conducting strip from the other. The conducting strips 4030 to 4039, inclusive, terminate at one end in apertured end portions which, as shown in FIGS. 17 and 20, are in mechanical and electrical connection with tubular terminals 4040, 4041, 4042, 4043, 4044, 4045, 4046, 4047, 4048 and 4049, respectively, which serve as jacks and into which pin-type terminals on conductor wires, not shown, or bared conductor wires, may be connected by thrusting the pin-type terminals, or bared conductor wires, selectively into the tubular terminals as required. The contact supporting plate 4001 is provided, also, with contact segments, identified as 4030+, 4031N, 4032−, 4033T, 4034$\overline{\text{T}}$, 4035S, and 4036$\overline{\text{S}}$, which are in register with, but not connected to the conducting strips 4030, 4031, 4032, 4033, 4034, 4035 and 4036, respectively. The contact segments 4030+, 4031N, 4032−, 4033T, 4034$\overline{\text{T}}$, 4035S and 4036$\overline{\text{S}}$ terminate in tubular terminals 4040+, 4041N, 4042−, 4043T, 4044$\overline{\text{T}}$, 4045S and 4046$\overline{\text{S}}$, respectively.

Figure 21:
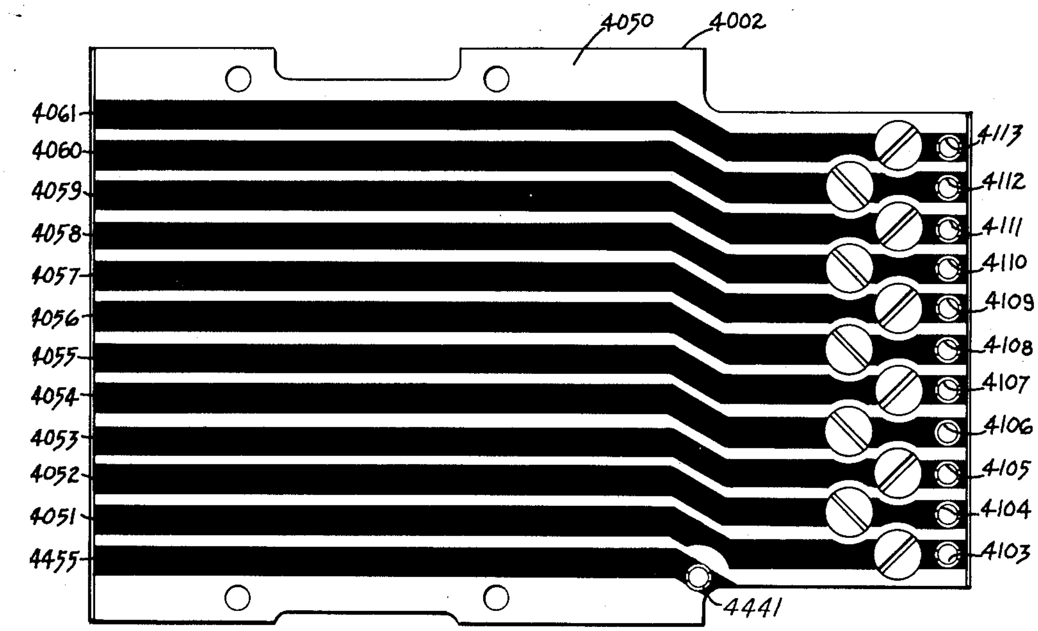
FIG. 21 shows the lower contact structure in the readout switch, the contact members running in a direction 90° with respect to those shown in FIG. 20.

The contact supporting plate 4002 is constructed somewhat like the contact supporting plate 4001, and as shown in FIG. 21, comprises an insulating sheet 4050 bearing on the one face conducting strips 4455, 4051, 4052, 4053, 4054, 4055, 4056, 4057, 4058, 4059, 4060 and 4061 which are spaced-apart sufficiently for complete insulation of one conducting strip relative to another. The conducting strips 4051 to 4061, inclusive, terminate at one end in apertured end portions in which are supported, as shown in FIG. 21, tubular terminals 4103, 4104, 4105, 4106, 4107, 4108, 4109, 4110, 4111, 4112 and 4113, respectively, and into which pin-type terminals on conductor wires, not shown, or bared conductor wires may be inserted as required to electrically connect the conducting strips 4051 to 4061, inclusive, to required parts of the electrical control system. The conducting strip 4455 is shorter than other conducting strips on the plate 4002 and is provided with the tubular terminal 4441.

The conducting strips 4030 to 4039, inclusive, in the plate 4001, extend in a direction at 90° from the direction of extension of the conducting strips 4051 to 4061, inclusive, in the contact supporting plate 4002, so that the conducting strips 4051 to 4061, inclusive, in effect, cross under the conducting strips 4030 to 4039, inclusive, and the arrangement is such that the conducting strips 4455, 4051 to 4061, inclusive, extend as shown in FIGS. 17, 18 and 19 and in parallel spaced relation with the link blocks 4009, 4083, 4084, 4085, 4086, 4087, 4088, 4089, 4090, 4091, 4092, and 4095, respectively.

The sector gear 188, shown in FIG. 17, is only illustrative of one of the many sector gears employed in the readout switch 4000, such, for example, as the sector gears shown in FIG. 18 and comprising the sector gears 4178, 4179, 4180, 4181, 4182, 4183, 4184, 4185, 4186, 4187, 4188 and 4189 to provide one sector gear in the readout switch 4000 for each ordinal position in the adding machine portion of the apparatus of this invention. It will be understood, therefore, that for each ordinal position in the adding machine portion of the apparatus, there is a sector gear such as 33, shown in FIG. 16, a set of gears 337, 338 and 340, and a corresponding sector gear such as 188. The sector gears 4178 to 4189, inclusive, shown in FIG. 18, are in the readout switch 4000 and correspond to the single representation of the sector gears shown at 188 in FIG. 17. When the gear 340, shown in FIG. 16, is in engagement with the sector 33 and the sector gear 188 is by operation of the bail 192 caused to rotate in a counter-clockwise direction, as viewed in FIGS. 16 and 17, the sector gear 188 is rotated in a counter-clockwise direction to the extent permitted by the setting of the sector gear 33 and is effective to thrust the connecting rod 4024 toward the right to move the wiper contacts 4003' and 4004' toward the right. The extent of thrust is in accordance with the degree of rotation of the sector gear 33 to normal position and which degree of rotation is in accordance with the value represented by the key 17 manually operated in the selecting mechanism in the adding machine.

Subsequent to the movement of the wiper contacts 4003' and 4004', to the right from the position shown in FIG. 17, the lower insulating supporting plate 4002 is raised to make contact with the wiper contact 4004' and to lift the wiper contact 4003' so that the contact point 4005 comes into engagement with the insulating supporting plate 4001. The wiper contact 4004', as shown in FIG. 17, is flexible and has two spaced contact points 4093 and 4094 operable to ride along or rest on a conducting strip, such as the conducting strips 4455 or 4051, on the insulating supporting plate 4002. The raising of the insulating supporting plate 4002 is sufficient to bring the wiper contacts into engagement with the associated contacts of the insulating supporting plates 4001 and 4002 and is also sufficient to disengage the nose portions 4027 and 4028 and thus uncouple the connecting rod 4024 from the carriage 4008 so that the sector gear 188 may be rotated clockwise to the position shown in FIG. 17 without pulling the wiper contacts to the left from the position they were set in by the counter-clockwise rotation of the sector gear 188 and the consequent right-hand thrust of the connecting rod 4024. It will be seen, therefore, that the wiper contacts 4004', 4004, 4063, 4064, 4065, 4066, 4067, 4068, 4069, 4070, 4071 and 4072 are thrust outwardly along and in parallel relation with the conducting strips 4455, 4051, 4052, 4053, 4054, 4055, 4056, 4057, 4058, 4059, 4060 and 4061, respectively, the extent of outward thrust being, in each case, in accordance with the extent of counter-clockwise rotation of the sector gear, such for example, as the sector gear 188 shown in FIG. 17. It will also be seen that the wiper contacts 4003', 4003, 4073, 4074, 4075, 4076, 4077, 4078, 4079, 4080, 4081 and 4082 are thrust outwardly to the same extent as the corresponding wiper contacts 4004', 4004, 4063, 4064, 4065, 4066, 4067, 4068, 4069, 4070, 4071 and 4072. The wiper contacts 4003', 4003, and 4073 to 4082, inclusive, however, are thrust transversely of the relatively fixed conducting strips 4030 to 4039, inclusive, so that when the supporting plate 4002 is raised to bring the conducting strips into engagement with the lower set of wiper contacts, and to bring the upper set of wiper contacts into engagement with the conducting strips on the supporting plate 4001, the readout switch 4000 will be in a closed condition and operating to electrically connect selected conducting strips on the upper supporting plate 4001 with selected conducting strips on the lower supporting plate 4002, the electrical connections being by way of the wiper contacts of the switch 4000 and the selection being in accordance with amounts accumulated in the computing apparatus 1.

The lower supporting plate 4002, as shown in FIGS. 17, 18 and 19, is supported on a base portion 4116 of a movable support 4117 comprising spaced upright arms 4118 and 4119 which extend upwardly from the base portion 4116. The upright arms 4118 and 4119 are arranged in parallel spaced relation and provide, in effect, supporting arms for the base portion 4116 which is disposed between spaced intermediate frame plates 4120 and 4121 extending lengthwise of the apparatus and which occupy the same relative positions and perform the same functions as the intermediate frame plates 186 and 187 found in the ten-key adding machine described in the afore-mentioned application, S.N. 469,128, now Patent No. 2,861,739. The frame plates 4120 and 4121, in the present invention, in addition to their other supporting functions, serve as supports for the readout switch 4000. The lower portion of the readout switch 4000 and involving the movable support 4117 has rollers 4122 and 4123 supported on pins 4124 and 4125 extending outwardly from the upright arms 4118 and 4119, respectively. The rollers 4122 and 4123 extend into rectangular apertures 4126 and 4127 formed in the intermediate frame plates 4120 and 4121, respectively. The rollers 4122 and 4123 extend also into rectangular apertures 4128 and 4129 formed in the bellcrank levers 4130 and 4131, respectively, which are pivotally supported on the rod 4132 mounted in and cooperatively supported by the intermediate frame plates 4120 and 4121. Ends of the rod 4132 extend beyond the frame plates to serve as supports for the groups of levers comprising the levers 4130 and 4133 on the right-hand side of FIG. 18 and the levers 4131 and 4135 shown on the left side of FIG. 18 and in FIG. 19.

*Closing of the Contacts in the Switch 4000*

The levers 4130 and 4131 are operable through their springs 4137 to raise the movable support 4117 in the switch 4000 at required times so that the upper and lower contacts of the switch will be selectively in electrical connection through the wiper contacts of the switch.

Figure 14:
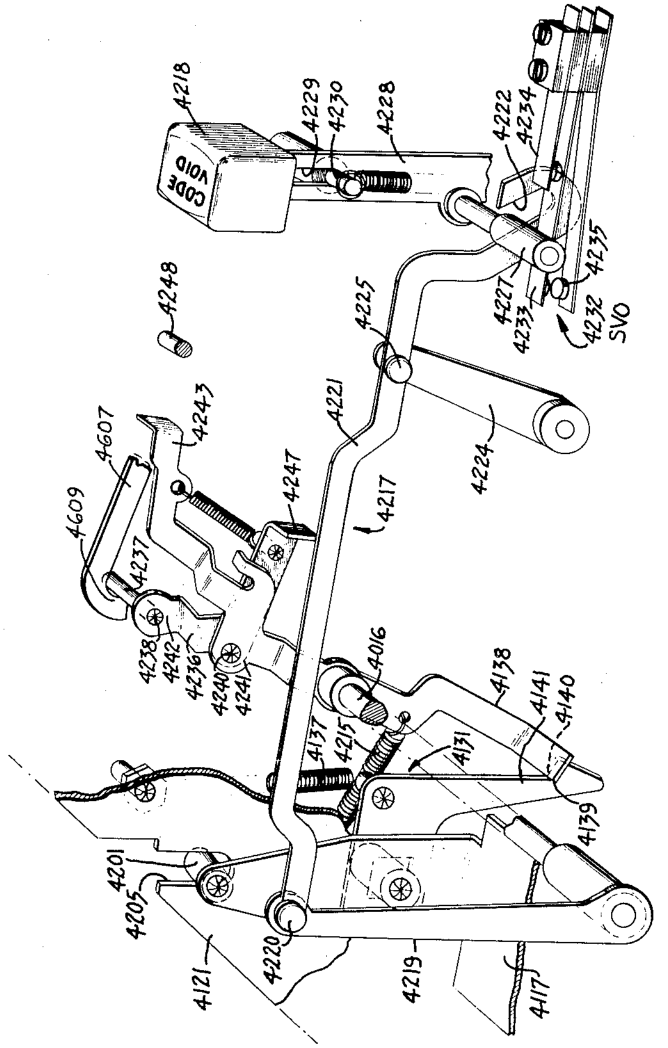
FIG. 14 shows in plan view a single pole double throw switch operated by means of a manually operable key and a lever system extending from the manually operable key to mechanically operate corresponding parts in the adding machine apparatus.
Figure 22:
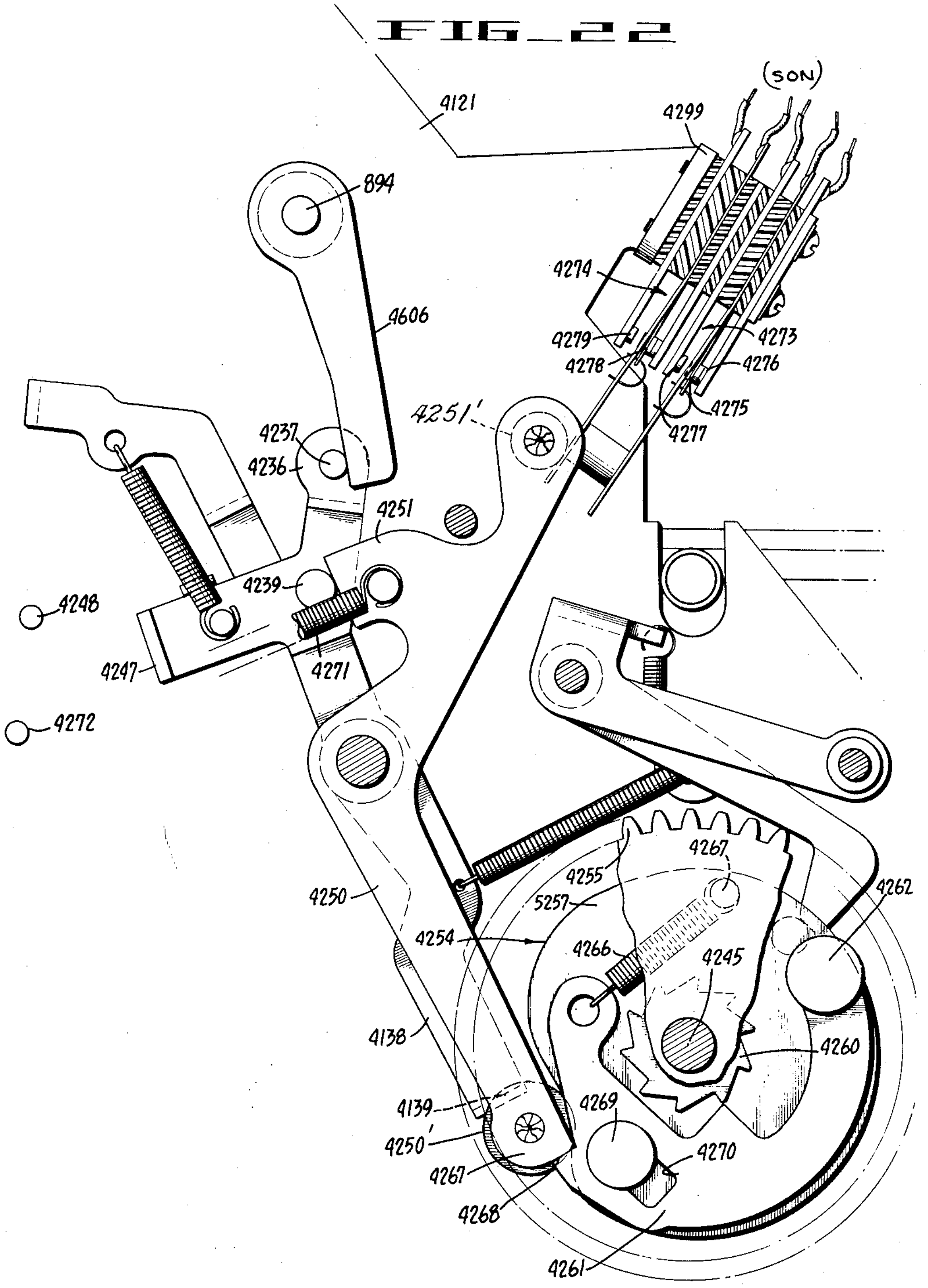
FIG. 22 is an enlarged side view of a portion of the adding machine with the readout switch and shows a latch arrangement for controlling the operation of the readout switch and also shows a clutch arrangement and a lever for operating the off-normal switch members.

The lever 4131 is normally latched against operation, the latch structure involving, as shown in FIGS. 14, 19 and 22, the latch lever 4138 having its lower corner 4139 extending into a notch 4140 formed in the lower portion of an arm 4141 of the lever 4131. When the latch lever 4138 is withdrawn from engagement with the notch 4140, the lever 4131 is rotated on its pivotal point of support on the rod 4132 in a clockwise direction by means of its spring 4137, the spring 4137 being normally under tension and having one of its ends secured to the lever 4131, as shown at 4142, while the other end of the spring 4137, shown in FIG. 19, and a like spring on the other side of the switch structure attached to the lever 4130 are tensioned at all times and are strong enough to lift the movable support 4117 when the latch lever 4138 is removed from engagement with the arm 4141 of the lever 4131 and when the cams 4144 and 4192 are in position to permit closing of the switch 4000. Lifting of the movable support 4117 wil bring the conducting strips on the lower plate 4002 into engagement with the movable contacts on the portions of the insulating members supported on the carriages such, for example, as the carriage 4008. The lifting of the lower supporting plate 4002 will also be sufficient to bring the contact point 4005 of the wiper contact 4003' into engagement with the contact supporting plate 4001 and so that the contact point 4005 of the wiper contact 4003' will be in contact with a selected one of the conducting strips 4030 to 4039, inclusive.

It will be seen that by suitable operation of the sector gears 188, the carriages 4008 may be selectively moved along the link block 4009 to required positions relative to the required contacts on the contact supporting plates 4001 and 4002 and that the movable plate 4002 may be upwardly moved to bring the contacts on the lower plate 4002 into engagement with the lower wiper contacts carried by the carriages and that the upper contacts on the carriages may be brought upwardly into engagement with the conducting strips on the contact supporting plate 4001. Also, that the carriages may be uncoupled from the connecting rods to leave the carriages in adjusted positions along the link blocks when the wiper contacts are pressed against the contact supporting plates 4001 and 4002.

*Opening of the Contacts in the Switch 4000*

The switch 4000 is operated to an open condition by means of cams 4144 and 4192 mounted on a rotatable power shaft 4245. Each cam 4144 and 4192 has a high spot thereon operable to engage an associated bellcrank lever, the cam 4144 being operable to engage the bellcrank lever 4131 simultaneously with the engagement of the bellcrank lever 4130 by the cam 4192. For example, the cam 4144 has a high spot 4145 operable to engage a roller 4146 supported on a pin 4147 mounted on and extending from a right-hand arm portion 4148 of the lever 4131. The cam 4192 has a high spot in register with the high spot 4145 and operable to engage the roller 4206 on the bellcrank lever 4130. When the power shaft 4245 is rotated to bring the high spots on the cams 4144 and 4192 into engagement with the rollers 4146 and 4206, respectively, levers 4131 and 4130 are rotated counterclockwise on their common pivotal support, as viewed in FIGS. 18 and 19, to make the upper portions of the apertures 4129 bear downwardly on the rollers 4122 and 4123 to force the movable support 4117 and the lower contact supporting plate 4002 downwardly against the action of the springs 4137 until the lower corner 4139 of the latch lever 4138 moves under the urgency of spring 4215 into the notch 4140 of the lever 4131. At this stage of the operation the high spot 4145 of the cam 4144 passes beyond the position of the roller 4146 and will not affect the position of the lever 4131 until the latch lever 4138 is again operated to release the lever 4131 for upward movement under the force of the spring 4137.

*Restoring of the Movable Contacts and Carriages in the Switch 4000*

The carriages 4008, as shown in FIG. 17, are normally in the left-hand portion of the switch 4000. This is the home position for the movable wiper contacts of the switch. When the wiper contacts are moved to the right from the position shown in FIG. 17 and, for example, to the position shown in FIG. 19, the wiper contacts, upon opening of the switch, may be restored to home position by operation of a bail 4149 which is cyclically operated to insure that the wiper contacts are restored to home position after the amounts computed in the computer apparatus have been electrically represented in the positioning of the movable contacts in the switch and the electrical record in the switch 4000 has been, in effect, read out of the switch.

The bail 4149 comprises two bow-shaped arms 4150 and 4151 curving rearwardly and upwardly from, and mounted on the shaft 4152 supported by and extending through apertured plates 4153 and 4154, end portions of which are riveted or otherwise secured to the frame plates 4120 and 4121, respectively. The apertured plates 4153, 4154 are additionally apertured to accommodate the power shaft 4245. Shaft 4152 is rotatable and has pinion gears 4155 and 4156 secured to its ends to facilitate its rotation by means of the levers 4133 and 4135, respectively, which have toothed end portions 4157 and 4158 in engagement with the respective pinions 4155 and 4156. The levers 4133 and 4135 are pivotally supported on the rod 4132 and are operable by means of their return springs 4159 and 4160, respectively, to return the bail 4149 to the position shown in FIG. 17, subsequent to operation of the bail 4149 to a position to the left of that shown in the figure. The return springs 4159 and 4160 extend from anchorage posts 4161 and 4162 supported in the frame plates 4120 and 4121 to the hook-shaped upper end portions 4163 and 4164 of the respective levers 4133 and 4135.

Extending between the bow-shaped arms 4150 and 4151 and completing the bail structure 4149 is a bar 4165, as shown in FIG. 18. The bar 4165 has reduced diameter end portions 4166 and 4167 extending into elongated slots 4168 and 4169 formed in the upper end portions 4170 and 4171 of the respective bow-shaped arms 4150 and 4151. The bar 4165 extends transversely through the elongated apertures 4172 formed in the link blocks 4009 so that when the bail 4149 is operated the bar 4165 will move back and forth in each link block 4009 as required. The function of the bail 4149 is to restore the wiper contacts in the switch 4002 to the home position, as shown in FIG. 17, when the wiper contacts have been previously moved to a position to the right of the position shown in FIG. 17, such, for example, as the position of the wiper contact 4003' shown in FIG. 19. The restoring of the wiper contacts to the home position is accomplished by operating the bail 4149 so that the bar 4165 is moved to the left of the position shown in FIG. 19, and until all the carriages 4008 have been engaged by the bar 4165 and are in the position shown in FIG. 17.

The leftwardly extending arm portion 4175 of each bellcrank lever 4133 and 4135 terminating at its free portion in a downwardly directed end 4176, as shown in FIG. 19, in the case of the lever 4135, is engageable by a roller 4177 mounted on an eccentrically positioned pin 4190 extending from the major plane surface of the cam 4144. A like roller 4191 on the cam 4192 is operable to engage an arm portion on the bellcrank lever 4133, the cams 4192 and 4144 being operable to operate the levers 4133 and 4135, respectively, to rotate the pinions 4155 and 4156, respectively, counter-clockwise, as viewed in FIG. 19, and thus cause the bail 4149 to thrust the bar 4165 toward the left from the position shown in FIG. 19 to push any carriages 4008 back to the position shown in FIG. 17. The return of the carriages 4008 to the position shown in FIG. 17 is accomplished at a time when the contact supporting plate 4002 is in its relatively low position and the upper wiper contacts such, for example, as the wiper contact 4003' are not in contact with the upper contact supporting plate 4001.

Return of the bail 4149 to the position shown in FIGS. 17 and 19 occurs immedately following the restoration of the carriages 4008 to the home position and is accomplished through the operation of the springs 4159 and 4160 which are constantly urging the lower ends of the rack levers 4133 and 4135 toward the right, as viewed in FIG. 19. When the cams 4192 and 4144 are rotating and the rollers 4190 and 4191 thereon pass beyond the free ends of the respective bellcrank levers 4133 and 4135, the springs 4159 and 4160 are free to move the lower ends of the bellcrank levers 4133 and 4135, respectively, toward the right, as viewed in FIG. 19, to rotate the pinions 4155 and 4156 in a clockwise direction to operate the arms 4150 and 4151 outwardly to restore the bar 4165 to the position shown in FIG. 19.

*Recoupling of Connecting Rods to Carriages in the Switch 4000*

When the carriages 4008 are being moved to the position shown in FIG. 17, the nose portions 4028 on the carriage assemblies 4008 come into engagement with the nose portions 4027 such that the curved portion of the nose portion 4028 comes into contact with the curved portion of the nose portion 4027 on the connecting rod 4024 and under the thrust of the bail 4149 and the rod 4165 the nose portions 4027 and 4028 cooperate to cam the nose portion 4028 of the carriage assembly 4008 upwardly to permit the carriage to be moved to the left so that the nose portion 4028 again slightly drops to bring the nose portions 4027 and 4028 into the positions shown in FIG. 17 with the nose portions cooperating to couple the carriage 4008 to the connecting rod 4024.

The main support for the switch 4000 comprises, as shown in FIGS. 17 and 18, a U-shaped bracket 4194 having apertured upwardly extending arms 4195 and 4196 and an apertured body portion 4197 through which cap screws 4198 or other suitable fastening means extend into the insulating sheet 4029 to hold the insulating sheet 4029 to the bracket 4194, the apertured arm portions 4195 and 4196 of which are secured to the frame plates 4120 and 4121 by means of bolts 4199, or other suitable fastening means.

The movable support 4117 is supported by means of the levers 4130 and 4131 in which are respectively formed apertures 4128 and 4129 to receive the respective rollers 4122 and 4123 which extend from the upright arms 4118 and 4119, respectively, and through apertures 4126 and 4127 formed in the respective frame plates 4120 and 4121. On the upper ends of the arms 4118 and 4119 rollers 4200 and 4201 are supported on pins 4202 and 4203 extending from the respective arms 4118 and 4119. The rollers 4200 and 4201 fit into open end slots 4204 and 4205 formed in the frame plates 4120 and 4121, respectively. By virtue of the rollers 4200 and 4201 on the upper portions of the movable support 4117 and operating in the slots 4204 and 4205, the upper portion of the movable support 4117 is steadied and guided in excursions of the movable support 4117 in the frame structure of the computing apparatus.

When the latch lever 4138 is in the position shown in FIGS. 14, 19 and 22, the bellcrank levers 4130 and 4131 which are supported on the shaft 4132 are held in such position that the cams 4192 and 4144 are ineffective to rotate the levers 4130 and 4131, respectively. Under this condition the levers 4130 and 4131 are held down against the action of the springs 4137 and the movable support 4117 will be kept down to maintain the switch 4000 in an open condition.

At the end of each cycle the latch lever 4138 is normally held in latching position, as shown in FIGS. 14 and 19, to hold the lever 4131 down and thus prevent raising of the lower portion of the switch 4000, the lever 4138 being urged to the position indicated by means of the spring 4215, one end of which is attached to the lever 4138 while the other end is attached to the pin 4162 mounted in and extending from, the frame plate 4121. As shown in FIG. 14, the latch lever 4138 is pinned to a rotatable shaft 4016 which is supported in, and extends through, the apertured frame plates 4120 and 4121. The shaft 4016 is operable to be rotated by means of a lever system 4217 extending between the rotatable shaft 4016 and a manually operable void key 4218. The lever system 4217 comprises a lever 4219 having one end portion pinned to the shaft 4016 and the other end portion pivotally connected at 4220 to a link 4221, the far end of which is formed into a hook portion 4222 engageable by a pin 4227 extending from a stem 4228 of a manually operable void key 4218, the stem 4228 being apertured at 4229 to accommodate a supporting pin 4230 extending from the frame plate 4120, not shown in FIG. 14 but visible in FIG. 18. The link 4221 in FIG. 14 is partially supported by a pivotally supported arm 4224 having pin connection at 4225 with the link 4221. Depression of the void key 4218 from the position shown in FIG. 14 will operate to cause the latch lever 4138 to swing away from the lever 4131. In this operation, the downwardly thrust stem 4228 operates to move the pin 4227 into engagement with the hook portion 4222 to cam the link 4221 toward the left and move the lever 4219 to rotate the shaft 4016 counter-clockwise. Counter-clockwise rotation of the shaft 4016 releases the latch lever 4138 from engagement with the lever 4131, the latch lever 4138 being moved against the action of the restoring spring 4215. Upon reelase of the latch lever 4138 from engagement with the lever 4131, the springs 4137 will operate to cause movement of the movable support 4117 of the readout switch 4000 upwardly from the position shown in FIGS. 14 and 17, to close the switch so that the wiper contacts will be in engagement with the contact supporting plates 4001 and 4002, as required.

Pivotally supported on the upper portion of the latch lever 4138, as shown in FIG. 14, is a releasing lever 4236 carrying a pin 4237, which is secured at 4238 and extends from the opposite face of the lever 4236 which is pivotally supported on a pin 4239, not shown in FIG. 14, but which is supported at 4240 and projects from an enlargement 4241 formed on the lever 4138. From its pivotal point of support, the lever 4236 extends crosswise of the lever 4138 and has an upwardly extending portion 4242 extending in spaced relation with an upwardly extending portion 4243 of the lever 4138. The lower end of the lever 4236 terminates in an angularly bent portion 4247 which is normally maintained in the path of movement of the pin 4248 extending from a plate 4249, shown in FIG. 35 as being mounted on a cam 820 mounted on the actuator bail shaft 185, shown in FIG. 35. A lever 825, shown in FIG. 35, is mounted on the shaft 807 and has angularly extending arms including a forwardly directed arm 826 and a rearwardly directed arm 827 carrying near its distal end a cam following roller 829 riding on the edge of the cam lobe 821.

Figure 35:
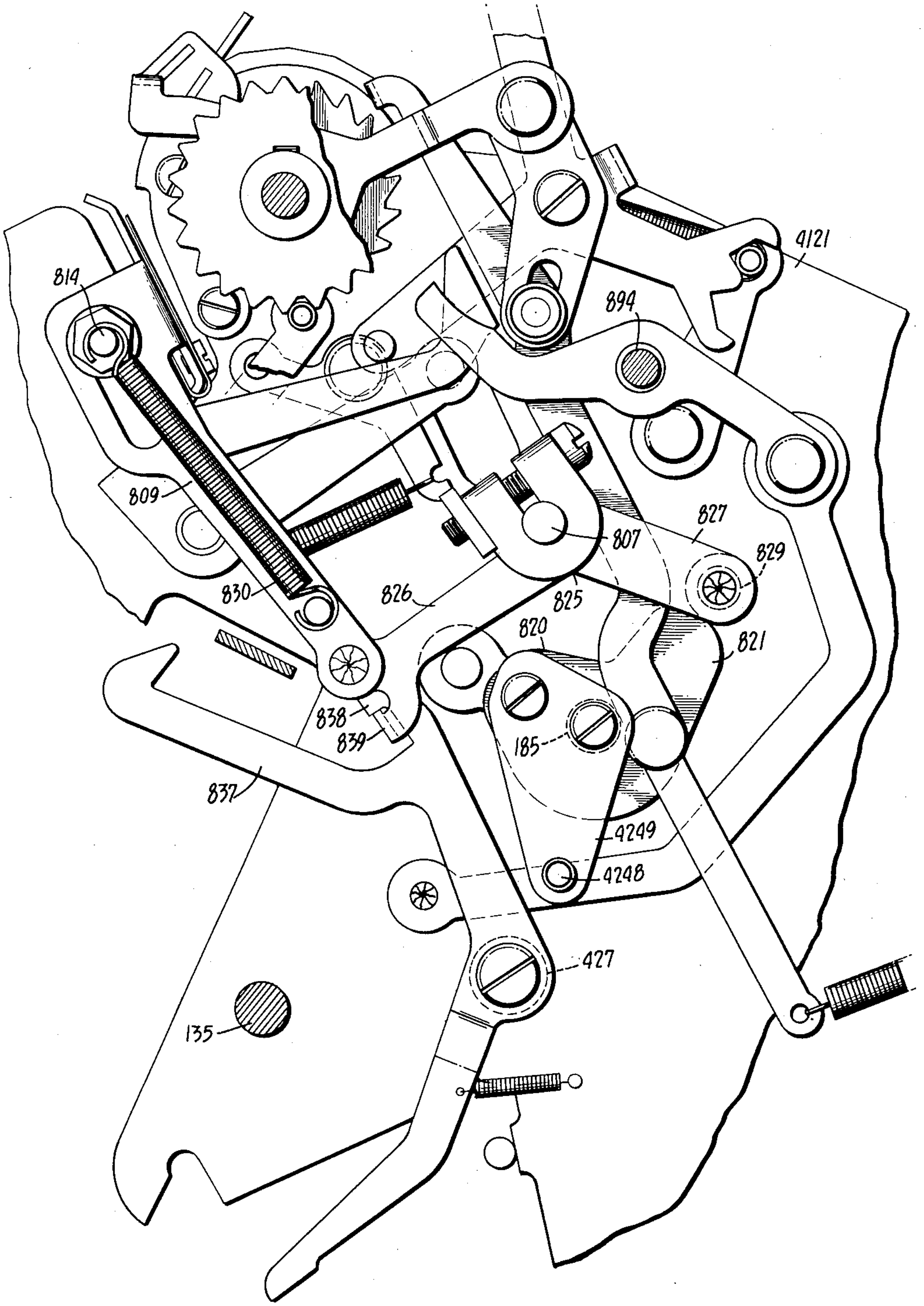
FIG. 35 is a general illustration of the ribbon shifting and tape feeding mechanism in the adding machine.
Figure 36:
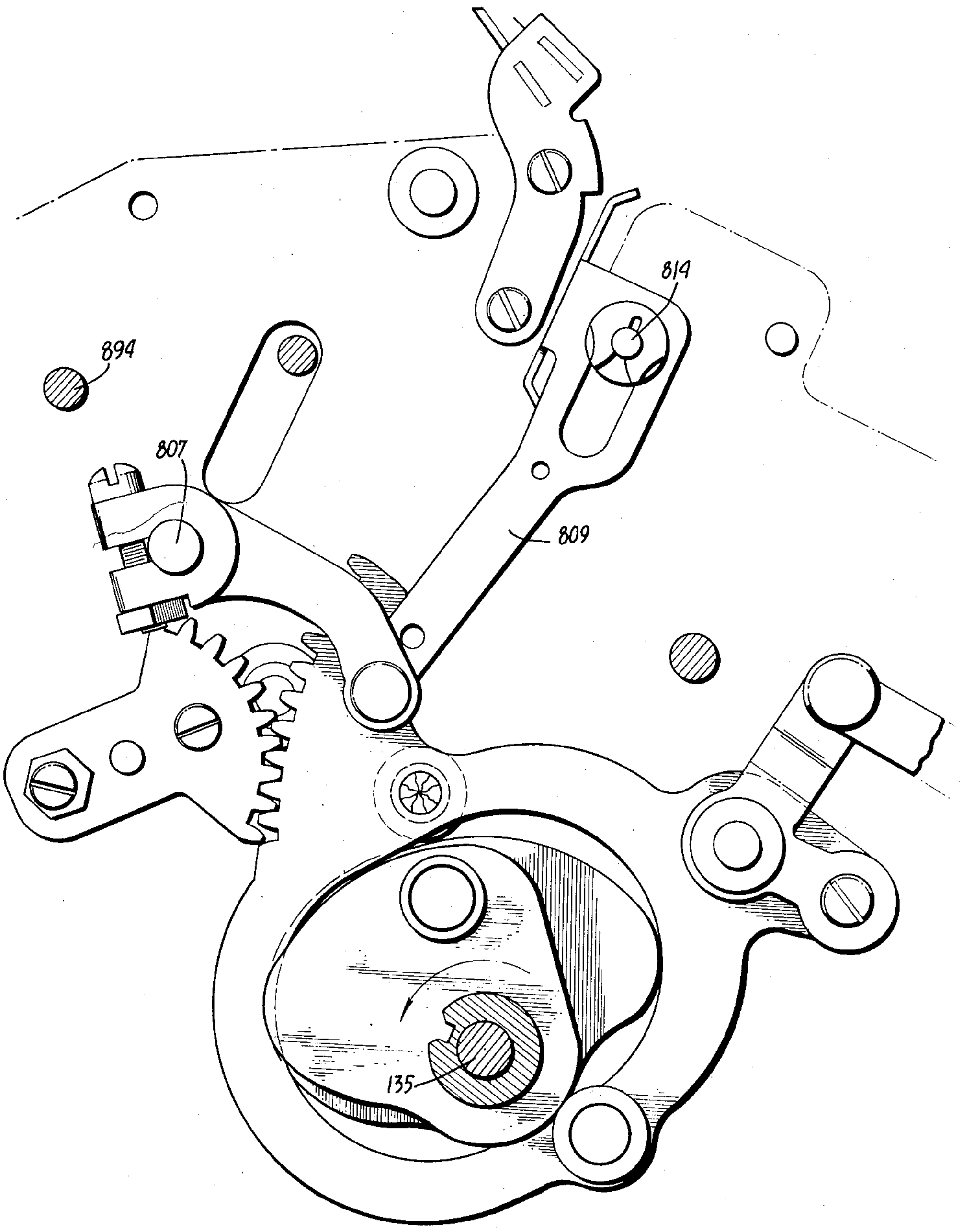
FIG. 36 is a left side view of the ribbon shifting means provided in the adding machine.

When the actuator bail 192 in FIG. 24 is moved, the shaft 185 is rotated and the cam 820 is rocked, as shown in FIG. 35, to obtain in one direction, a clockwise rotational movement of the lever 825, and in the other direction a counter-clockwise movement of the lever 825, which is attached to a ribbon shifting arm 809, equipped with a tension spring 830 connected between a stud near the distal end of the arm 826 of the lever 825 and the guide stud 814 extending transversely of the machine above and forwardly of the actuator bail shaft 185.

With this arrangement, whenever the actuator bail 192 is moved downwardly permitting, through the cam 820, a clockwise rotational movement to the lever 825, the spring 830 resiliently urges the lever arm 826 to move the ribbon shifting arm 809 upwardly to bring the lower half of the ribbon to printing position.

An elongated lever 837 is pivotally mounted intermediate its length on the right-hand end portion of the mounting shaft 427 of the negative transmission gear mechanism 420 and is longitudinally bent so that its portion above the shaft 427 is substantially upwardly directed and its portion below the shaft 427 is downwardly and forwardly directed. At a point intermediate its upper end, the lever 837 is provided with a hook formation 838 which overlies an angularly directed end portion 839 on the lever arm 826, near the distal end of this lever arm. The hook 838 engages the end portion 839 and holds the ribbon shifting mechanism against upward movement whenever a quantity is additively entered into the machine, whenever a positive total or subtotal is taken, or whenever a repeat addition cycle, a print-only cycle, or a clearing cycle is performed by the machine.

When the shaft 185, as shown in FIG. 35, is rotated counter-clockwise to bring the pin 4248 into engagement with the bent portion 4247 of the lever 4236, shown in FIG. 14, the lever 4236 and the lever 4138 are moved clockwise, as viewed in FIGS. 22 and 19, and counter-clockwise as viewed in FIG. 14, to release the latching lever 4138 from latching engagement with the arm portion 4141 of lever 4131. Engagement of the pin 4248 with the end portion 4247 of the lever 4236 causes counter-clockwise rotation of the shaft 4016, as viewed in FIG. 14, movement of the pin 4239, shown in FIG. 22, to the right against the portion 4251 of the lever 4250 and consequent movement of the lever 4250 to bring the lower end portion 4267 out of the notch 4268 in the pawl 4261.

When the "Clear Keyboard" key is operated, the shaft 894 is rotated clockwise to operate the lever 4606, shown in FIG. 22, to operate lever 4236 to swing the bent portion 4247 out of the path of movement of the pin 4248.

The plus key, the minus key and the total key in the function keys of the adding machine may be made operable to pull the lever 4236 to the right of the position shown in FIG. 14, by virtue of a link system 4607.

The clutch 4254, shown in FIGS. 9 and 22, comprises a toothed ratchet 4260 secured to the power-driven wheel 4255, a toothed pawl 4261 pivotally supported at 4262 on a cam plate 5257 having a hub 4264 secured to the shaft 4245. The pawl 4261 is a C-shaped member pivotally supported at one end and is equipped with a tooth arranged to engage in the teeth of the ratchet 4260. A spring secured at one end to the pawl 4261 and at the other end to a pin 4267 supported in and extending from the cam plate 5257 constantly urges the pawl 4261 toward engagement with the ratchet 4260. The pawl 4261 is at times held against engagement with the ratchet 4260 by the lever 4250, the lower end 4267 of which is arranged to enter a notch 4268 formed in the pawl 4261. A large headed pin 4269 is supported in the cam plate 5257 and extends through an enlarged aperture 4270 to movably support the pawl 4261 on the cam plate 5257. When the lever 4250 is operated in a clockwise direction, as viewed in FIG. 22, and to remove the lower end portion 4267 from engagement in the notch 4268, the pawl 4261 is operated by its spring 4266 to move into engagement with the ratchet 4260 so that clockwise rotational movement of the ratchet 4260 will be transmitted to the cam plate 5257. Since the ratchet 4260 is driven by means of the wheel 4255, engagement of the pawl 4261 with the ratchet 4260 will operate to transmit rotation of the wheel 4255 to the shaft 4245. The lever 4250 is operated against the action of a return spring 4271, one end of which is anchored to the body portion 4251, the other end of the spring 4271 being secured to a pin 4272 extending from the frame plate 14. The lever 4250, as shown in FIG. 22, serves as a means for controlling the operations of the switches 4273 and 4274 which are the SONA and the SONB off-normal contact switches shown in FIG. 25. The switches 4273 and 4274 are single pole switches and comprise in each case a movable contact and a relatively fixed contact, for example, as shown in FIG. 25, the switch 4273 (SONA) comprises the movable contact 4275 and the relatively fixed contacts 4276 and 4277. The switch 4274, as shown in FIG. 25, comprises the movable contact 4278 and the relatively fixed contact 4279. In the switch 4273 the left side of the switch is normally open, as shown in FIG. 25. The movable contacts 4275 and 4278 of the respective switches 4273 and 4274 are spring supported and are moved by means of a pin 4251′ on the lever 4250. The pile-ups of contacts in the switches 4273 and 4274 are supported on a bracket 4299 supported on the frame plate 4121, the arrangement of the movable and the relatively fixed contacts being such that operation of the lever 4250 in a clockwise direction will bring the movable contacts 4275 and 4278 into engagement with the relatively fixed contacts 4277 and 4279, respectively, and thus close the switches 4273 and 4274 each time the lever 4250 is operated to release the clutch 4254 to transmit power to the shaft 4245. The lever 4250 is operated against the action of the spring 4271 and is controlled by a roller 4250′ which rides on the periphery of the cam plate 5257.

*Commutator Switch 4102*

The switch 4102 is employed as a commutator switch for controlling the operations of the electromagnetic devices 3012 to 3016, inclusive, FIG. 25, in the tape perforator 3000 when the electromagnetic devices are to be operated to control the punches to make sets of perforations in the tape representing directional and operational signals to be given the machine operating under control of the tape. For example, when the wiper contact 3035 is on the segmental contact 3038 the electromagnetic device 3012 would be operated to control the punch associated therewith to perforate the tape in such positions as to indicate that the signal stands for the word "Space."

Figure 31:
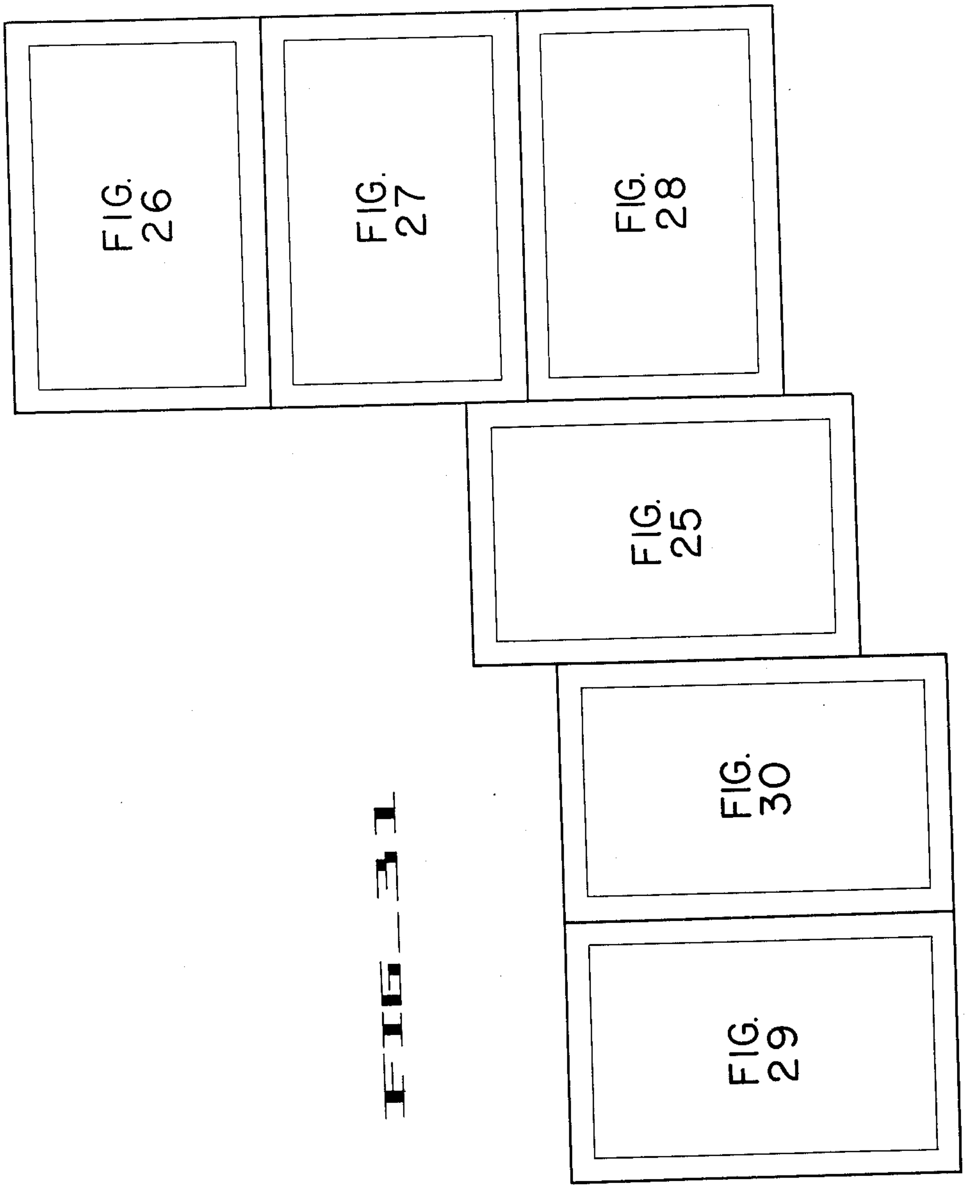
FIG. 31 shows how FIGS. 25, 26, 27, 28, 29 and 30 should be relatively positioned to cooperatively show the electrical system involved in the apparatus.
Figure 32:
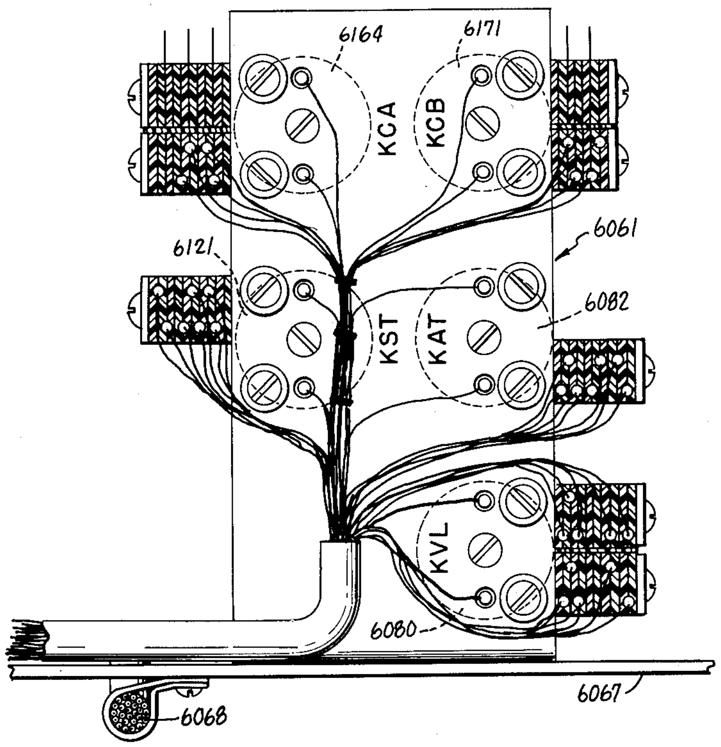
FIG. 32 shows a relay support forming part of the electrical control unit shown in FIG. 3.

The commutator switch 4102 may be brought into or out of control, with respect to the electromagnetic devices 3011, by operation of the "Code Void" key 4218 and consequent operation of the "Void" switch 4232 (SVO). When the movable contact 4233 of the single pole, double throw, switch 4232 is operated, by operation of the "Code Void" key 4218, to make the movable contact 4233, as viewed in FIG. 14, move from engagement with the upper fixed contact 4234 and into engagement with the lower fixed contact 4235 the switch 4101 will be switched out of the electrical system and the switch 4102 will be switched into the electrical system relative to the electromagnetic devices 3011 in the tape perforator 2. It will be seen, therefore, as shown in FIGS. 25, 26, 27, 28, 29 and 30, arranged as indicated in FIG. 31, that when the switch 4232 has its movable contact 4233 in engagement with the fixed contact 4234, the circuit extends to the switch 4101 which serves as a commutator for the readout switch 4000, and that the readout switch 4000 is in condition to act as a control for the set of electromagnetic devices 3011 in the tape perforator 3000. Also, that when the switch 4232 has its movable contact 4233 in engagement with the fixed contact 4235, the circuit is extended to the commutator switch 4102 and this switch is in condition to control the operation of the electromagnetic devices 3011 in the tape perforator 3000.

The punch pins 3009, in the tape perforator 3000, are arranged in side-by-side spaced relation and are operable to be thrust upwardly from the position shown in FIG. 23, to make the reduced end portions 3010 pass through the paper tape 3008. Each punch pin 3009 is provided with an operating bar 3041 which is pivotally connected at one end 3042 to the lower end portion of a punch pin 3009. The number of punch pins 3009 provided in the tape perforator 3000 may be greater than necessary for a five space code system and the number of operating bars 3041 may be also greater than required for the five space code system employed. The extra punch pins 3009 and extra operating bars 3041 thus provided, would permit ready conversion of the tape perforator apparatus to a system requiring more perforations to a line than the presently employed five space code system. For the purpose of explaining the present invention, however, and not in the sense of a limitation thereof, it will be assumed that only six punch pins 3009 and six operating bars such as 3041 are employed. For example, there are six operating bars 3041, to control the same number of punch pins 3009, only one of which is visible in FIG. 23. The operating bars 3041 are pivotally supported on a rod 3050 which extends between and is supported in two spaced beams 3051 which are pivotally supported at their left-end portions on a bar 3052 extending from, and mounted in, a side wall 3002. The beams 3051 are spaced-apart a sufficient distance to accommodate the spaced operating bars 3041, and are equipped with rollers 3053 operable for engagement with cams 3054 mounted on the rotatable shaft 3004. The roller 3053 for each beam 3051 is rotatably supported on a pin 4303 secured in an upwardly extending arm portion 3055 of the beam 3051. A curved lower arm portion 3056 serves as a support for the rod

3050 on which the operating bars 3041 are supported. When the shaft 3004 is rotated and the high spot 3057 on each cam 3054 bears against its associated roller 3053, the beams 3051 are lifted on their unsecured end portions and operate to lift the operating bars 3041 to apply an upward pressure to the perforator pins 3009. The left ends 3058 of the operating bars 3041 are normally free to move upwardly, as shown in FIG. 23. The free ends 3058, however, may be selectively held against upward movement by means of bellcrank levers 3059 which, on their upper arm portions 3060 are formed to provide hooks 3061 operable to extend over the free ends 3058 of the operating bars 3041, under the urge of springs 3062. Controlling the operations of the bellcrank levers 3059 are the electromagnetic devices 3011, the armatures 3063 of which are operable under the pull of their springs 3064, 3065 to normally hold the bellcrank levers 3059, as viewed in FIG. 23, against operation in a clockwise direction under the urge of springs 3062. The upper end of the arm 3060 of each bellcrank lever 3059 is dimensioned to fit into a notch 3066 formed in the under surface of the armature 3063 of the associated electromagnetic device 3011. When the operating coil 3067 of the electromagnetic device 3011 is energized, the armature 3063 is attracted to move away from the upper end portion of the arm 3060 of the bellcrank lever 3059 to, in effect, unlatch the bellcrank lever 3059 for operation to move its hook portion 3061 over the left-hand free end portion 3058 of the operating bar 3041. When the free end portion 3058 of an operating bar 3041 is held against rising by the associated bellcrank lever 3059 and the tape perforator goes through its operating cycle, the perforator pin 3009, associated with the held operating bar, is thrust upwardly through the paper tape 3008. The perforator pins associated with operating bars, not held against rising at their left ends 3058, will not perforate the paper tape 3008 when the beams 3051 are lifted by the cams 3054 since the paper tape 3008 is strong enough to resist perforation unless the operating bar is held at its left end portion. When the operating bar is not held at its left end portion 3058, most of the lifting force applied to the operating bar is taken up and dissipated in the portion of the operating bar to the left of the pivotal point of support 3050, by holding the left end portion 3058 down, the upward thrust of the beams 3051 is concentrated in the right-hand ends of the selected operating bars 3041. It will be seen that in FIG. 23 the operating bar 3041 is, in effect, in a full floating condition and the upward thrust of the beams 3051 is not concentrated at either end of the operating bar and that the reduced diameter upper end portion 3010 of the perforator pin 3009 has not penetrated the paper tape 3008 even though the beams 3051 are at their highest positions, having been moved thereto by the cams 3054. When the high spots 3057 of the cams 3054 pass beyond the rollers 3053, the operating bars 3041 and the beams 3051 are moved downwardly under the thrust of a suitable cam, not shown, but carried on the shaft 3004 alongside the cam 3054. Springs 3068 secured at one end to the operating bars 3041 and at the other end to fingers 3069 of a secured comb 3070 are provided to insure withdrawal of the punches 3009 to normal position.

The punches 3009 may be selectively brought into operation to perforate the paper tape 3008 by selectively operating the electromagnetic devices 3011, each of which, upon energization, will attract its armature 3063 away from the upper end of a leg portion 3060 of a bellcrank 3059 to unlatch the bellcrank. Unlatching of the bellcrank 3059 permits the hook portion 3061 to extend over the left end 3058 of an operating bar 3041 to hold the left end of the operating bar 3041 against upward movement. Under this condition, the perforator pin 3009 associated with that operating bar will penetrate the paper tape 3008 when the beams 3051 are lifted by the high spots 3057 on the cams 3054 since the held operating bar cannot rise at its left-hand held end 3058 and the corresponding right end of the operating bar receives and responds to the full lifting effects of the cams 3054 and overcomes the resistance of the paper tape 3008 and makes a perforation in the tape 3008. The displaced pieces of the tape formed by operation of the punches pass upward from the tape 3008 and into a receptacle 3071 which has an outlet tube 3072 connected thereto for leading the tape punchings away from the tape perforating apparatus.

One of the operating bars 3041 is arranged to have its left end 3058 permanently held against floating, in order that the perforating pin 3009 associated with that particular operating bar will operate to punch feed holes in the tape 3008. The operating bar controlling the punching of the feed holes is held down at its left end by means of a fixed bracket 3075. It will be seen, therefore, that for each cyclic rotation of the shaft 3004 the tape 3008 is perforated at a point in register with an aperture in a perforated laminated punch block 3076. This provides the feed hole in the tape 3008. Other perforations may be made in the tape at the same time as the feed hole is formed. These other perforations are arranged in a line across the tape and are selectively formed in the tape, at positions in register with the apertures in the perforated laminated punch block 3076.

The bellcrank levers 3059, selectively unlatched by operation of the electromagnetic devices 3011, are controlled for simultaneous movement by virtue of a gang latch 3082 which normally extends across the path of movement of pointed end portions 3083 of the arms 3084 of the bellcrank levers 3059. The latch 3082 extends from a lever 3085 pivotally supported at 3086 and having a cam follower roller 3087 cyclically operated for each rotation of the cam shaft 3004 and operating to move the lever 3085 against the action of a restoring spring 3088. When the gang latch 3082 is moved to the right from the position shown in FIG. 4, the bellcrank levers 3059 selectively released by the electromagnetic devices 3011, are rotated clockwise to engage and hold the left ends of their associated operating bars 3041. Subsequent to the clockwise rotational movement of the bellcrank levers 3059, the gang latch 3082 is moved to the left under urge of the spring 3088 to extend over the upper portions of the pointed ends 3083 of the bellcrank levers 3059. It will be seen, therefore, that the gang latch 3082 is operable to hold the bellcrank levers in selectively operated positions and is cyclically operated to permit movement of the bellcrank levers to normal position. Restoration of the bellcrank levers 3059 is obtained under control of a cam on cam shaft 3004 by operation of the lever 4602 which is in mechanical connection with the comb 3089. When the lever 4602 is operated to rotate the comb 3089 counter-clockwise against the action of the restoring spring 3090, the bellcrank levers 3059 are latchingly engaged by armatures 3063 of the electromagnetic devices 3011. A bail 3091 pivotally supported at 3092 and extending across the path of clockwise movement of the bellcrank levers 3059 is operable to close a normally open switch 3093 (SCC) shown in FIG. 25 when any of the electromagnetic devices 3011 is operated. The switch 3093 is located directly back of the switch 3094 (SLC) which, as shown in FIG. 25, is normally closed, but which opens in mid-cycle to release the clutch magnet 3095 (MPC) from energization. The clutch magnet 3095 (MPC) is operable to control the operation of a clutch, the function of which is to control the application of power from a belt-driven pulley to the cam shaft of the tape perforator 3000. The pulley is driven by means of a belt extending from a pulley secured to a shaft extending from a gear system driven by means of a shaft extending from the motor 4282 of the computing apparatus 1, shown in FIG. 34. The clutch is an expansion clutch and is provided with a rotatable clutch member operable to transmit rotations from the pulley to a shaft 3004 which extends through the clutch and into the interior of the tape perforator 3000 and serves as the cam shaft of the tape perforator. The clutch member is provided with a lug operable to engage an armature of the electromagnetic device 3095 (MPC) unless the electromagnetic device 3095 is energized. When the armature is engaged by the lug on the clutch member, the clutch member is held against rotation and the cam shaft 3004 of the tape perforator 3000 is not operated. When the electromagnetic device 3095 (MPC) is energized to remove its armature from the path of movement of the lug, the clutch operates to transmit power from the pulley to the cam shaft 3004 of the tape perforator.

When numerical values are put into the adding machine portion of the Add-Punch apparatus, the wipers in the readout switch 4000 take up positions along the conducting strips 4455 and 4051 to 4061, inclusive, and relative to the conducting strips 4030 to 4039, inclusive, to obtain switch conditions representing the numerical values entered in the adding machine portion of the Add-Punch apparatus, the values being subsequently read out of the adding machine by closing of the readout switch 4000 to provide energizable circuits to the electromagnetic devices 3011 in the tape perforator 3000 so that the tape perforator 3000 will be operated to make a perforated tape record of the numerical values entered and currently stored in the adding machine portion of the apparatus. For example, when a wiper contact in the readout switch 4000 is in engagement with the conductor strip 4031 and the readout switch 4000 is closed, the electromagnetic devices 3012, 3013, 3014 and 3016 are energized over conductor 4207 and branch circuits including diodes 4208, 4209, 4210, 4211 and conductors 3020, 4363, 5184 and 5201, respectively.

When a wiper contact in the readout switch 4000 is in engagement with the conductor strip 4032 and the readout switch 4000 is closed, the electromagnetic devices 3012, 3013 and 3016 are energized over conductor 4212 and branch circuits including diodes 4213, 4214, 4515 and conductors 3020, 4363 and 5201, respectively.

When a wiper contact in the readout switch 4000 is in engagement with the conductor 4035 and the readout switch 4000 is closed, the electromagnetic device 3016 is energized over a circuit including the diode 4216 and conductor 5201.

When a wiper contact in the readout switch 4000 is in engagement with the conductor strip 4036 and the readout switch 4000 is closed, the electromagnetic devices 3012, 3014 and 3016 are operated over conductor strip 4036 and branch circuits involving the diodes 4519, 4223 and 4226.

When a wiper contact in the readout switch 4000 is in engagement with the conductor strip 4037 for the value of "7" and the readout switch 4000 is closed, the electromagnetic devices 3012, 3013 and 3014 are operated over conductor strip 4037 and branch circuits including diodes 4231, 4539, 4252 and conductors 3020, 4363 and 5184, respectively.

When a wiper contact in the readout switch 4000 is in engagement with the conductor strip 4039 for the value "9" and the readout switch 4000 is closed, the electromagnetic devices 3015 and 3016 are energized over conductor strip 4039 and branch circuits including diodes 4253, 4256 and conductors 4399 and 5201, respectively.

Operation of the "Code Void" key 4218, as shown in FIG. 14, will cause movement of the movable contact 4233 from engagement with the fixed contact 4234 and into engagement with the fixed contact 4235. When the movable contact 4233 is in engagement with the relatively fixed contact 4235 the commutator switch 4101 is switched out of control and the commutator switch 4102 is switched into the system to control the operations of the electromagnetic devices 3011 in making records of a directional character such, for example, as "LTRS" (Letters) "Space," "CR" (Carriage Return) and "LF"

Figure 13:
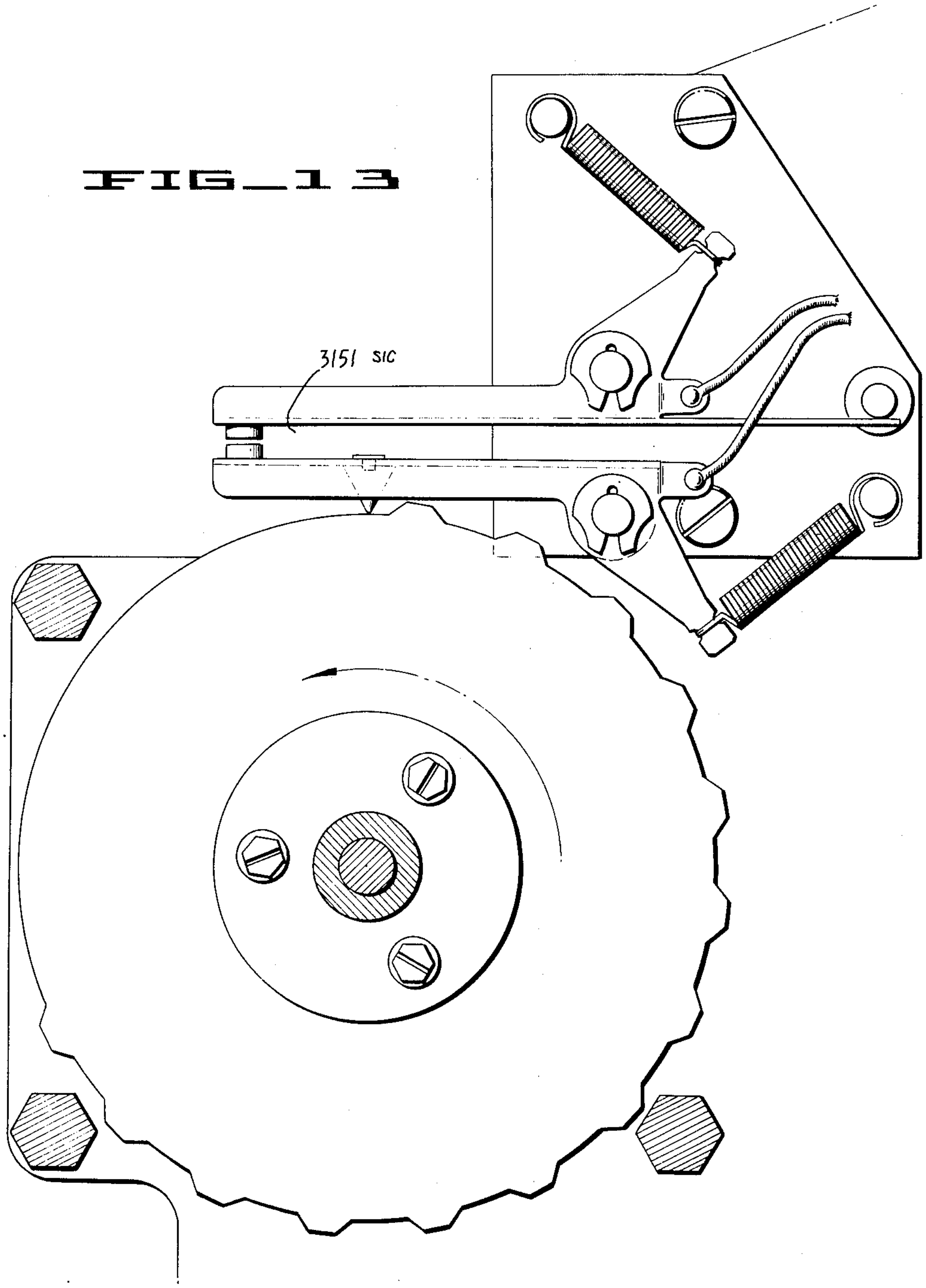
FIG. 13 is a plan view of the cam operated switch operable to complete circuit connections at required predetermined intervals.

(Line Feed). When the wiper contact 3035 of the commutator switch 4102 engages the segmental contact 3038 and the switch 4232 (SVO), FIGS. 14 and 25, has its movable contact 4233 in engagement with the fixed contact 4235, the electromagnetic devices 3012 and 3014 will be operated over circuits that may be traced in FIGS. 25, 26 and 27 as follows: Point 3145 of rectifier 3144, conductors 3147 and 3147', fixed contact 3158, and movable contact 3159 of switch 3129 (STC), not shown in FIG. 23 but located back of switch 3094 and normally closed, conductor 3160, fixed contact 3161 and movable contact 3162 of switch 3094 (SLC), shown in FIG. 23 and located back of switch 3093 and normally closed, conductor 3163, fixed contact 3153 and movable contact 3152 of switch 3151 (SIC), which is a pulse creating switch, shown in FIG. 13, conductor 3164, movable contact 4233 and left-hand fixed contact 4235 of switch 4232 (SVO), conductor 4345, conductor bar 3036, wiper contact 3035 and segmental contact 3038 of commutator switch 4102, conductor 4320, diode 4285, conductors 4302, 3020 and 3021, winding of electromagnetic device 3012 (MP1), conductors 4356 and 5171 to point 3146 of rectifier 3144.

It will be understood that when values are put into the adding machine portion of the apparatus the readout switch 4000 operates to set up switching conditions in the electrical system representing the numerical values put into, or accumulated in, the adding machine and that when the readout switch 4000 closes and the commutator switch 4101 moves its wiper contact 3017 over the conductor bar 4316 and over the segmental contacts 4322 to 4332, inclusive, any switching condition set up in the readout switch 4000 will be, in effect, read out of the adding machine portion of the apparatus and the tape perforator apparatus will be operated to produce a perforated tape representing by its pattern of perforations a record of the values set up or accumulated in the adding machine portion of the apparatus. For example:

For the value "4," and in this case, when the wiper contact 3017 in the commutator switch 4101 reaches the segmental contact 4329, a circuit is prepared for operation of the electromagnetic devices 3011 in the tape perforator 2 to control the operation of the tape perforator 2 in making a record indicating the value "4." The circuit for operation of the electromagnetic devices in the tape perforator 2 for the value "4" may be traced as follows: Point 3145 in rectifier 3144, conductor 3147, conductor 3147', fixed contact 3158 and movable contact 3159 of switch 3129 (STC), conductor 3160, fixed contact 3161 and movable contact 3162 of switch 3094 (SLC), conductor 3163, fixed contact 3153 and movable contact 3152 of switch 3151 (SIC), and which is the pulse making contact, conductor 3164, movable contact 4233, and right-hand fixed contact 4234 of switch 4232 (SVO), conductor 4318, conductor bar 4316, wiper contact 3017 and segmental contact 4329 of commutator switch 4101, conductors 4341, conductor strip 4054, wiper contacts 4065 and 4075, shown in FIG. 18, conductor strip 4034, shown in FIG. 20, conductor 4396, conductor 4393, diode 4394, conductor 4395, conductor 4363, conductor 4364, winding of electromagnetic device 3013 (MP2), conductor 5194, conductor 5171 to point 3146 of rectifier device 3144. A branch circuit is also provided for the operation of electromagnetic device 3015 and this circuit may be traced from conductor 4396 as follows: Conductor 4396', diode 4397, conductor 4398, conductor 4399, conductor 4400, winding of electromagnetic device 3015 (MP4), conductor 4401, conductor 5171 to point 3146 on rectifier 3144. A branch circuit may be also partially prepared for operation of the relay 4440 (KPM). To make the branch circuit capable of completion, however, it would be necessary to connect a diode or other suitable electrical component in a normally open part of the diode board such, for example, at the points 4257 so that the branch circuit could be traced as follows: From the readout switch 4000, conductors 4031, 4207, a diode at point 4257, to conductor 4446', conductor 4446, fixed contact 4447 and break contact 4452 of switch 4448 (KPM), conductor 5168, winding of relay 4440 (KPM), conductor 5170, conductor 5170', conductor 5171 to point 3146 of rectifier 3144. It will be seen that by operation of the electromagnetic devices 3013 and 3015 that the tape perforator 2 has been prepared for operation to perforate the tape 3008 in the second and fourth positions to form a signal in the tape for the value "4."

In this particular reading, the next number to be recorded in the tape 3008 is for the value "3" and this requires the operation of the electromagnetic device 3012 (MP1). The circuit for operation of the electromagnetic device 3012 (MP1) may be traced as follows: From the conductor bar 4316 and through wiper contact 3017 of commutator switch 4101, segmental contact 4330, conductor 4342, conductor strip 4053, wiper contacts 4064 and 4074, conductor strip 4033, conductor 4388, conductor 4389, diode 4390, conductor 4391, conductor 3020, conductor 3021, winding of electromagnetic device 3012 (MP1), conductor 4356, conductor 5171 to point 3146 of rectifier 3144.

To represent the value "8" in the next figure, in the one being recorded, the electromagnetic devices 3013 and 3014 must be energized. The circuit for operation of the electromagnetic device 3013 in this case may be traced as follows: From the conductor bar 4316 and thence through wiper contact 3017 of commutator switch 4101, segmental contact 4331, conductor 4343, conductor strip 4052 in the readout switch 4000, wiper contacts 4063 and 4073, shown in FIG. 18, conductor strip 4038 in switch 4000, shown in FIG. 26, conductor 4425, conductor 4426, diode 4427, conductor 4428, conductor 4363, conductor 4364, winding of electromagnetic device 3013 (MP2), conductor 5194, conductor 5171 to point 3146 of rectifier 3144. For operation of the electromagnetic device 3014, the circuit may be traced from conductor strip 4038, conductor 4425, conductor 4429, conductor 4429', diode 4430, conductor 4431, conductor 5184, conductor 4370, winding of electromagnetic device 3014 (MP3), conductor 5185, conductor 5171 to point 3146 of rectifier 3144.

To record the last zero, in the figure we have been recording, it is necessary to energize the electromagnetic devices 3013, 3014 and 3016 in the tape perforator 2 and the circuits for the operation of the devices in this case may be traced as follows: From conductor bar 4316 of the commutator switch 4101, wiper contact 3017, segmental contact 4332, conductor 4344, conductor strip 4051, wiper contacts 4004 and 4003 of readout switch 4000, conductor strip 4030, conductor 4030', diode 5192, conductor 5193, conductor 4363, conductor 4364, electromagnetic device 3013 (MP2), conductor 5194, conductor 5171, to point 3146 of rectifier 3144; for the operation of the electromagnetic device 3014 and tracing from the conductor 4030' and thence by way of conductor 5195, diode 5196, conductor 5197, conductor 5184, conductor 4370, winding of electromagnetic device 3014 (MP3), conductor 5185, conductor 5171, to point 3146 of rectifier 3144. For the operation of the electromagnetic device 3016 and tracing from the conductor 4030' the circuit follows through conductor 5198, diode 5199, conductor 5200, conductor 5201, conductor 5202, winding of electromagnetic device 3016 (MP5), conductor 5203, conductor 5171, to point 3146 of rectifier 3144. It will be seen, therefore, that with the operation of the electromagnetic devices 3013, 3014 and 3016 that the tape perforator has been conditioned for making perforations in the tape in the second, third and fifth positions to represent the value "0."

For each reading cycle calling for operation of the electromagnetic devices 3011 there is an operation of the electromagnetic device 3095 (MPC) to operate the clutch 3104 in the tape perforator 3000. For example, when the conductor strip 4033 in the readout switch 4000 is supplied with energizing current the conductor 3020 is energized over a circuit including conductors 4388 and 4389, diode 4390, conductor 4391 to conductor 3020. From this point the circuit through the electromagnetic device 3095 (MPC) may be traced as follows: Conductor 5112, diode 5113, conductor 5114, conductor 5115, conductor 5189, winding of electromagnetic device 3095 (MPC), conductors 5170, 5170', conductor 5171 to point 3146 of rectifier 3144. When the conductor strip 4038 is energized, a circuit through the electromagnetic device 3095 (MPC) extends through conductor 4426, diode 4427, conductor 4428, conductor 4363, conductor 5116, diode 5117, conductor 5118, conductor 5115, conductor 5189, winding of electromagnetic device 3095 (MPC), conductors 5170' and 5171 to point 3146 of rectifier 3144. When the conductor strip 4038 is energized, the circuit through the electromagnetic device 3095 may be traced through conductor 4425, conductor 4429, conductor 4429', diode 4430, conductor 4431, conductor 5184, conductor 5186, diode 5187, conductor 5119, conductor 5115, conductor 5189, winding of electromagnetic device 3095 (MPC), conductors 5170, 5170' and 5171 to point 3146 of rectifier 3144. When conductor 4399 is energized the electromagnetic device 3095 is energized over a circuit including conductor 5120, diode 5121, conductor 5188, conductor 5115, conductor 5189, winding of electromagnetic device 3095 (MPC), conductors 5170, 5170' and 5171 to point 3146 of rectifier 3144. Assuming that the conductor 5201 is energized, the electromagnetic device 3095 (MPC) would be energized over a circuit including conductor 4369, diode 5169, conductor 5034, conductor 5115, conductor 5189, winding of electromagnetic device 3095 (MPC), conductors 5170, 5170' and 5171 to point 3146 in rectifier 3144.

In some cases, in making records of the values put into or otherwise obtained in the adding machine portion of the apparatus and read out therefrom into the tape perforator, it is necessary or advantageous to have the tape perforator make a record of the character of the value read out from the adding machine. For example, the value may be an amount to be added, not added, subtracted, a total, a minus total, a subtotal or a minus subtotal. In the adding machine, therefore, there may be in accordance with the invention disclosed, special keys in the keyboard to indicate the character of the values to be recorded. The keys, for example, would be such as listed and be operable to control the adjustment of a sector gear such, for example, as the sector gear 33 which will in turn control the setting of a sector gear such as sector gear 188 and operable to control the movement of the contact-carrying carriage 4008 in the readout switch 4000 shown in FIG. 18. The wiper contacts 4003' and 4004' are operable to be moved in the space between the contact bearing plates 4001 and 4002, carrying the conductor strip 4455 and the segmental contacts 4030+, 4031N, 4032—, 4033T, 4034$\overline{T}$, 4035S and 4036$\overline{S}$, and so that when the readout switch 4000 is closed the wiper contact 4004' will be in contact with the conductor strip 4455 on the contact bearing strip 4002, and the wiper contact 4003' will be in contact with one of the segmental contacts 4030+, 4031N, 4032—, 4033T, 4034$\overline{T}$, 4035S and 4036$\overline{S}$, the particular position of the wiper contact 4003' relative to the segmental contacts 4030+, 4031N, 4032—, 4033T, 4034$\overline{T}$, 4035S and 4036$\overline{S}$, being in accordance with the key operated in the adding machine 1. When the wiper contact 3017 in the commutator switch 4101 reaches the segmental contact 4333, a record will be made in the tape by the tape perforator, indicating the reading of the position of the wiper contact 4003' with respect to the positioning of the wiper contact 4003' on one of the relatively fixed segmental contacts 4030+, 4031N, 4032—, 4033T, 4034$\overline{T}$, 4035S and 4036$\overline{S}$.

For an adding operation of the plus key in the adding machine would be operated to start the adding machine in its cycle of operation and cause movement of the wiper contact 4003' to the segmental contact 4030+. Closure of the readout switch 4000 in this position will prepare operating circuits for the electromagnetic devices 3014 and 3016, the circuits being by way of conductor bar 4316, wiper contact 3017 and segmental contact 4333 in commutator switch 4101, conductor strip 4455, wiper contacts 4004', 4003' and segmental contact 4030+ in readout switch 4000, conductors 4013, 4013', diode 4014, conductor 4015, conductors 5184 and 4370, winding of electromagnetic device 3014, conductor 5185 and conductor 5171 to point 3146 of rectifier 3144. For the operation of the electromagnetic device 3016, the circuit in this case, branches off from conductor 4013' and extends through conductor 4017, diode 4018, conductor 4019, conductors 5201 and 5202, winding of electromagnetic device 3016, conductors 5203 and 5171 to point 3146 of rectifier 3144. The electromagnetic device 3095 (MPC) is also operated, in this case, over circuits extending through conductors 5184 and 5186, diode 5187, conductors 5119, 5115 and 5189, winding of electromagnetic device 3095 (MPC), conductors 5170, 5170' and 5171 to point 3146 of rectifier 3144.

For a "Minus" operation, the wiper contact 4003' would engage the segmental contact 4032— and prepare a circuit for the operation of the electromagnetic device 3012 (MP1) over conductor 4021, diode 4285, conductors 3020 and 3021, winding of electromagnetic device 3012 (MP1), conductors 4356 and 5171 to point 3146 of rectifier 3144. The electromagnetic device 3016 (MP5) would also be operated over a circuit including conductor 4021, diode 4317, conductors 5201 and 5202, winding of electromagnetic device 3016 (MP5) and conductors 5203 and 5171 to point 3146 of rectifier 3144. In this case, the circuit for operation of the electromagnetic device 3095 (MPC) for controlling the clutch of the tape perforator would extend through conductor 4021, diode 4317, conductor 5201, conductors 4369, diode 5169, conductors 5034, 5115 and 5189, winding of electromagnetic device 3095 (MPC) and conductors 5170, 5170' and 5171 to point 3146 of rectifier 3144.

For a "Total" operation, the wiper contact 4003' would be on segmental contact 4033T and the electromagnetic devices 3014 and 3015 would be operated over circuits extending through the readout switch 4000, segmental contact 4033T, conductors 4022 and 4022', diode 4023, conductors 4947, 5184, 4370, winding of electromagnetic device 3014 (MP3), conductors 5185 and 5171 to point 3146 of rectifier 3144. For the electromagnetic device 3015 the circuit branches off conductor 4022' and extends over conductors 4096 and 4097 to diode 4098, conductor 4099, conductors 4399 and 4400, winding of electromagnetic device 3015 (MP4), conductors 4401 and 5171 to point 3146 of rectifier 3144. In this case, the electromagnetic device 3095 (MPC) has two branch circuit portions over which the electromagnetic device 3095 (MPC) may be operated, one is over conductors 4947, 5184, 5186, diode 5187 and conductors 5115 and 5189; another is by way of conductors 4096, 4097, diode 4098, conductors 4099, 4399, 5120, diode 5121 and conductors 5188, 5115 and 5189.

For a "Minus Total" operation the wiper contact 4003' would be on the segmental contact 4034$\overline{T}$ and the electromagnetic devices 3012, 3013 and 3015 would be operated over circuits extending through conductors 4193 and 4193' and diodes 4350, 4351 and 4357, conductors 3020, 4363 and 4399, respectively.

When the wiper contact 4003' in the readout switch 4000 is in contact with the segmental contact 4033T the relay 4442 (KTM) may be operated over a circuit including conductor 4022, diode 4443, conductor 4444, fixed contact 4445 and left-hand movable contact 4449 of the relay switch contacts 4450 (KTM), conductor 4451, winding of relay 4442 (KTM), conductors 4453 and 5171 to rectifier 3144.

When the wiper contact 4003' in the readout switch 4000 is in contact with the segmental contact 4034T, the relay 4442 (KTM) may be operated over a circuit including conductor 4193, diode 4461, conductor 4444, fixed contact 4445 and left-hand movable contact 4449 of the relay switch contacts 4450 (KTM) and conductor 4451 to winding of relay 4442 (KTM). The relay 4442 (KTM) will electrically lock up over a circuit including conductors 5171 and 4453, winding of relay 4442 (KTM), conductor 4451, left-hand movable contact 4449 and right-hand movable contact 4459, of the relay switch contacts 4450 (KTM), conductor 4460, conductor 4454, left-hand fixed contact 4277 and movable contact 4275 of off-normal switch 4273 (SON), conductor 4365 and conductor 3147.

In connection with the Add-Punch machine portion of the apparatus it will be understood that it may be used in its normal functions of listing figures, adding them together and recording the subtotals and totals and of reading out the amounts and controlling the operation of the tape perforator to make perforations in the paper tape representing the values read out of the adding machine. The apparatus is therefore operable to make a printed record of numerical representations of values and classifications, to print certain values and indications without accumulating them and to print certain other values and accumulate them into subtotals and totals as required. A record of a sales transaction may therefore be made with the Add-Punch portion of the apparatus.

The present invention provides an additional feature in that it shows in a suitable way to an operator of the apparatus the steps to be taken in making the required record. Manually operable keys in the adding machine portion of the apparatus are, in effect, latched and unlatched as required to permit proper operation and prevent improper operation of the apparatus.

*Panel Type Indicator*

As shown in FIGS. 1, 2 and 5 a panel type indicator 6000 is provided on the apparatus to indicate the steps to be taken in recording a sale. The indicator 6000 comprises a casing 6001 forming a frame for a window 6002 in which progressively appear, in illuminated characters, words and signs indicating each step of operation required in making a required record of a sale. As shown in FIG. 5 the window 6002 is divided into columns 6003 and 6004 having the word headings "Operation" and "Action" respectively. Under the heading "Operation" are listed the kind of entries to be made in the recording of the sale and under the heading "Action" are listed the titles of the operational keys of the adding machine portion of the apparatus to be operated each time an entry is made or an operation is required in the Add-Punch apparatus. For example, the first item under the heading "Operation" calls for "Clerk No." and the first item under the heading "Action" calls for "Print Only." These items when illuminated indicate to an operator that the clerk's identification number should be entered in the record of sale and the "Print Only" key of the adding machine should be operated so that the number entered will be printed on the tape but there will be no accumulation of the number in the accumulator of the adding machine portion of the apparatus. The next item under "Operation" reads "Type of Sale" and indicates that there should be entered and printed an indication of the type of the sales transaction. A predetermined code number should be entered for this item and as indicated under the heading "Action" the "Print Only" key in the adding machine portion of the apparatus should be operated. The next item under the heading "Operation" calls for "Code" and in this case there should be entered a predetermined number indicating the kind of merchandise sold, after which as indicated under the heading "Action" the "Print Only" key in the adding machine portion of the apparatus should be operated. The next item under the heading "Operation" calls for "Amount" to indicate the monetary price of the article sold. Since this is an amount that should be entered to affect the amount in the accumulator in either a debit or credit manner the "Plus" key or the "Minus" key in the adding machine portion of the apparatus should be manually operated to cause the amount of the entry to be either added to or subtracted from the amount in the accumulator as the case may be. The next information to be entered on the record of sale is "Sub Total" and this can be accomplished by operating the "Sub Total" key twice. The next item to appear on the record of sale is "Sales Tax" and this should be entered by suitable operation of the numeral keys in the adding machine portion of the apparatus and by operation of the "Plus Key" (+) in the adding machine portion of the apparatus. The next item called for under "Operation" is "Federal Tax" and this should be entered by suitably operating the numerical keys of the adding machine portion of the apparatus and by operating the plus key of the adding machine portion of the apparatus. The next item and which is the last to appear on the record of sale is "Total" and this is accomplished by operating the "Total" key in the adding machine portion of the apparatus.

If an error is made in operating the numeral keys of the adding machine portion of the apparatus and the amount has not been completely entered the error can be, in effect, cancelled out by operating the "Code Void" key in the adding machine portion of the apparatus.

The various items above mentioned as appearing in the window 6002 are progressively illuminated, a line at a time, by means of an illuminating unit 6005 comprising a support 6006 of insulating material in which are mounted relatively small electric lamps 6007 to 6036 inclusive arranged in sets, of three to a line, to provide substantially equal illumination across the area directly back of the portion of the window 6002 bearing the words of instruction for the current operation of the apparatus indicating the information required to be entered in the record of sale and the functional key of the adding machine portion of the apparatus to be operated to produce the required record. The line illuminated might be for example the second line down shown in FIG. 5 and calling for "Clerk No./Print Only" or might be any of the other lines of characters shown in the window 6002 such for example as the line calling for "Amount/±," as the case may be.

The lamps 6007 to 6036 inclusive are mounted in an apertured insulating block 6037 in which terminals 6038 are supported to provide connecting points for wires leading from a fanned out cable 6040 and leadout wires 6041 leading from the lamps such for example as the lamp 6036.

Figure 6:
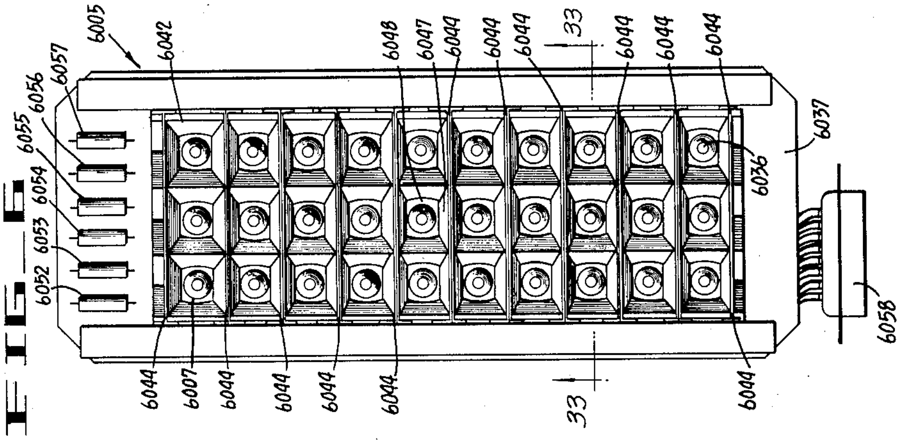
FIG. 6 is a view in detail of the signal lamp apparatus in the indicator portion of the apparatus.
Figure 33:
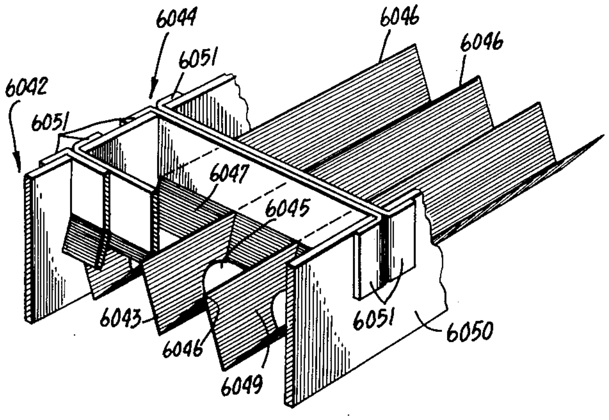
FIG. 33 is an enlarged view, in perspective, of a portion of the reflector means employed in the signal lamp apparatus shown in FIG. 6.

A reflector unit 6042 is provided for the lamps 6007 to 6036, inclusive, and comprises a corrugated apertured strip 6043, FIG. 33, and a plurality of spaced cross strips 6044 extending crosswise relative to the corrugated strip 6043. The cross strips 6044, as shown in FIG. 33, are formed in two laminations which are cut away at their lower portions 6045 to accommodate the ridge tops 6046 of the corrugated strip 6043. Lower portions 6047 of the cross strips 6044 are bent inwardly toward the center of the apertures 6048, FIG. 6, to cooperate with the starting sides 6049 of the apertured corrugated strip 6043 to form, in effect, a reflector for the lamp which extends outwardly through the strip 6043. The cross strips 6044 have end portions extending through apertures formed in spaced insulating side pieces 6050—6050 and the outer ends of the two laminations of the cross strips 6044 are bent over in the form of flaps 6051 against the outer surface of the insulating side pieces 6050—6050 to hold the reflector unit parts in assembled condition. The insulating block 6037 is apertured to accommodate the terminals of resistors 6052, 6053, 6054, 6055, 6056 and 6057 which are suitably electrically connected to the lamps in the illuminating unit 6005 and to a multicontact plug 6058 through the cable 6040.

Figure 3:
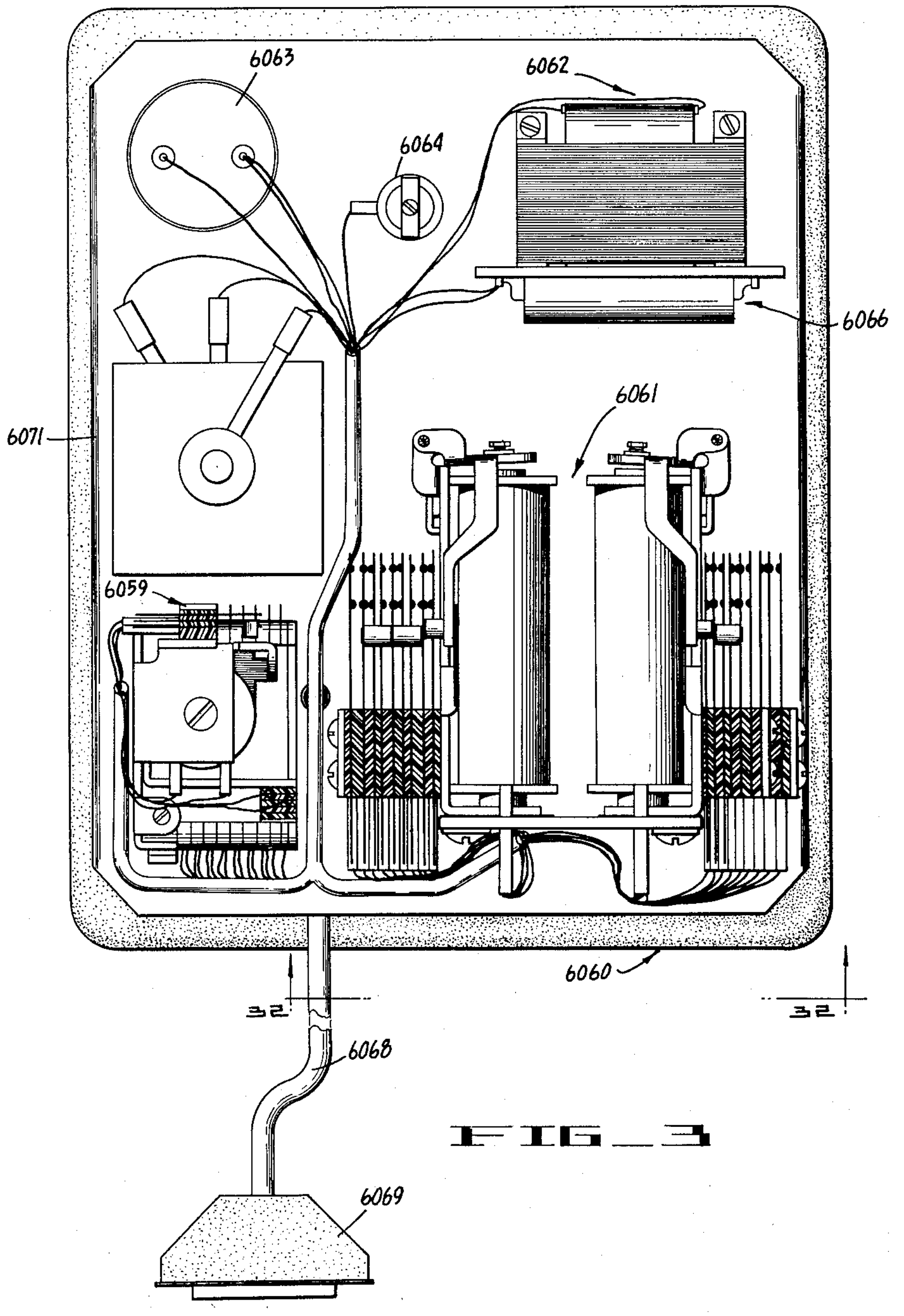
FIG. 3 is a top plan view of the electrical control unit for the apparatus.
Figure 4:
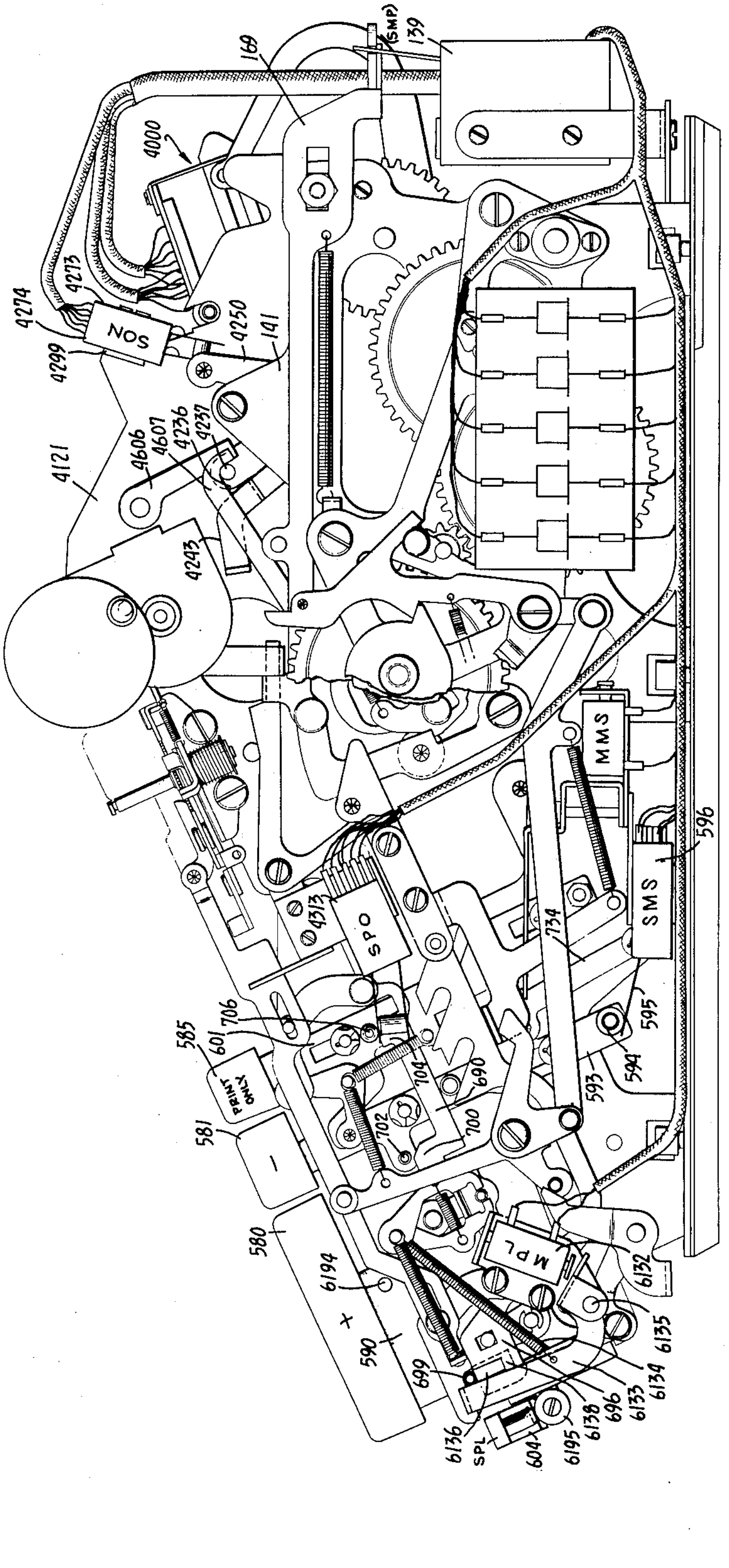
FIG. 4 is a side elevational view of the adding machine portion of the apparatus and with the side cover removed to enable viewing of some of the apparatus in the adding machine member.
Figure 7:
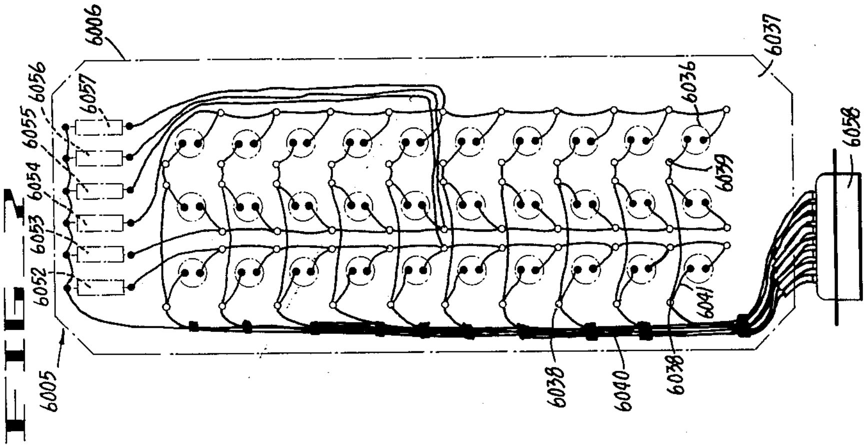
FIG. 7 shows the wiring plan of the signal lamp apparatus shown in FIG. 6.

The lamps 6007 to 6036, inclusive, are controlled in their operation by means of a step switch 6059 forming part of the control unit 6060 shown in FIG. 3 and in which are also a set of relays 6061, a transformer 6062, a condenser 6063, resistor 6064, rectifier 6071 and a condenser and resistor network 6066, the electrical components being supported in a protective casing 6067 and being in electrical connection through a cable 6068 terminating at one end in a multicontact plug 6069 operable to connect with a cooperating multicontact jack, not shown but located in the Add-Punch apparatus shown in FIGS. 1 and 2. The Add-Punch apparatus may be electrically operated through a power supply, the source of which is not shown but may be a commercial source of current supply connected to the conductors 4283 and 4284 and leading to a motor 4282 and a transformer 3139. When the functional keys of the adding machine are operated, the switch 139 (SMP), as shown in FIG. 4, is closed by forward movement of the link 169 to start the motor 4282. The initial supply of current for the motor may be traced as follows: conductor 4283, conductor 4283′, motor 4282, conductor 4286, conductor 4286′, centrifugally operated speed governor switch 4287, conductor 4287′, conductor 4288, movable contact 4290 and fixed contact 4291 of switch 139 (SMP), conductor 4292′, conductor 4359, On-Off switch 4359′ (SAC) and conductor 4284 to the commercial source of current supply, not shown.

Figure 10:
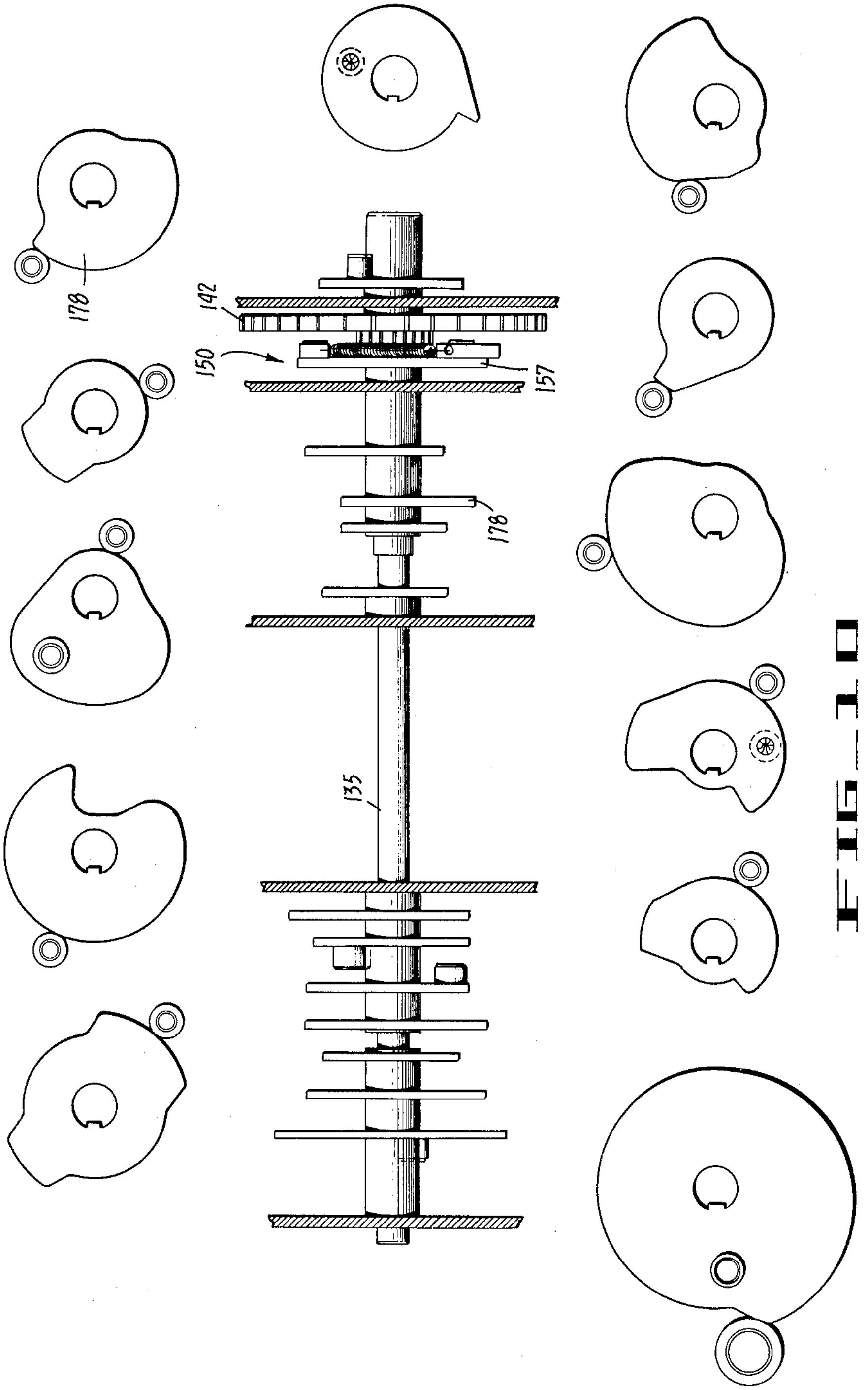
FIG. 10 is a side view of another assembled cam shaft and plan views of the cams included therein.

The initial operation of the motor 4282, when a functional key is depressed, is sufficient for operation of the adding machine 1 in a complete cycle of entering and computing amounts, there being a one rotation or single cycle clutch 150 provided between the cam shaft gear 142 which is driven through a suitable shaft and gear train means extending from the motor to the clutch 150 and through the cam plate 157 to the cam shaft 135 shown in FIG. 10.

After the initial energization of the motor 4282 over the above described circuit, motor 4282 is at times energized over a second circuit when a readout operation is occurring from the readout switch 4000, the second circuit involving contacts in the switch 4274 and traceable as follows: source of current supply, not shown, conductor 4283, conductor 4283′, motor 4282, conductors 4286 and 4286′, speed governor 4287, conductor 4287′, conductor 4288, conductor 4288′, conductor 4288″, movable contact 4278 and fixed contact 4279 of switch 4274 (SONB), conductor 4296, conductors 4292, 4292′ and 4359, switch 4359′ and conductor 4284 to source of current supply, not shown.

A third motor supply circuit is provided which is brought into operation through the manual operation of switch 4298 (STF) which has A and B pairs of contacts, the third circuit for the motor being by way of the B pair of contacts in the switch 4298 and traceable as follows: source of current supply, not shown, conductors 4283 and 4283′, motor 4282, conductors 4286 and 4286′, speed governor 4287, conductor 4287′, conductor 4288, conductor 4288′, movable contact 4300, and fixed contact 4301 of switch 4298 (STF), conductors 4292 and 4292′, conductor 4359, switch 4359′ (closed) and conductor 4284 to source of current supply, not shown.

Closing of the manually operated switch 4298 (STFA) controls the operation of the electromagnetic device 3095 (MPC) which controls the clutch, not shown, in the tape perforator 3000. The circuit for operation of the electromagnetic device 3095, in this case, may be traced as follows: rectifier 3144, conductors 3147 and 4365, movable contact 4275 and right-hand fixed contact 4276 of switch 4273 (SONA), conductor 4263, fixed contact 4263′ and movable contact 4263″ of switch 4298 (STFA) conductor 5189, winding of electromagnetic device 3095 (MPC), conductors 5170′ and 5171 to rectifier 3144. The switch 4298 (STFA) provides a means for controlling the operation of the tape perforator 3000 to feed tape therethrough without causing operation of the selector electromagnets 3011 and therefore without having code perforations appear in the tape to indicate values.

Figure 28:
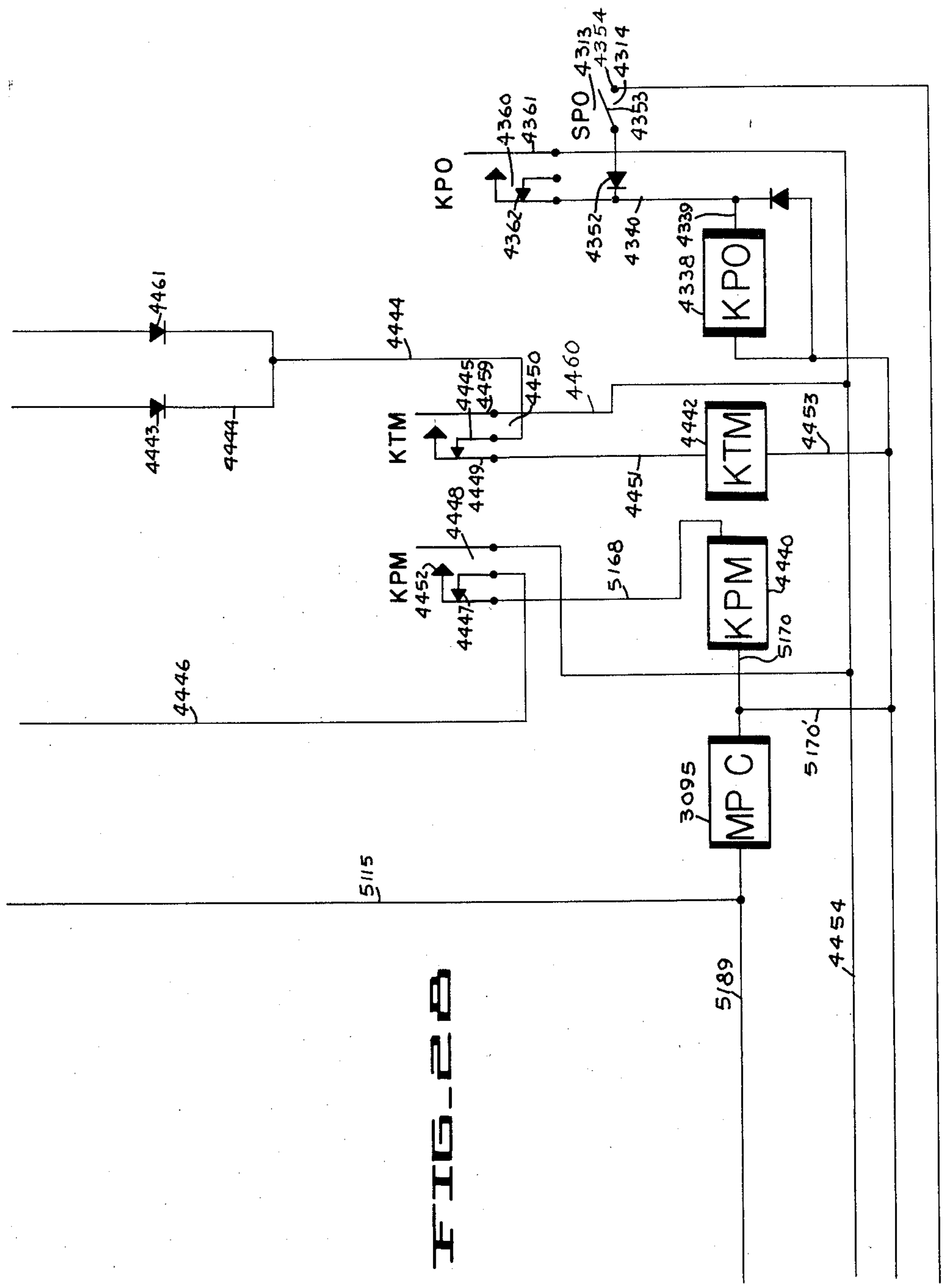
FIG. 28 shows the portion of the circuit containing some of the relays and switches serving as part of the electrical control system for the adding machine portion of the apparatus.
Figure 29:
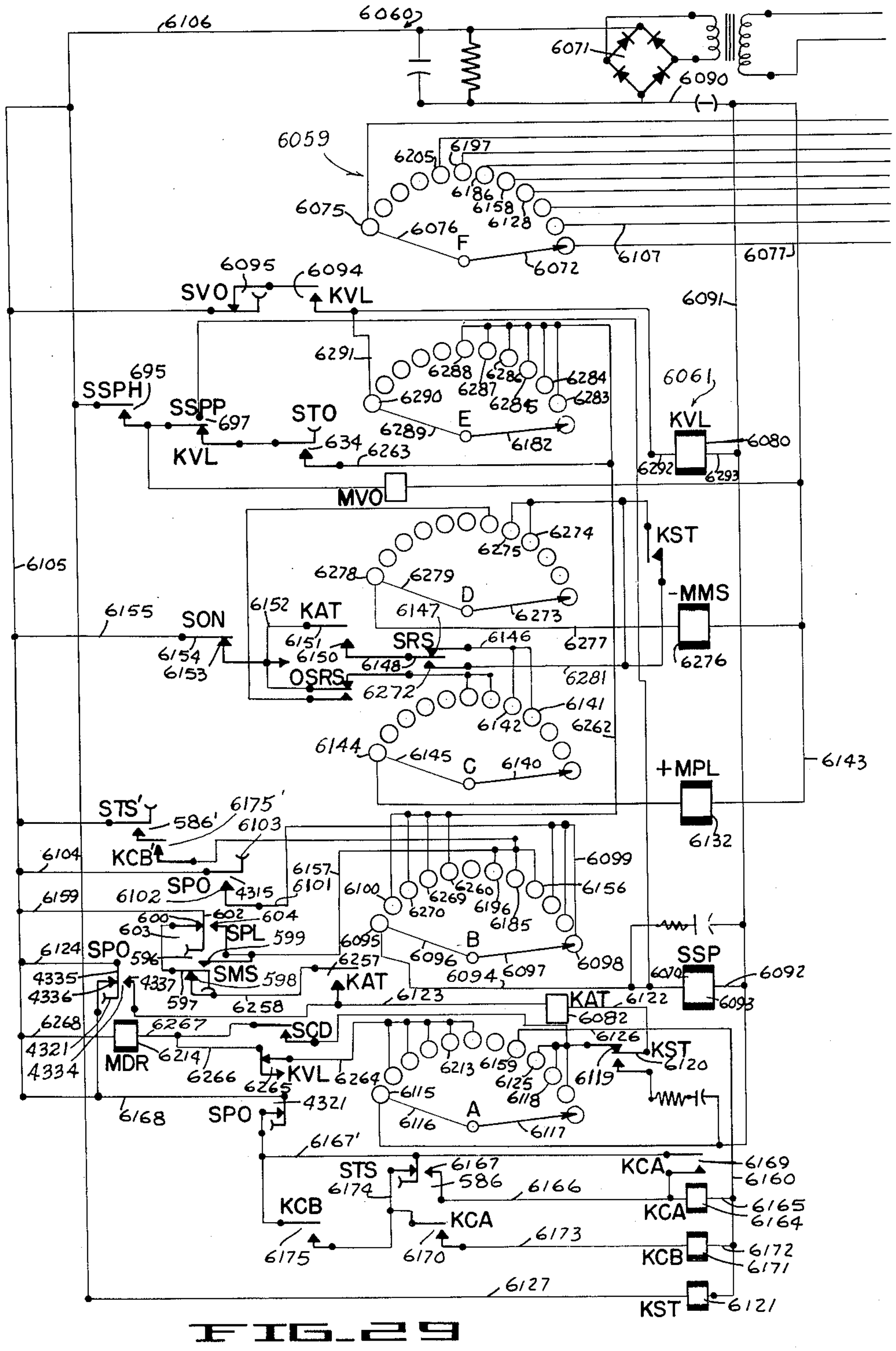
FIG. 29 is a circuit schematic showing of the step switch and associated relays found in the electrical control unit shown in FIG. 3.
Figure 30:
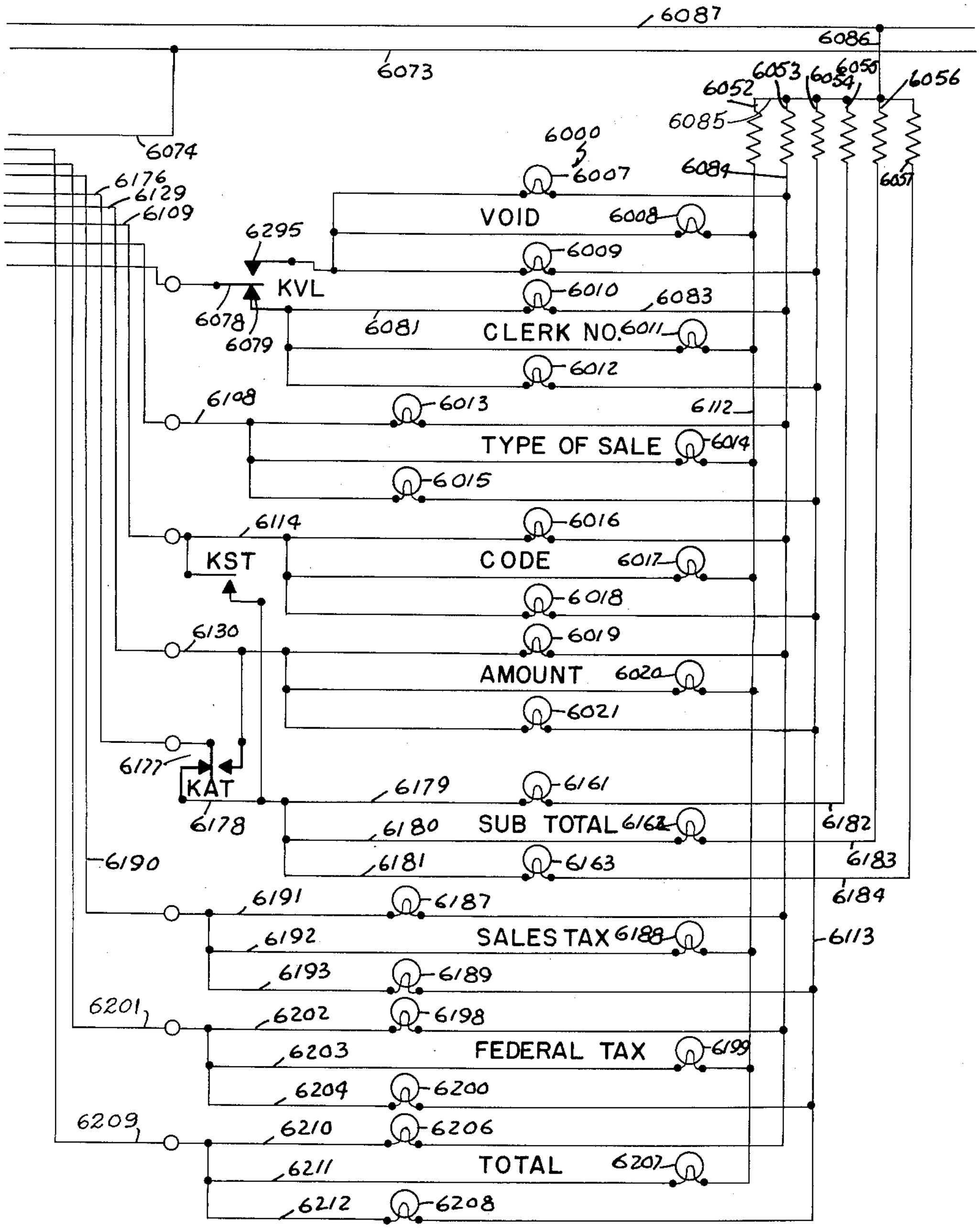
FIG. 30 shows the circuit of the indicator portion of the apparatus shown in FIG. 6.

The adding machine portion of the apparatus may be operated as required to merely print the number values put into the machine by manual operation of the required numeral value keys 17 and subsequent operation of the "Print Only" key 585. The "Print Only" key 585 is provided on its stem 601, as shown in FIG. 4, with a pin 706 operable upon depression of the key 585 to close some normally open contacts of the switch 4313 (SPO) and to open some normally closed contacts of the switch. For example, the switch 4313, as shown in FIG. 28, has normally open contacts 4314 and, as shown in FIG. 29, has normally closed contacts 4321 and a double throw switch portion 4334. When the "Print Only" key is fully depressed the normally open contacts at 4314 are closed, the contacts at 4321 are opened and the movable contact 4335 at the point 4334 is moved out of engagement with the fixed contact 4336 and into engagement with the relatively fixed contact 4337. Closing of the contacts at 4314 provides an initial operating circuit for the relay 4338 (KPO) over the conductors 5171, winding of relay 4338 (KPO), conductors 4339, 4340, diode 4352, movable contact 4353, fixed contact 4354 and conductor 3147. Operation of the relay 4338 (KPO) closes its normally open contacts 4355 shown in FIG. 26 providing an operating circuit for the clutch controlling electromagnetic device 3095 (MPC) when the wiper contact 3017 of the commutator switch 4101 is in engagement with the segmental contact 4322, the circuit extending over conductor 3023, closed switch contacts 4355 (KPO), conductor 3023′, diode 3024, conductor 3025, conductors 3020 and 5112, diode 5113, conductors 5114, 5115 and 5189, winding of electromagnetic device 3095 (MPC), conductors 5170, 5170′ and 5171 to rectifier 3144. Relay 4338 in operating when the Off Normal contacts 4275 and 4277 of switch 4273 are closed completes a holding circuit for itself through the make-before-break switch 4360, the circuit extending over conductors 3147 and 4365, movable contact 4275 and left hand fixed contact 4277 of Off Normal switch 4273 (SONA), conductor 4454, movable contact 4361, relatively fixed contact 4362 of switch 4360, conductors 4340 and 4339, winding of relay 4338 (KPO) and conductor 5171 to rectifier 3144.

*Panel Type Indicator Operation*

The panel type indicator 6000 is controlled in its operation through automatic operation of the control unit 6060 and in accordance with manual operation of the keys in the adding machine portion of the apparatus. The control unit 6060 is operable to control interlock devices provided in the adding machine portion of the apparatus to prevent accidental and untimely operations of the manual keys in recording a sales transaction. The step switch 6059 and the set of relays 6061 operate in combination to insure that the apparatus may be operated only in accordance with the predetermined program set for recording a sales transaction.

The step switch 6059 may be a conventional type multiple bank step switch and the relays in the set 6061 may be conventional multi-contact relays. In the arrangement shown in FIGS. 29 and 30 the indicator lights in the panel type indicator 6000 are energized directly from the commercial source of A.C. current supply through the F bank of contacts in the step switch 6059. The relay coils in the set 6061, the step switch operating coil 6070 and the interlock solenoids in the adding machine portion of the apparatus are operated from a D.C. power supply coming through the rectifier 6071.

*Normal Sales Transaction*

After a normal cycle of operation the wiper contacts in the step switch 6059 come to rest in the step switch's home position. In this case, for example, the wiper contact 6072 serving the F bank of contacts is resting on the first contact at the right in the bank. With the power supply on and with the wiper contact 6072 in the position shown, the "Clerk No." position of the panel type indicator is illuminated over a circuit extending over conductors 6073, 6074, terminal 6075, conductor 6076, wiper contact 6072, conductor 6077, movable contact 6078 and relatively fixed contact 6079 of relay 6080 (KVL), conductor 6081, lamp 6010, conductors 6083 and 6084, resistor 6053, conductors 6085 and 6086 to conductor 6087. The lighting of the lamps 6010, 6011 and 6012 illuminates that part of the panel type indicator 6000 showing the words "Clerk No." and "Print Only" to indicate that the sales clerk's identification number should be entered in the adding machine portion of the apparatus and the "Print Only" key in the adding machine portion of the apparatus should be operated so that the number entered will be only recorded and not be stored up in the accumulator of the adding machine. Under this condition all interlock electromagnetic devices provided in the adding machine portion of the apparatus are de-energized preventing operation of the plus (+) key, minus (−) key or opening of the cash drawer by operation of the Void Key.

Operation of the "Print Only" key 585, as shown in FIG. 4, by virtue of the pin 706 will cause operation of the switch 4315 (SPO) which prepares the circuit for the energization of the step switch coil 6070 (SSP) as shown in the electrical system disclosed in the FIGS. 25, 26, 27, 28, 29 and 30 when arranged in the order shown in FIG. 31. The circuit for initial operation of the step switch 6059 may be traced as follows: rectifier 6071, conductors 6090, 6091, and 6092, winding of electromagnetic device 6093, conductor 6094, terminal 6095, conductor 6096, wiper contact 6097, fixed contact 6098, conductor 6099, conductor 6101, fixed contact 6102 and movable contact 6103 of switch 4315 (SPO), conductors 6104, 6105 and 6106 to rectifier 6071. By operation of the "Print Only" key and closing of the contacts 6102 and 6103 the electromagnetic device 6093 of the step switch 6059 is energized and the step switch is cocked for operation. Release of the "Print Only" key releases switch 4315 (SPO) causing de-energization of the electromagnetic device 6093 and permitting the step switch wiper contacts to step in a counterclockwise direction, as viewed in FIG. 29, to the next position. In this case, the wiper contact 6072 would be on the second contact in the bank F and the lamps back of the "Type of Sale/Print Only" characters would be illuminated in place of those formerly energized. The circuit in this case, would extend over conductors 6107, 6108 to lamps 6013, 6014 and 6015 which are in electrical circuit connection with conductors 6084, 6112 and 6113, respectively. The lighting of the lamps 6013, 6014 and 6015 and the consequent display of the words adjacent thereto will indicate to the operator of the apparatus that the type of sale should be entered by operating the appropriate number keys in the adding machine portion of the apparatus and that the "Print Only" key should be operated. Operation of the "Print Only" key 585 will result in entering of the number indicating the type of sale and the printing of the number and release of the "Print Only" key 585 will result in the movement of the wiper contacts of the step switch to the next position. In this position the words "Code" and "Print Only" will appear illuminated in the panel type indicator 6000, the lamps 6016, 6017 and 6018 being lighted for this purpose. The lighting of the words "Code" and "Print Only" in this case will indicate to an operator that a number indicating the identity or character of the article sold should be entered by operation of the appropriate number keys in the adding machine portion of the apparatus and that immediately following this the "Print Only" key 585 should be operated. The lamps 6016, 6017 and 6018 are energized over a circuit including conductor 6074, contact 6075, conductor 6076, wiper contact 6072, the third fixed contact in the bank F, conductors 6109, 6114, lamps 6016, 6017, 6018 and conductors 6084, 6112 and 6113, respectively. In this position when the "Print Only" key 585 is operated the switch 4334 (SPO) is operated to complete a circuit for energization of the relay 6082 (KAT), the circuit extending over conductor 6091, fixed contact 6115 of the A bank of the step switch 6059, conductor strip 6116, wiper contact 6117, bank contact 6118, back contact 6119 and movable contact 6120 of relay 6121 (KST), conductor 6122, winding of relay 6082 (KAT), conductor 6123, right-hand contact 4337 and movable contact 4335 of switch 4334 (SPO), conductors 6124, 6105 and 6106 to rectifier 6071.

Relay 6082 (KAT) is employed as an alternating transfer relay and when energized operates to close a circuit for operation of the plus (+) key interlock electromagnet 6132 (MPL) which is operable to move a lever 6133 (FIG. 4), against the action of a spring 6134, the lever 6133 being pivotally supported at 6135 and having a lug 6136 normally in the path of downward movement of a pin 699 supported in and extending outward from the stem 590 of the Plus key 580. When the electromagnet 6132 is energized the lug 6136 is moved out of the way of the pin 699, shown in FIG. 4, and the Plus key 580 may be manually operated to initiate an adding cycle of operation in the adding machine portion of the apparatus. It will be seen as shown in FIG. 29 that when the wiper contact 6140 is on either of the fixed contacts 6141 and 6142 and the relay 6082 (KAT) is energized the electromagnet 6132 (+MPL) is energized over a circuit including conductor 6143, winding of electromagnet 6132 (+MPL), fixed contact 6144, conductor 6145, wiper contact 6140, fixed contacts 6141 or 6142, conductor 6146, upper fixed contact 6147, movable contact 6148, fixed contact 6150 and movable contact 6151 (KAT), conductor 6152, fixed contact 6153 and movable contact 6154 (SON), conductors 6155, 6105 and 6106 to rectifier 6071. Operation of the Plus key 580 operates switch 604 (SPL) to close a circuit for energization of the electromagnetic device 6093 (SSP) and upon release of the Plus key during the adding cycle the step switch is operated one step.

Concurrent depression of the subtract and print only key stems 593 and 601, respectively, is prevented by an interlock gate 734 which is pivoted at its lower end to the right side frame of the machine. Pins on the cross member of gate 734 cooperate with associated cam faces on the key stems. Such interlock gates are old in the art and need not be further described.

An extension 704 is upwardly directed from the bar 690 near the rear end of the bar and this extension is also provided with a downwardly and rearwardly inclined rear upper corner providing a cam surface and a stud 706 mounted on and projecting laterally from, the stem 601 of the "Print Only" key immediately above the extension 704 and is engageable with the cam surface to force the bar 690 to the left of the position shown in FIG. 4 when the "Print Only" key 585 is manually depressed.

The crosshead 696 is provided with a straight, horizontally disposed upper edge and the extensions 700 and 704 are provided forwardly of the upper ends of the cam surfaces thereof with straight, horizontally disposed edges so disposed that when bar 690 is moved rearwardly by depression of the addition key 580 these horizontally disposed edges move under the studs 702 and 706 and block depression of the subtraction key 581 and "Print Only" key 585. When bar 690 is moved forwardly by depression of the subtraction key or the "Print Only" key the upper edge of the crosshead 696 is moved under the stud 699 and blocks depression of the addition key 580. When the crosshead 696 is in its normal position, as shown in FIG. 4, a slot 6138 is in register with the lug 6136 and the stud 699. Under this condition and since the lug 6136 is in the path of movement of the stud 699 the addition key 580 can be depressed only when the plus key interlock electromagnetic device 6132 is energized to move the lever 6133. Release of the "Print Only" key 585 (SPO) will result in de-energization of the step switch magnet 6070 (SSP) and stepping of the wiper contacts to the next succeeding positions. The wiper contact 6072 serving the F bank in this case, is in contact with the bank contact 6128 to bring into operation the lamps 6019, 6020 and 6021 to cause illumination of the words "Amount" and "Plus Minus" in the panel type indicator 6000, the energizing circuit for the lamps 6019, 6020 and 6021 being by way of conductor 6074, contact 6075, conductor 6076, wiper contact 6072, fixed contact 6128 in the F bank of the step switch 6059, conductors 6129, 6130, lamps 6019, 6020 and 6021 and conductors 6084, 6112 and 6113, respectively. Illumination of the words "Amount" and "Plus Minus" in the panel type indicator 6000 will indicate to the operator of the apparatus that a numerical indication should be entered in the apparatus, the numerical indication being the value or price of the sale being recorded. After entering of the numerical amount by operating the required numerical keys in the keyboard assembly 10, the plus or minus keys in the keyboard assembly 10 should be operated to fully enter the numerical amount as an addition or subtraction item, as the case may be.

Operation of the Plus key operates switch 603 (SPL) and through its contacts 602 and 600 de-energizes relay 6082 (KAT) and consequently relay 6132 (+MPL).

The lower end of the key stem 593, FIG. 4, of the minus key 581 carries a stud roller 594 in engagement with an operating arm 595 of the switch 596 (SMS) which, upon operation of the minus key 581 and movement of the movable contact 597 from relatively fixed contact 598 to relatively fixed contact 599, prepares a circuit for operation of the electromagnetic device 6093 (SSP) of the step switch 6059. The circuit for operation of the electromagnetic device 6093, in this case, is by way of conductors 6091, 6092, operating coil 6070 of electromagnetic device 6093 (SSP), conductor 6094, contact 6095, conductor 6096, wiper contact 6097, bank contact 6156, conductor 6157, contacts 599 and 597 of switch 596 (SMS), left-hand fixed contact 600 and movable contact 602 of switch 603 (SPL), conductors 6159, 6105 and 6106.

When the wiper contact 6097 of the bank B is on the fixed bank contact 6156 and the movable contact 602 of switch 603 (SPL) engages the fixed contact 604 the coil 6070 of the electromagnetic device 6093 is energized. Release of the switch 603 (SPL) toward the end of the cycle of operation of the adding machine portion of the apparatus de-energizes the electromagnetic device 6093 (SSP) and permits the step switch 6059 to advance its wiper contacts one step.

The suppression minus relay 6121 (KST) is energized through the A bank contact 6159 when the wiper contact 6117 rests thereon, the circuit for operation of the relay 6121 (KST) being traceable over conductors 6091, contact 6115, conductor 6116, wiper contact 6117, bank contact 6159, conductor 6160, winding of relay 6121 (KST) and conductors 6127 and 6106. Operation of the relay 6121 (KST) with the wiper contact 6072 for the F bank of the step switch 6059 advanced to the bank contact 6158, the lamps 6161, 6162 and 6163 are lighted to illuminate the words "Sub Total/Sub Total" to indicate that a subtotal may be token by operation of the subtotal key 583 and that the subtotal key 583, after being operated to obtain a printed record of the subtotal, should then be operated again to step the sales record indicator to the next station display position.

Figure 34:
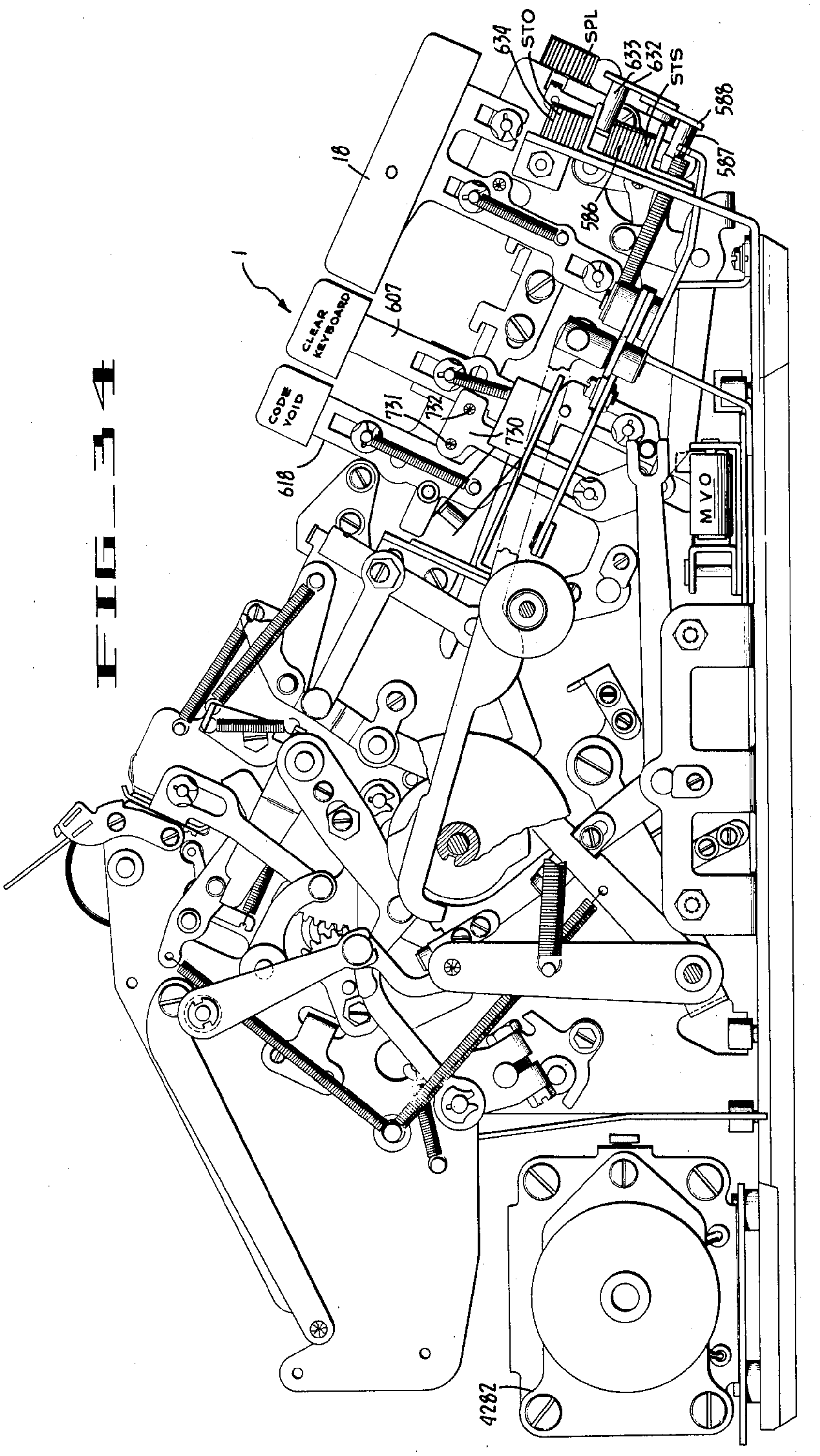
FIG. 34 is a left side view of the adding machine apparatus 1 with the cover removed.

Assuming that the subtotal key 583, shown in FIGS. 1 and 2, is operated, the subtotal switch 586 (STS), shown in FIG. 29 in two parts, STS and STS', is operated by virtue of a roller 587, shown in FIG. 34, engaging a movable member of the switch, the roller 587 being supported on the lever 588 which is engaged by a portion of the stem of the subtotal key 583 which, in FIG. 34, is not visible since the subtotal key 583 is located directly back of the "0" key 18. Closing of the portion (STS) of the subtotal switch 586 completes a circuit for the energization of the relay 6164 (KCA), the circuit being traceable through conductor 6091, bank contact 6115 in the A bank of the step switch 6059, conductor 6116, wiper contact 6117, bank contact 6159, conductors 6160 and 6165, winding of relay 6164, conductor 6166, right-hand fixed contact 6167 and movable contact of the STS portion of switch 586, conductor 6167', switch 4321 (SPO), conductors 6168, 6105 and 6106 to rectifier 6071. Relay 6164 (KCA) closes its contacts 6169 (KCA) and locks up over contacts 6169 and conductor 6167' as long as the wiper contact 6117 remains on bank contact 6159 and the switch 4321 (SPO) remains closed. The relay 6164 (KCA) also closes contact 6170 and completes an initial circuit for energization of the relay 6171 (KCB), the circuit involving conductors 6160, 6172, winding of relay 6171 (KCB), conductor 6173, contacts 6170 (KCA), conductor 6174 and left-hand fixed and movable contacts of switch 586 (STS), conductor 6167' and closed switch 4321 (SPO), conductors 6105 and 6106 to rectifier 6071. Operation of relay 6171 (KCB) closes contacts 6175 (KCB) and provides a locking circuit for itself involving the contacts 6170 (KCA), 6175 (KCB) and the switch 4321 (SPO).

The relay 6164 (KCA) closes contacts 6169 and locks up therethrough over switch 4321 (SPO).

When the lamps 6161, 6162 and 6163 are lighted to illuminate the words "Sub Total", the circuit for energization of the lamps is by way of bank contact 6158 in the F bank of the step switch 6059, conductor 6176, movable contact and left-hand fixed contact of relay contacts 6177 (KAT), conductors 6178 and in parallel conductors 6179, 6180 and 6181 and 6182, 6183 and 6184 and resistors 6055, 6056 and 6057 and conductors 6085 and 6086 to conductor 6087, the other side of the A.C. supply being by way of conductors 6073 and 6074. Also contacts 6175' of KCB' and 586' of STS' are closed in series with contact 6185 of the B bank of the step switch 6059 to provide for energization of the electromagnetic device 6093 of the step switch 6059.

As subtotal switch 586 (STS) is released, counting relay 6171 (KCB) is energized through contacts 6170 (KCA) and contacts 6175 (KCB), and switch 4321 (SPO). Contacts 6175 (KCB) bridge contacts of STS so that opening of contacts of STS does not de-energize relay 6171 (KCB). As subtotal switch 586 (STS') is released the electromagnetic device 6093 (SSP) is de-energized and the wiper contacts are moved forward one step and the wiper contact 6072 for the F bank is on bank contact 6186 to bring into operation the lamps 6187, 6188 and 6189 to illuminate the words and sign "Sales Tax/+", the energizing circuit for the lamps involving contact 6186 in the step switch 6059 and the conductors 6190, 6191, 6192, 6193 and 6112, 6084 and 6113. Illumination of the words and sign "Sales Tax/+" indicates that the operator should enter in the sales record the amount of the sales tax and should then operate the plus key 580 in the adding machine portion of the apparatus. On the stem 590 of the plus key 580, shown in FIG. 4, a pin 6194 is provided to operate a lever, not shown, but pivotally supported and carrying a roller 6195 operable to operate the switch 603 (SPL) each time the plus key 580 is fully depressed. Closing of the movable contact 602 of the switch 603 against its right-hand contact 604 completes a circuit for energization of the electromagnetic device 6093 (SSP) involving the wiper contact 6097 and a suitable bank contact in the B bank, in this case the bank contact involved being the bank contact 6196. Upon release of the plus key 580 and return of the switch 603 (SPL) to normal condition the step switch 6059 will move its wiper contacts one step which, in this case, will bring the wiper contact 6072 into engagement with the F bank contact 6197.

With the wiper contact 6072 in engagement with the F bank contact 6197 a circuit is prepared for energization of the lamps 6198, 6199 and 6200 to illuminate the words and sign "Federal Tax/+", the energizing circuit for the lamps involving contact 6197 in the step switch 6059 and the conductors 6201, 6202, 6203, 6204 and 6112, 6084 and 6113.

Illumination of the words and sign "Federal Tax/+" indicates that the operator should enter the amount of the Federal Tax and should then operate the plus key 580. Through operation of the plus key 580 and the consequent operation of the switch 603 (SPL) the electromagnetic device 6093 (SSP) is energized and upon release of the plus key 580 and restoring of switch 603 (SPL) to normal position the step switch 6059 is operated one step to bring the wiper contact 6072 to F bank contact 6205.

When the wiper contact 6072 is in engagement with the F bank contact 6205 the lamps 6206, 6207 and 6208 are lighted to illuminate the words "Total/Total" in the panel type indicator 6000 to indicate to the operator that a total should be obtained of the values recorded in the sales transaction and that the total key 582 should be operated.

The total key 582 comprises a stem 628 movable downwardly against the action of a spring 629, FIG. 8, one end of which is secured to a lug 630 bearing against an ear portion 631 on a pivotally supported lever 632 carrying a roller 633 operable against a movable member on the switch 634 (STO) to close the switch 634 (STO) when the total key 582 is operated. The circuit for operation of the lamps 6206, 6207 and 6208 extends over F bank contact 6205, conductors 6209, 6210, 6211, 6212, 6084, 6112 and 6113.

When the wiper contact 6117 for the A bank is on contact 6213 the electromagnetic device 6214 (MDR) is energized to attract its armature 6215 operable to move an arm member 6216. As shown in FIG. 8 the arm member 6216 bears against a pin 6217 supported on one arm portion 6218 of a U-shaped lever 6219 pivotally supported at one corner portion 6220 on a fixed post 6221. The right arm 6222 of the U-shaped lever 6219 may be made in two parts so that it may be adjustable as to length. The outer end of the arm 6222 is notched and arranged to normally engage a pivotally supported plunger 6223 to prevent the lower end portion 6224 of the plunger 6223 from coming into register and engagement with the button 6225 which is operable to release a latch on the cash drawer 6226 after the total has been printed. The plunger 6223 is pivotally supported on a pin 6227 extending from one arm of a bell crank lever 6228 which is rotatably supported on a pin 6229 mounted on a fixed support 6230. A cam 178 mounted on the cam shaft 135 bears against the roller 6231 to operate the bellcrank 6228 against the action of spring 6232. For each cyclic rotation of the cam 178 the bellcrank lever 6228 is operated counter-clockwise to thrust the plunger 6223 downwardly, the plunger 6223 extending between and below spaced plate portions 6233 and 6234 of control rods 6235 and 6236, respectively, the plate portions 6233 and 6234 being apertured and bolted together, the bolt 6237 being located in such position as to normally prevent complete swinging down of the plunger 6223. When the total key 582 is operated a lug 6238 on the stem 628 transmits downward movement of the stem to a yoked bellcrank lever 6239 operable to move the lever 6240 to pull the rod 6236 leftward as shown in FIG. 8 to permit the plunger 6223 to move to a vertical position when the arm 6222 of the U-shaped lever 6219 is moved, against the action of the spring 6219', out of the path of movement of the plunger 6223. One end of the spring 6219' is secured to the U-shaped lever 6219 at a point at right angles to the arm 6222 and the other end of the spring 6219' is secured to a laterally extending lug 6241 on the plunger 6223. It will be seen by looking at FIG. 40, that when the arm 6222 is moved out of the path of movement of the pivotally supported plunger 6223 and the rod 6236 and bolt 6237 are moved leftward from the position shown, the lower end 6224 of the plunger 6223 will come into register with the button 6225. Downward movement of the plunger 6223 will therefore cause downward movement of the button 6225.

The cash drawer unit 6242, as shown in FIGS. 1 and 2, comprises the cash drawer per se 6226 and a casing 6243, the cash drawer 6226 being operable to be thrust into the casing 6243 against the action of a spring 6244 and the cash drawer 6226 being latchable within the casing 6243 and in such relative position that spring energy is stored in the spring 6244. The cash drawer 6226 is equipped with a spring-urged latch bolt 6245 arranged to engage a keeper 6246 secured to the undersurface of the top wall of the casing 6243. A releasing lever 6247 supported in straps 6248 applied against the undersurface of the top wall of the casing 6243 is operable to be rotated to make a hook portion 6249 thrust the bolt 6245 downward to pass below the level of the keeper 6246 so that under the thrust of the spring 6244 the cash drawer 6226 will be pushed outward of the casing 6243 to the position shown in FIG. 2 wherein it is unlatched and may be further withdrawn as required to obtain access to the various compartments in the cash drawer per se.

The lever 6247 has an angularly extending end portion 6252 disposed beneath a hinge leaf 6253, the other leaf 6254 of the hinge structure being secured by any suitable fastening means to the under surface of the top of the casing 6243. A leaf spring 6255 secured to the under surface of the top of the casing 6243 and having a free end of the spring extending under the angularly extending end portion 6252 of the lever 6247 operates to normally urge the hinge leaf 6253 upwardly against the under surface of the top of the casing 6243 and the button 6225 pressed upwardly through an aperature 6256 in the top of the casing 6243.

The cash drawer 6226 may be equipped with a conventional lock 6250, the bolt of which may engage a keeper in the casing 6243 and a conventional lever system lock means 6251 may also be provided to keep the drawer closed against automatic operation as required.

When the cash drawer 6226 is being thrust to its fully closed position within the casing 6243, spring pressure is developed in the spring 6244 and the latch bolt 6245 on the cash drawer 6226 snaps back of the rear of the keeper 6246 to latch the cash drawer 6226 in fully closed position.

It will be understood that upon operation of a functional key, such, for example, as the minus key 581, the adding machine portion of the apparatus goes through a cycle of operation and that upon completion of the cycle the keys have returned to their normal positions. In this case the switch 596 (SMS) opens at contact 599 and the electromagnetic device 6093 (SSP) of the step switch 6059 becomes deenergized and the wiper contacts of the step switch move to the next position which in this case would be such that the wiper contact 6072 would come to rest on the bank contact 6158 and the lamps 6161, 6162 and 6163 will be lighted to illuminate the words "Sub Total/Sub Total" in the panel type indicator 6000.

When the wiper contact 6117 in the A bank of the step switch is on fixed contact 6118 the alternating transfer relay 6082 (KAT) will be brought into operation by operation of the switch 4334 of the "Print Only" key 585 to close the movable contact 4335 against the right-hand fixed contact 4337. Operation of the relay 6082 (KAT) will close its contact 6257 to provide a holding circuit for itself by way of conductor 6258, switch 596 (SMS), fixed contact 600, movable contact 602 and conductors 6159, 6105 and 6106.

Release of the "Print Only" key 585 permits the step switch to advance its wipers one step. Since the wipers for the A bank are of the bridging type, the alternating transfer relay 6082 (KAT) maintains its holding circuit condition and through its contacts 6150 and 6151, now closed, causes energization of the plus key interlock electromagnetic device 6132 (+MPL) when the Off Normal Switch contacts 6153 and 6154 are reclosed by the machine toward the end of the adding machine cycle preventing the operator from attempting to beat the Add-Punch machine.

Operation of the "Total" key 582 causes opening of the cash drawer 6226 and closes the contacts of switch 634 (STO) which prepares the circuit for homing of the wiper contacts of the step switch 6059. The circuit for homing the step switch may be traced as follows: conductors 6090, 6091 and 6092, winding of step switch coil 6093 (SSP), conductors 6094, 6096, wiper contact 6097 for the B bank, contact 6260, conductors 6261, 6262 and 6263, switch contacts 634 (STO), switch contacts 697 (SSPP), switch contacts 695 (SSPH) and conductor 6106 to rectifier 6071. The electromagnetic device 6214 is energized over conductor 6091, contact 6115 of the A bank, conductor 6116, wiper contact 6117, contact 6213, conductor 6264, contacts 6265 (KVL), conductors 6266, 6267, winding of electromagnetic device 6214 (MDR), conductors 6268, 6105 and 6106. Contacts 6260, 6269, 6270 and 6100, in B bank, are connected by electrical conductors to conductor 6262 so that the electromagnetic device 6093 (SSP) is successively operated until the wiper contacts reach their home positions.

*Return Transaction*

The acceptance of returned merchandise requires a record of the return transaction and the sequence of operation for recording the return sales transaction is identical to the making of the sales record with the exception that the sales return switch 6147 (SRS) is operated by the return sales lock 6271, the bolt of which is operable to operate the sales return switch 6147 (SRS). In this case the movable contact 6148 is in contact with the relatively fixed contact 6272 so that when the wiper contact 6273 reaches the contact 6274 or 6275 in the D bank the electromagnetic device 6276 (—MMS) will be energized over a circuit involving conductor 6143, winding of electromagnetic device 6276, conductor 6277, contact 6278, conductor 6279, wiper contact 6273, contacts 6275 or 6274, conductors 6280 and 6281, contacts 6272 and 6148, contacts 6150 and 6151 (KAT), conductor 6152, contacts 6153 and 5164 (SON) conductors 6155, 6105 and 6106 to rectifier 6071.

*Voiding a Sales Ticket*

When the step switch 6059 is in any of one through six step positions from its home position, operating the "Total" key 582 energizes the Void relay 6080 (KVL) through the home switch 695 (SSPH) and pulse switch 697 (SSPP), the contacts of switch 634 (STO), conductors 6263 and 6262, contacts the wired bank contacts 6283, 6284, 6285, 6286, 6287, 6288, wiper contact 6182, conductor 6289, contact 6290, conductors 6291, 6292, winding of relay 6080 (KVL), conductors 6293 and 6091. The operation of the Void relay 6080 (KVL) closes contacts 6094 (KVL) and a holding circuit is therefore provided through the contacts 6094 and the closed contact of switch 6095 (SVO). Operation of the relay 6080 (KVL) also switches over the movable contact 6078 from contact 6079 to contact 6295 to bring into operation the lamps 6007, 6008 and 6009 to illuminate the words "Void/Code Void" in the indicator panel 6000.

We claim:

1. A sales apparatus operable as a cash register to make a printed record and a perforated tape record of a business transaction, comprising, in combination, an adding machine operable to make a printed record, a record making machine operable to make a perforated record, a sign to indicate in steps the required operation of the apparatus, a system of lights arranged in lines, to illuminate said sign a line at a time, a latch, a cash drawer controlled by said latch, a total key in said adding machine, a lever system extending from said total key to release said latch, a latching lever for said lever system and an electrical device to control the operation of said latching lever to release the latch for said cash drawer only when said total key is operated and said system of lights has gone through its full cycle of operation.

2. A cash register type of sales recording apparatus operable to make a predetermined form of record of a sale comprising, in combination, an adding machine operable to make a record of a sales transaction, a cash drawer, a casing for said cash drawer and supporting said adding machine, pressure means operable to urge said cash drawer outwardly of said casing, latch means releasably holding said cash drawer within said casing, a releasing lever system for said latch means supported in said casing, a button on said lever system extending through said casing, a sign to indicate in steps the required operation of the apparatus, light means to illuminate the steps in said sign in succession, a total key in said adding machine, a total designation in said sign, a plunger operable to engage said button to control said latch means, said plunger being normally out of register with said button, and electromechanical means controlling said plnnger and permitting said plunger to operate said button to release said latch means to release said cash drawer when said total key is operated and said total designation in said sign is illuminated.

3. In a cash register type of sales recording apparatus for making a plurality of records of a sale, in combination, an adding machine operable to make a line-by-line printed record of a sale, a tape perforator controlled by said adding machine to make a perforated tape record of the sale, an indicator panel showing in line-by-line form instructions indicating the required steps of operation of the adding machine for recording the sale, a system of lights adjacent said indicator panel, arranged in lines in register with the lines of instructions to illuminate the instructions a line at a time, an electrical control means forming an operating system between said adding machine, said tape perforator and said indicator panel and operable to control said system of lights a line at a time, a cash drawer casing supporting said adding machine and said tape perforator, a cash drawer in said cash drawer casing, means operable to urge said cash drawer outwardly of said cash drawer casing, latch means normally operating to hold said cash drawer latched within said cash drawer casing, a control button for said latch means, a pivotally supported plunger to operate said control button to release said latch means, cam and lever means to operate said plunger, a pivotally supported lever normally extending into engagement with said plunger and deflecting said plunger from engagement with said control button, electromagnet means for moving said pivotally supported lever, a total key in said adding machine, a lever system extending from said total key to normaly hold said plunger from engagement with said control button and means extending from said total key to said lever system to operate said lever system to release said plunger to swing into register with and engage and operate said control button when said total key is depressed and said electromagnet means is operated.

References Cited in the file of this patent

UNITED STATES PATENTS

| | | |
|---|---|---|
| 1,965,884 | Crosman | July 10, 1934 |
| 1,989,313 | Goldberg | Jan. 29, 1935 |
| 1,991,551 | Fuller | Feb. 19, 1935 |
| 2,292,061 | Derr et al. | Aug. 4, 1942 |
| 2,607,526 | Boyden et al. | Aug. 19, 1952 |
| 2,679,640 | Dondero et al. | May 25, 1954 |
| 2,682,993 | Helgeson | July 6, 1954 |
| 2,718,628 | Bartlett et al. | Sept. 20, 1955 |
| 2,861,739 | Chall et al. | Nov. 25, 1958 |
| 2,894,449 | Boyden et al. | July 14, 1959 |